United States Patent
Mairs et al.

(10) Patent No.: US 6,216,177 B1
(45) Date of Patent: *Apr. 10, 2001

(54) METHOD FOR TRANSMITTING TEXT DATA FOR SHARED APPLICATION BETWEEN FIRST AND SECOND COMPUTER ASYNCHRONOUSLY UPON INITIATION OF A SESSION WITHOUT SOLICITATION FROM FIRST COMPUTER

(75) Inventors: Christopher J. Mairs; Anthony M. Downes; Roderick F. MacFarquhar, all of London; Kenneth P. Hughes, East Sussex; Alex J. Pollitt; John P. Batty, both of London; Mark E. Berry, Middlesex, all of (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/108,882

(22) Filed: Jul. 1, 1998

Related U.S. Application Data

(63) Continuation of application No. 08/498,329, filed on Jul. 5, 1995, now Pat. No. 5,864,711.

(51) Int. Cl.$^7$ .................................................. G06F 13/38
(52) U.S. Cl. ........................ 710/6; 345/522; 395/200.34; 709/204
(58) Field of Search ................................ 710/6; 345/522; 395/200.34; 709/204

(56) References Cited

U.S. PATENT DOCUMENTS

| 4,386,416 | 5/1983 | Giltner et al. | 710/68 |
|---|---|---|---|
| 4,672,459 | 6/1987 | Kudo | 358/452 |
| 4,814,987 | 3/1989 | Miyao et al. | 704/3 |
| 4,823,122 | * 4/1989 | Mann et al. | 340/825.28 |
| 4,882,687 | 11/1989 | Gordon | 345/435 |
| 4,897,799 | 1/1990 | Le Gall et al. | 709/246 |
| 5,077,732 | * 12/1991 | Fischer et al. | 370/437 |
| 5,206,934 | 4/1993 | Naef, III | 709/204 |
| 5,210,825 | 5/1993 | Kavaler | 345/116 |

(List continued on next page.)

OTHER PUBLICATIONS

Intel Corporation, "Intel ProShare™ Personal Conferencing Sorftware, Getting Started Guide", Intel Corporation, pp. 25–31, 1994.

Schroeder, Erica, "Videoconferencing—Creative brings Mac package to Windows," *PC Week,* vol. 11, No. 25, pp. 83 & 88, Jun. 27, 1994.

Schroeder, Erica, "PictureTel Plans Low–Cost Video App Sharing," *PC Week,* vol. 11, No. 25, pp. 1 & 171, Jun. 27, 1994.

"A Primer on the T.120 Series Standard," *DataBeam Corporation,* pp. 1–13, 1995.

*Primary Examiner*—Thomas C. Lee
*Assistant Examiner*—Tammara Peyton
(74) *Attorney, Agent, or Firm*—Leydig, Voit & Mayer, Ltd.

(57) ABSTRACT

A method and system for compressing bitmap data in a system for sharing an application running on a host computer with a remote computer, wherein the shared application's screen output is simultaneously displayed on both computers. Simultaneous display of screen output is achieved by efficiently transmitting display data between the host computer and the remote computer. When a font used by the host computer for displaying text is not available on the remote computer, the host computer sends a bitmap representation of the text for display, rather than the text itself. Bitmap representations are cached by the remote computer, so that the same bitmap representation need not be repeatedly transmitted from the host computer to the remote computer. Bitmap representations are compressed by the host computer prior to transmission, transmitted, then decompressed by the remote computer.

3 Claims, 48 Drawing Sheets

U.S. PATENT DOCUMENTS

| | | | |
|---|---|---|---|
| 5,241,625 | 8/1993 | Epard et al. | 345/502 |
| 5,255,361 | 10/1993 | Callaway et al. | 345/522 |
| 5,408,600 | 4/1995 | Garfinkel et al. | 345/522 |
| 5,485,559 | 1/1996 | Sakaibara et al. | 345/433 |
| 5,491,780 | 2/1996 | Fryles et al. | 345/332 |
| 5,565,886 | 10/1996 | Gibson | 345/136 |
| 5,655,152 | 8/1997 | Ohnishi et al. | 710/36 |
| 5,673,371 | 9/1997 | Koopman et al. | 358/1.11 |
| 5,699,524 | 12/1997 | Ooishi et al. | 709/246 |

* cited by examiner

ORDER QUEUE

SCREEN LIST

ORDER QUEUE

SCREEN LIST

Host

| order type | field 1 | field 2 | field 3 |
|---|---|---|---|
| 1 | A | B | C |
| 2 | D | E | F |
| 3 | G | H | I |

21A01

Shadow

| order type | field 1 | field 2 | field 3 |
|---|---|---|---|
| 1 | A | B | C |
| 2 | D | E | F |
| 3 | G | H | I |

21A02

|  | 21A03 | 21A04 | 21A05 |
|---|---|---|---|
| order type | 3 | 2 | 1 |
| field 1 | G | D | L |
| field 2 | H | X | B |
| field 3 | I | Z | C |

Fig. 21A

|   |   |   |   |
|---|---|---|---|
| 1 | L | B | C |
| 2 | D | X | Z |
| 3 | G | H | I |

|   |   |   |   |
|---|---|---|---|
| 1 | L | B | C |
| 2 | D | X | Z |
| 3 | G | H | I |

|   |   |   |   |   |   |   |   |   |   |   |   |   |   |   |   |   |   |   |   |   |   |   |   |   |   |   |   |       |
|---|---|---|---|---|---|---|---|---|---|---|---|---|---|---|---|---|---|---|---|---|---|---|---|---|---|---|---|-------|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 24B01 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 24B02 |
| 0 | 0 | a | a | a | a | a | a | a | a | a | a | a | f | f | b | b | b | b | b | b | b | b | b | b | b | 0 | 0 | 24B03 |
| 0 | 0 | a | a | a | a | a | a | a | a | a | a | a | f | f | b | b | b | b | b | b | b | b | b | b | b | 0 | 0 | 24B04 |
| 0 | 0 | a | a | a | a | a | a | a | a | a | a | a | f | f | b | b | b | b | b | b | b | b | b | b | b | 0 | 0 | 24B05 |
| 0 | 0 | a | a | a | a | a | a | a | a | a | a | a | f | f | b | b | b | b | b | b | b | b | b | b | b | 0 | 0 | 24B06 |
| 0 | 0 | a | a | a | a | a | a | a | a | a | a | a | f | f | b | b | b | b | b | b | b | b | b | b | b | 0 | 0 | 24B07 |
| 0 | 0 | a | a | a | a | a | a | a | a | a | a | a | f | f | b | b | b | b | b | b | b | b | b | b | b | 0 | 0 | 24B08 |
| 0 | 0 | a | a | a | a | a | a | a | a | a | a | a | f | f | b | b | b | b | b | b | b | b | b | b | b | 0 | 0 | 24B09 |
| 0 | 0 | a | a | a | a | a | a | a | a | a | a | a | f | f | b | b | b | b | b | b | b | b | b | b | b | 0 | 0 | 24B10 |
| 0 | 0 | a | a | a | a | a | a | a | a | a | a | a | f | f | b | b | b | b | b | b | b | b | b | b | b | 0 | 0 | 24B11 |
| 0 | 0 | f | f | f | f | f | f | f | f | f | f | f | f | f | f | f | f | f | f | f | f | f | f | f | f | 0 | 0 | 24B12 |
| 0 | 0 | f | f | f | f | f | f | f | f | f | f | f | f | f | f | f | f | f | f | f | f | f | f | f | f | 0 | 0 | 24B13 |
| 0 | 0 | c | c | c | c | c | c | c | c | c | c | c | f | f | d | d | d | d | d | d | d | d | d | d | d | 0 | 0 | 24B14 |
| 0 | 0 | c | c | c | c | c | c | c | c | c | c | c | f | f | d | d | d | d | d | d | d | d | d | d | d | 0 | 0 | 24B15 |
| 0 | 0 | c | c | c | c | c | c | c | c | c | c | c | f | f | d | d | d | d | d | d | d | d | d | d | d | 0 | 0 | 24B16 |
| 0 | 0 | c | c | c | c | c | c | c | c | c | c | c | f | f | d | d | d | d | d | d | d | d | d | d | d | 0 | 0 | 24B17 |
| 0 | 0 | c | c | c | c | c | c | c | c | c | c | c | f | f | d | d | d | d | d | d | d | d | d | d | d | 0 | 0 | 24B18 |
| 0 | 0 | c | c | c | c | c | c | c | c | c | c | c | f | f | d | d | d | d | d | d | d | d | d | d | d | 0 | 0 | 24B19 |
| 0 | 0 | c | c | c | c | c | c | c | c | c | c | c | f | f | d | d | d | d | d | d | d | d | d | d | d | 0 | 0 | 24B20 |
| 0 | 0 | c | c | c | c | c | c | c | c | c | c | c | f | f | d | d | d | d | d | d | d | d | d | d | d | 0 | 0 | 24B21 |
| 0 | 0 | c | c | c | c | c | c | c | c | c | c | c | f | f | d | d | d | d | d | d | d | d | d | d | d | 0 | 0 | 24B22 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 24B23 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 24B24 |

*Fig. 24B*

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
|0|0|0|0|0|0|0|0|0|0|0|0|0|0|0|0|0|0|0|0|0|0|0|0|0|0|0|0|0|24B01|
|0|0|0|0|0|0|0|0|0|0|0|0|0|0|0|0|0|0|0|0|0|0|0|0|0|0|0|0|0|24B02|
|0|0|a|a|a|a|a|a|a|a|a|a|a|a|f|f|b|b|b|b|b|b|b|b|b|b|b|0|0|24B03|
|0|0|0|0|0|0|0|0|0|0|0|0|0|0|0|0|0|0|0|0|0|0|0|0|0|0|0|0|0|24B04|
|0|0|0|0|0|0|0|0|0|0|0|0|0|0|0|0|0|0|0|0|0|0|0|0|0|0|0|0|0|24B05|
|0|0|0|0|0|0|0|0|0|0|0|0|0|0|0|0|0|0|0|0|0|0|0|0|0|0|0|0|0|24B06|
|0|0|0|0|0|0|0|0|0|0|0|0|0|0|0|0|0|0|0|0|0|0|0|0|0|0|0|0|0|24B07|
|0|0|0|0|0|0|0|0|0|0|0|0|0|0|0|0|0|0|0|0|0|0|0|0|0|0|0|0|0|24B08|
|0|0|0|0|0|0|0|0|0|0|0|0|0|0|0|0|0|0|0|0|0|0|0|0|0|0|0|0|0|24B09|
|0|0|0|0|0|0|0|0|0|0|0|0|0|0|0|0|0|0|0|0|0|0|0|0|0|0|0|0|0|24B10|
|0|0|0|0|0|0|0|0|0|0|0|0|0|0|0|0|0|0|0|0|0|0|0|0|0|0|0|0|0|24B11|
|0|0|5|5|5|5|5|5|5|5|5|5|5|5|0|0|4|4|4|4|4|4|4|4|4|4|4|0|0|24B12|
|0|0|0|0|0|0|0|0|0|0|0|0|0|0|0|0|0|0|0|0|0|0|0|0|0|0|0|0|0|24B13|
|0|0|3|3|3|3|3|3|3|3|3|3|3|3|0|0|2|2|2|2|2|2|2|2|2|2|2|0|0|24B14|
|0|0|0|0|0|0|0|0|0|0|0|0|0|0|0|0|0|0|0|0|0|0|0|0|0|0|0|0|0|24B15|
|0|0|0|0|0|0|0|0|0|0|0|0|0|0|0|0|0|0|0|0|0|0|0|0|0|0|0|0|0|24B16|
|0|0|0|0|0|0|0|0|0|0|0|0|0|0|0|0|0|0|0|0|0|0|0|0|0|0|0|0|0|24B17|
|0|0|0|0|0|0|0|0|0|0|0|0|0|0|0|0|0|0|0|0|0|0|0|0|0|0|0|0|0|24B18|
|0|0|0|0|0|0|0|0|0|0|0|0|0|0|0|0|0|0|0|0|0|0|0|0|0|0|0|0|0|24B19|
|0|0|0|0|0|0|0|0|0|0|0|0|0|0|0|0|0|0|0|0|0|0|0|0|0|0|0|0|0|24B20|
|0|0|0|0|0|0|0|0|0|0|0|0|0|0|0|0|0|0|0|0|0|0|0|0|0|0|0|0|0|24B21|
|0|0|0|0|0|0|0|0|0|0|0|0|0|0|0|0|0|0|0|0|0|0|0|0|0|0|0|0|0|24B22|
|0|0|c|c|c|c|c|c|c|c|c|c|c|c|f|f|d|d|d|d|d|d|d|d|d|d|d|0|0|24B23|
|0|0|0|0|0|0|0|0|0|0|0|0|0|0|0|0|0|0|0|0|0|0|0|0|0|0|0|0|0|24B24|

*Fig. 24C*

METHOD FOR TRANSMITTING TEXT DATA FOR SHARED APPLICATION BETWEEN FIRST AND SECOND COMPUTER ASYNCHRONOUSLY UPON INITIATION OF A SESSION WITHOUT SOLICITATION FROM FIRST COMPUTER

CROSS-REFERENCE TO RELATED APPLICATION

This application is a continuation of U.S. patent application Ser. No. 08/498,329, filed Jul. 5, 1995, issued as U.S. Pat. No. 5,864,711 on Jan. 26, 1999.

TECHNICAL FIELD

This invention relates generally to the field of sharing application programs and, more specifically, to the optimization of the transmission of data from a shared application to a shadow computer system.

BACKGROUND OF THE INVENTION

The modern workplace is increasingly reliant on the use of networks. A network is a group of computer systems and associated devices that are connected by communications facilities. A network enables the transfer of electronic information between computer systems. Typically, each of the computer systems has local applications which may be invoked at that computer system. The local applications may receive input from a user at that computer system. Also, a local application displays output at that computer system.

It is useful for a user to be able to share an application invoked at a host computer system with another user at a shadow computer system. For example, sharing an application which generates a word processing document may assist an editor who is working with a writer to publish a document. In particular, the editor may wish to edit the document at the host computer system, while the writer views the document at the shadow computer system. In this manner, the writer may also provide input to the shared application and modify the document based on the editor's comments. Immediately, the editor may review this revised document. In addition, sharing an application may be useful for diagnostic testing by a technical person upon receiving questions from a user. For example, if the user has found that an application is not working properly, then the user may desire to share the application with the technical person. Then, the technical person can attempt to solve the problem, receiving input from the user describing the problem as needed.

Some conventional computer systems allow a user at a host computer system to share an application with a user at a shadow computer system. These conventional computer systems typically display the output of the shared application within a shadow window that is contained within a top-level window. The top-level window is created and controlled by the program that coordinates the sharing of the application. Unfortunately, because the shadow window is not a top-level window, the shadow window may not be minimized or maximized under the control of the operating system.

In addition, these conventional systems typically do not negotiate control of the shared application. Instead, either user may input data to the shared application, and all data is passed in to the application in the order it is entered. Moreover, typically, a user who is sharing an application may either view the application or control it (i.e., provide input to it). Conventional systems do not enable a user who is sharing an application to use non-shared applications. It may be useful, however, for a user to be able to use a non-shared application and still be able to view a shared application.

Also, various computer systems within a network may have differing display resolutions. For example, some computer systems may have a display resolution of 1024 by 768 pixels and other computer systems may have a display resolution of 640 by 480. Thus, it would be useful when sharing an application to accommodate the different display resolutions.

Furthermore, since the user of a shared application at the shadow computer system actually views the output in real time, it is important that the speed of transmission of the output data from the host to the shadow computer systems be optimized.

SUMMARY OF THE INVENTION

An aspect of the present invention is a Share System that provides a method for transmitting display orders (output data) from a host computer system to a shadow computer such that display orders whose visible effect is nullified by a subsequent display order is not transmitted. The Share System executes on both the host and shadow computer systems. The Share System that executes on the host computer system, receives a group of display orders. For each of the received display orders, the Share System determines whether the effect of the display order on the display would be visible after performing all of the display orders. When the effect of the display order on the display would be visible, the Share System transmits the display order to the shadow computer system such that the shadow computer system does not receive display orders that would have no visible effect after performing all of the display orders.

In another aspect of the present invention, the Share System provides a method for transmitting pixel data from a first computer system to a second computer system. The pixel data has a high pixel depth. The first computer system has a first translator for translating pixel data from the high pixel depth to a low pixel depth. The second computer system has a second translator for translating from the high pixel depth to a low pixel depth. The second computer system also has a display device for displaying pixel data in the low pixel depth. The Share System determines whether the first translator or the second translator performs a more accurate translation of the high pixel depth to the low pixel depth. When it is determined that the first translator performs a more accurate translation, the Share System translates the pixel data using the first translator from the high pixel depth to the low pixel depth and sends the pixel data in the low pixel depth from the first computer system to the second computer system. Upon receiving the sent pixel data in the low pixel depth at the second computer system, the Share System displays the pixel data in the low pixel depth. When it is determined that the second translator performs a more accurate translation, the Share System sends the pixel data in the high pixel depth from the first computer system to the second computer system. Upon receiving the sent pixel data in the high pixel depth at the second computer, the Share System translates the pixel data using the second translator from the high pixel depth to the low pixel depth and displays the pixel data in the low pixel depth.

In another aspect of the present invention, the Share System provides a method for transmitting data output from a first computer system to a second computer system. Under control of the second computer system, the Share System sends to the first computer system an identification of each font supported by the second computer system. Under control of the first computer system, the Share System receives the sent identifications of each font supported by the second computer system, receives a request to display text data in a specified font, and checks the received identifications to determine whether the second computer supports the specified font. When it is determined that the second computer system supports the specified font, the Share System sends the text data along with an identification of the specified font to the second computer system. When it is determined that the second computer system does not support the specified font, the Share System generates a bitmap representation of the text data in the specified font and sends the generated bitmap representation of the text data to the second computer program. Under control of the second computer system, the Share System upon receiving the sent text data and the identification of the specified font, displays the text data in the specified font, and upon receiving the sent bitmap representation of the text data, displays the bitmap representation.

In another aspect of the present invention, the Share System provides a method for transmitting representations of bitmaps from a first computer system to a second computer system. The Share System caches bitmaps that are sent twice from the first to the second computer system. After caching a bitmap, the Share System sends an indication of the bitmap that is cached, rather than the bitmap itself.

In another aspect of the present invention, the Share System provides a method in a computer system for compressing a bitmap. The bitmap is organized into rows with a number of bits. The Share System first outputs a run-length encoding of the first row of data. For each row of the bitmap except for the first row, the Share System generates an interim row with the number of bits by setting the bit value of each bit in the interim row to the exclusive-OR of a corresponding bit in the row and of a corresponding bit in a previous row, and outputs a run-length encoding of the interim row of data.

BRIEF DESCRIPTION OF THE DRAWINGS

FIGS. 21A–21D illustrate the order encoding process of the Share System.

FIGS. 24A–24C illustrate differential encoding of screen data.

DETAILED DESCRIPTION OF THE INVENTION

Figure 1:
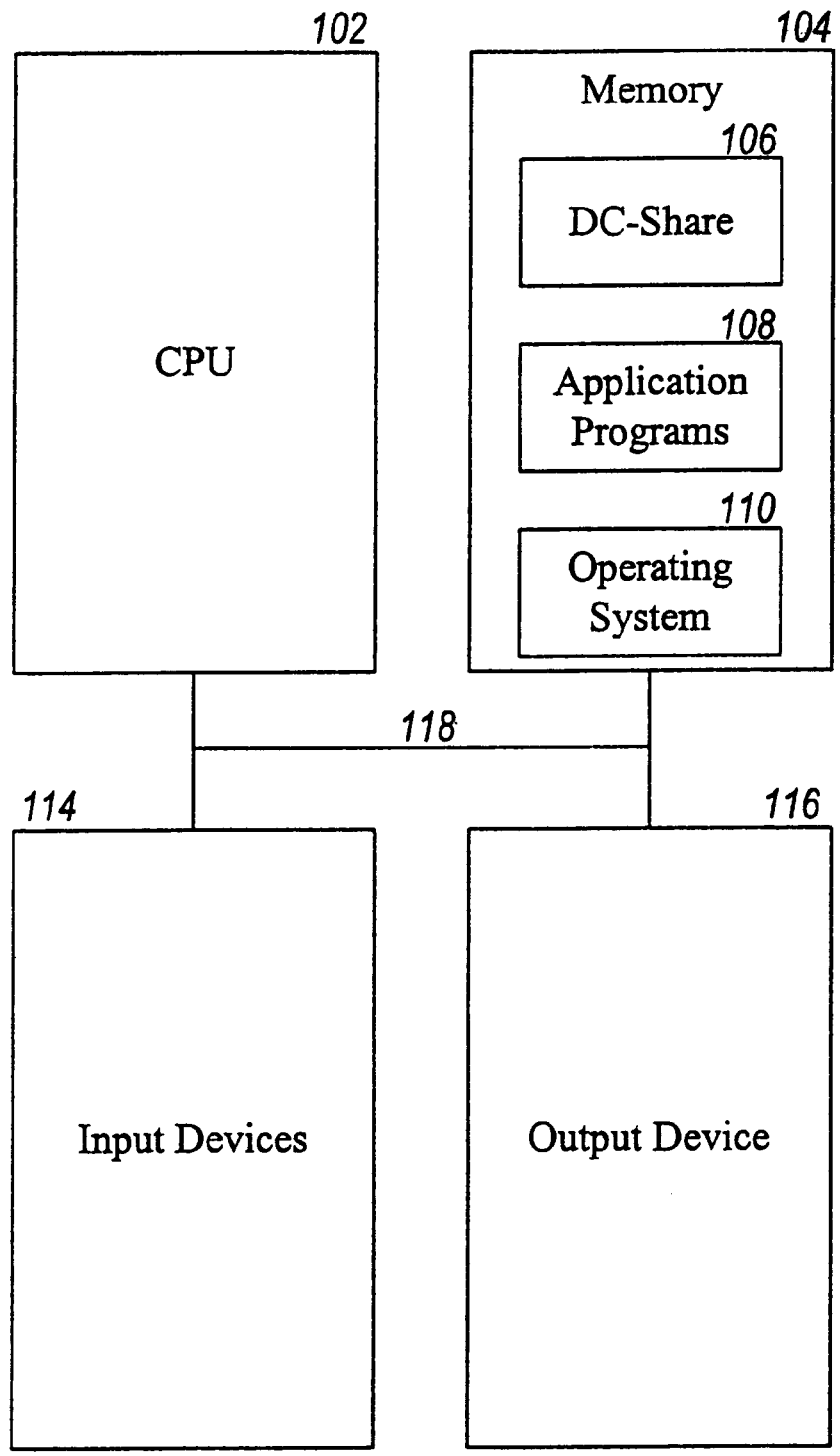
FIG. 1 is a block diagram of a computer system on which the Share System executes.

FIG. 1 is a block diagram of a computer system on which the Share System executes. The computer system includes a central processing unit (CPU) 102, a memory 104, input devices 114, and an output device 116. The input devices are preferably a keyboard and a mouse, and the output device is preferably a display device, such as a CRT. The CPU, memory, input devices, and output device are interconnected by bus 118. The memory contains application programs 108, the Share System 106, and an operating system 110. In a preferred embodiment, the operating system is Windows of Microsoft Corporation. The architecture of the Windows operating system is fully described in "Programming Windows 3.1" by Charles Petzold, Microsoft Press, 1992, which is hereby incorporated by reference.

Figure 2:
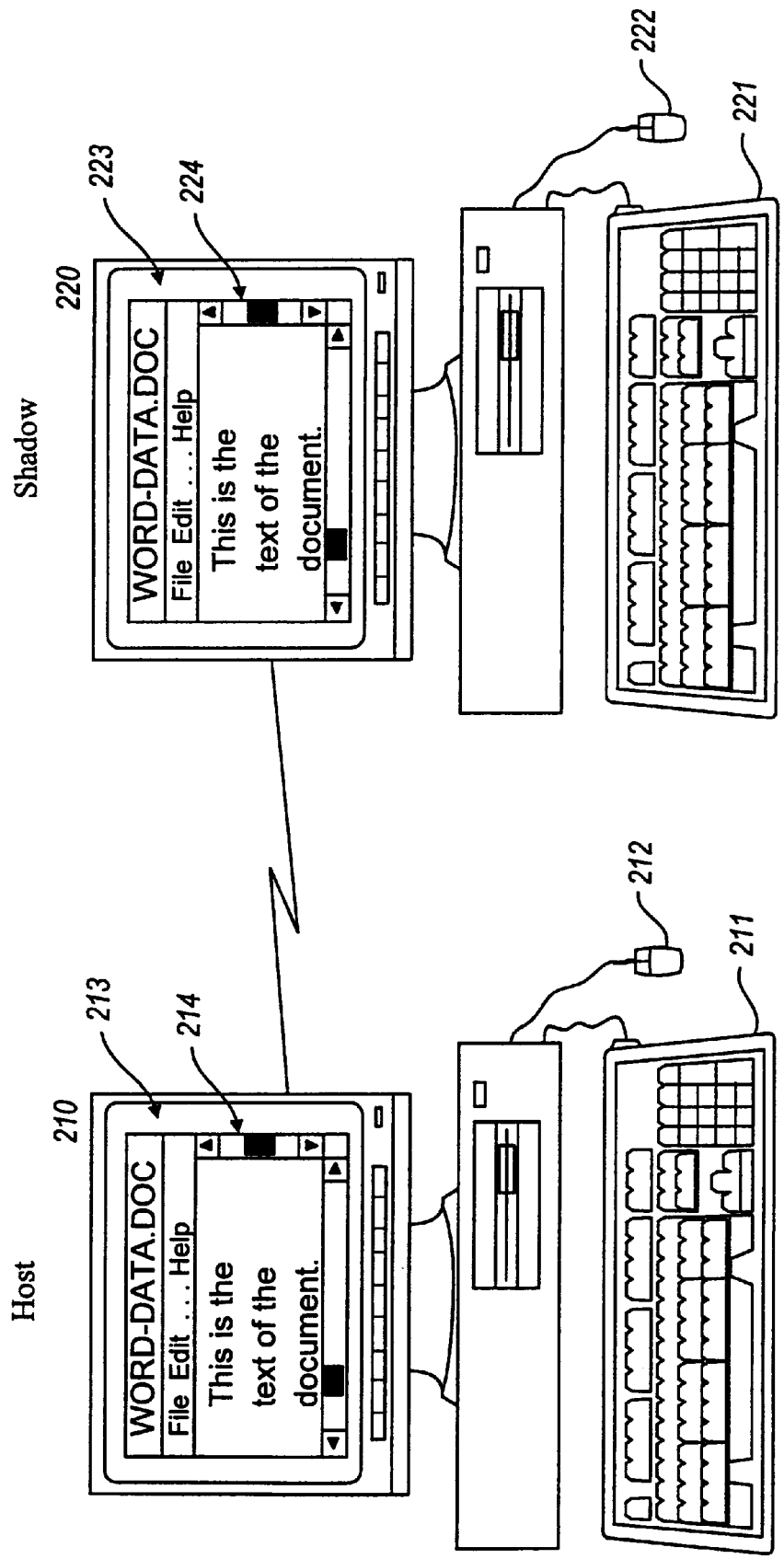
FIG. 2 is a diagram illustrating the sharing of an application program under control of the Share System.

FIG. 2 is a diagram illustrating the sharing of an application program under control of the Share System. The host computer system 210 includes a keyboard 211, a mouse 212, and a display 213. The display 213 shows the host window 214 for the application program that is being shared (the "shared application"). In this example, the application program entitled "WORD" is being shared and is executing on the host computer system. The data of the shared application output is being displayed in a host window 214. The Share System intercepts the output data of the shared application that is directed to the host window 214. The Share System transmits the intercepted output data to the shadow computer system 220. The Share System also forwards the intercepted output data to the operating system of the host computer system to be displayed in a normal manner within host window 214. The shadow computer system includes a keyboard 221, a mouse 222, and a display 223. When the shadow computer system receives the intercepted output data, the Share System of the shadow computer system creates a shadow window 224 that corresponds to the host window 214 and that is registered with the operating system of the shadow computer system. The Share System then forwards the intercepted output data to operating system of the shadow computer system for display in the shadow window 224. Thus, all output data of the shared application is displayed on both the host and shadow computer systems.

In addition, the Share System allows a user of either the host computer system or the shadow computer system to input data to the shared application. A user inputs data by first "taking control" of the shared application. For example, a user of the shadow computer system can click a mouse button to take control of the shared application. The user can then enter data using keyboard 221. The Share System of the shadow computer system intercepts the input data and transmits the input data to the Share System of the host computer system. The Share System of the host computer system forwards intercepted input data to the operating system of the host computer system, which sends the input data to shared application for processing as if the input data had been entered on keyboard 211. When the shared application outputs data to host window 214 in response to receiving the input data, the Share System of the host computer system intercepts the output data and transmits the intercepted output data to the Share System of the host computer system, which updates shadow window 224 as described above. Similarly, when a user of the host computer system takes control and inputs data through keyboard 211 or mouse 212, the Share System of the host computer system forwards the input data to the operating system of the host computer system, which sends the input data to the shared application for processing as normal. Thus, to a user of the shadow computer system, the shared application looks as though it is executing on the shadow computer system.

Figure 3:
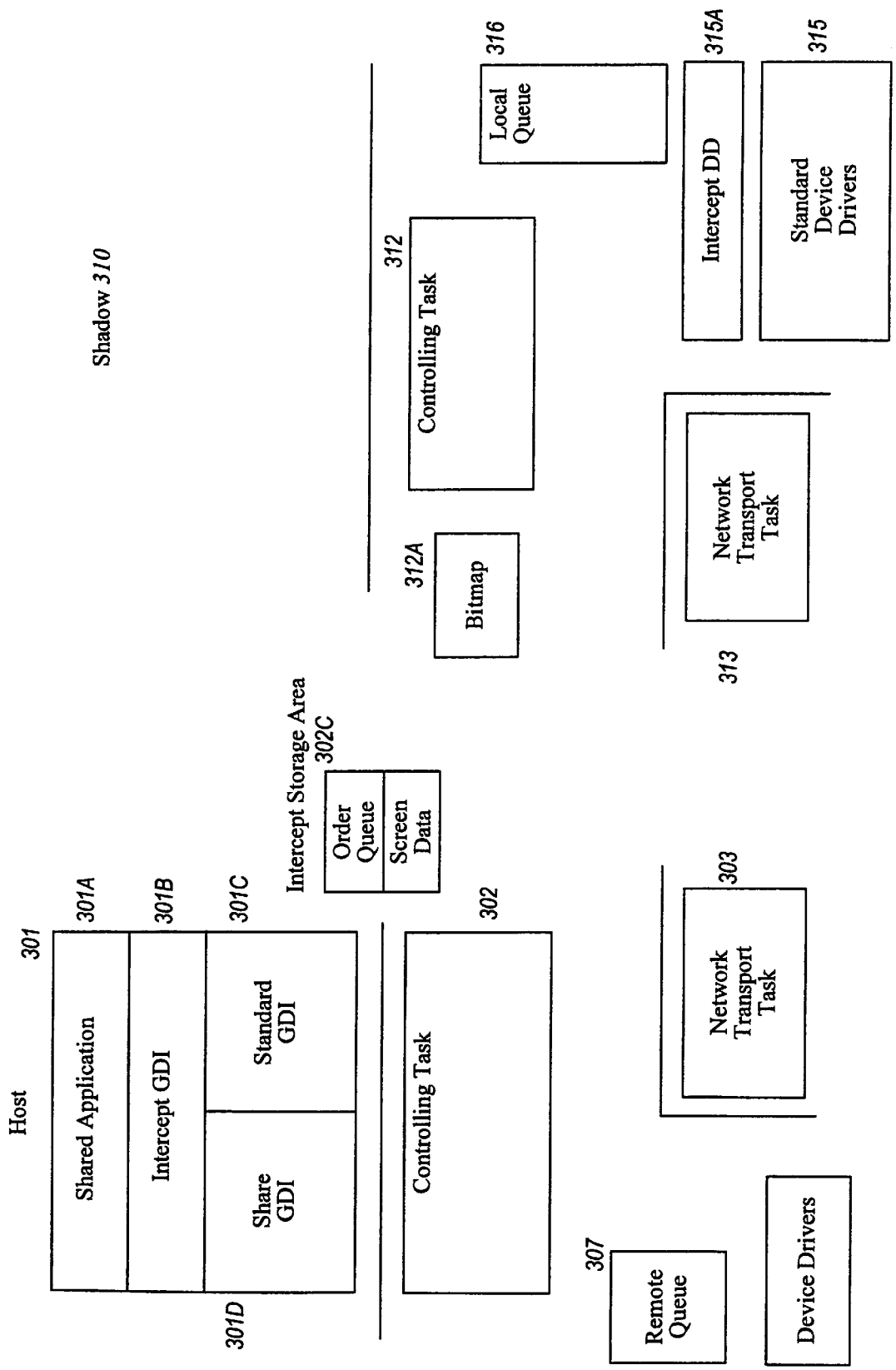
FIG. 3 is a block diagram of the architecture of the Share System executing on both the host and shadow computer systems.

FIG. 3 is a block diagram of the architecture of the Share System executing on both the host and shadow computer systems. The function of the Share System is divided into three tasks that execute on the host computer system and two tasks that execute on the shadow computer system. On the host computer system, the first task corresponds to the execution of the shared application 301, the second task corresponds to the execution of a controlling task 302, and the third task corresponds to the execution of a network transport task 303. When the Share System is initially installed on the host computer system, the Share System inserts various hooks in the operating system to allow the Share System to intercept input and output data and to forward intercepted data to the operating system.

In the following, an overview of aspects of the preferred operating system is described that relate to the installation of the hooks. In the described embodiment, the hooks are installed on a computer system operating under the control of the Windows operating system. Other operating systems typically provide mechanism for intercepting input and output data. Thus, one skilled in the art would appreciate that the principles of the present invention can be used in conjunction with differing operating systems. The Windows operating system provides a standard graphical device interface (GDI) layer, which is used by applications to output data to display devices, and a standard device driver (DD) layer, which is used to handle device interrupts. The standard GDI layer provides various functions that can be called by an application program to output data to a display device. For example, the standard GDI layer may provide a function for displaying a specified string of text at a specified display location in a specified font. The standard GDI layer is typically linked at run time into the address space of each application program that calls its functions. The standard DD layer provides various device drivers to handle interrupts and to forward input data to the operating system.

To intercept output data, the Share System installs an intercept GDI layer 301B in place of the standard GDI layer 301C provided by the operating system. The intercept GDI layer provides an intercept function for each function of the standard GDI layer. Each intercept function has a prototype that is identical to the prototype of the corresponding standard function. In this way, a shared application 301A (actually all applications whether shared or not) is linked to the intercept GDI layer when the application is loaded, rather than the standard GDI layer. Thus, all calls directed to the standard GDI layer are actually calls to the intercept GDI layer. The called intercept GDI function either calls to the corresponding standard GDI function or calls a share GDI layer 301D provided by the Share System. The share GDI layer contains a function for each function of the standard GDI layer that the Share System needs to intercept. (The Share System would not need to intercept a GDI function that only returns status information.) The share GDI functions store data describing the called GDI function and its parameters in an intercept storage area 302A. The share GDI function also invokes the corresponding standard GDI function to the output data to the host window.

Periodically, the controlling task 302 receives control. The controlling task retrieves the data stored on the intercept storage area and packets the data for transmission to the shadow computer system. The packeted data is forwarded to the network transport task 303. The network transport task 303 then transmits the packeted data to the shadow computer system 310. The network transport task 313 of the shadow computer system receives the packeted data and forwards it to the controlling task 312 of the shadow computer system, which unpackets the data and controls the displaying of the output data in the shadow window.

To support displaying the output data, the shadow computer system maintains a shadow bitmap 312A. The shadow bitmap contains an in memory copy of the shared window of the host computer system. All updates to the host window are reflected in both the shadow bitmap and the shadow window. The shadow bitmap is used for handling "paint" messages received from the operating system of the shadow computer system. The operating system sends a paint message to a window (via a window procedure for the window) whenever a portion of the window that was previously obscured and has now become visible. The window is responsible for repainting the now visible portion. Thus, whenever a paint message is received by the shadow window, the shadow window retrieves the output data for the repaint from the shadow bitmap. Thus, when the controlling task receives output data it stores the data in the shadow bitmap and notifies the operating system that the displayed shadow window (or a portion of it) is no longer valid. The operating then generates a "paint" message that is sent to the shadow window. When the shadow window receives the paint message, the shadow window is updated.

The Share System installs an intercept DD layer 315A to intercept calls from the standard DD layer 315 to the operating system. When a user of the shadow computer system inputs data for the shared application, the standard device driver for the input device is executed which calls the intercept DD layer. The intercept device driver stores the input data into a local queue and forwards the interrupt to the operating system to process the input data as normal by generating a message to send to the shadow window describing the input data. The controlling task intercepts all messages generated by the operating system that are directed to an application program. When a message is intercepted that is directed to the shadow window, the controlling task 312 retrieves the corresponding input data from the local queue that caused the intercepted message to be generated. The controlling task then packets the input data and forwards the packeted input data to the network transport task 313. The network transport task then transmits the packeted input data to the network transport task 303 of the host computer system. The network transport task 303 forwards those packeted input data to the controller task 302 of the host computer system. The controlling task stores the input data in a remote queue 307. The controlling task 302 retrieves the input data from the remote queue 307 forwards the input data to the operating system. The operating system then generates messages corresponding to the input data and sends the messages to the host window. In this way, the shared application treats input data entered on the shadow computer system as if they were generated locally at the host computer system.

Figure 4:
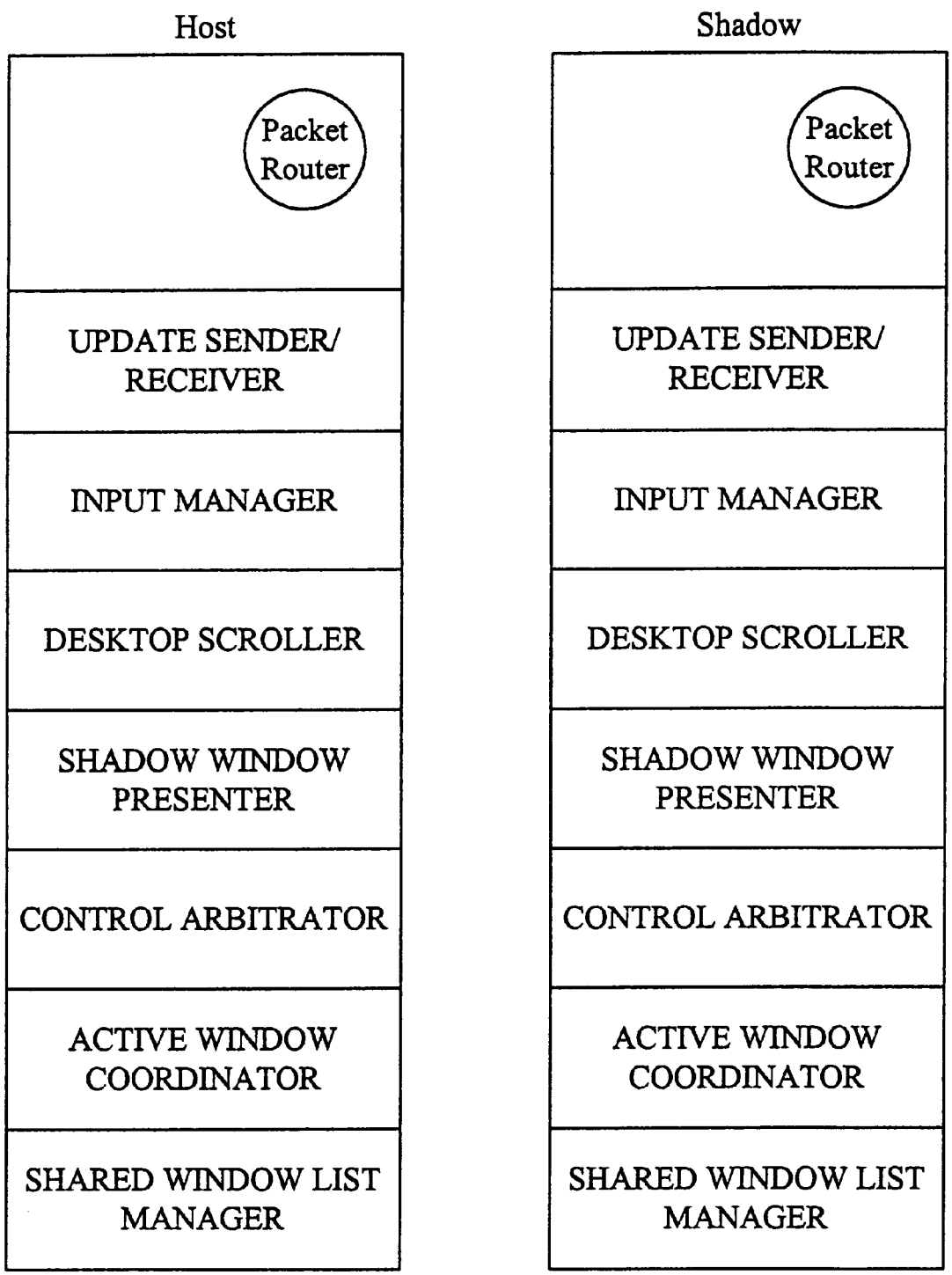
FIG. 4 is a block diagram illustrating the components of the controlling tasks

FIG. 4 is a block diagram illustrating the components of the controlling tasks. The controlling tasks contain several components: a packet router, update sender/receiver, input manager, desktop scroller, shadow window presenter, control arbitrator, active window coordinator, and shared window list manager. Since the Share System on both the host computer system and the shadow computer system have the same components, the computer systems can function as both a host computer system and a shared computer system simultaneously. That is, a computer system can be executing a shared application and displaying a shadow window of another shared application program that is executing on a another computer system. The network transport task receives network messages and forwards the message to the packet router. The packet router processes messages relating to input and output data by invoking the appropriate other components to handle the messages. The patent application U.S. patent application Ser. No. 08/498,940 filed on Jul. 5, 1995, entitled "Method and System for Sharing Applications Between a Host Computer System and a Shadow Computer System," now U.S. Pat. No. 5,874,960 issued on Jan. 26, 1999, describes these components in more detail, and is hereby incorporated by reference.

Figure 5:
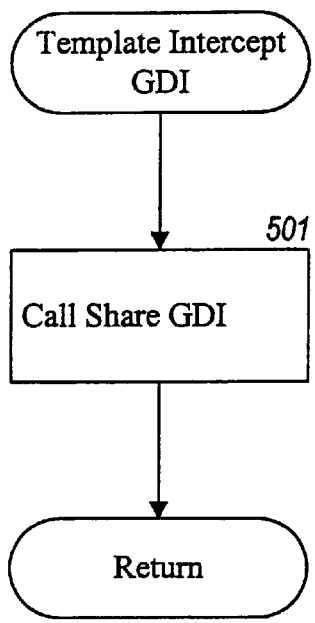
FIG. 5 is a flow diagram of a template for the intercept GDI functions.

FIG. 5 is a flow diagram of a template for the intercept GDI functions. For each function of the standard GDI layer, the intercept GDI layer contains a corresponding function with the same prototype. The intercept GDI functions either invoke the corresponding share GDI function or standard GDI function. If the Share System needs to intercept the GDI function, then the intercept GDI function invokes the share GDI function passing the parameters it was passed. Otherwise, the intercept GDI function invokes the standard GDI function passing the parameter it was passed. The intercept GDI function then returns.

Figure 6:
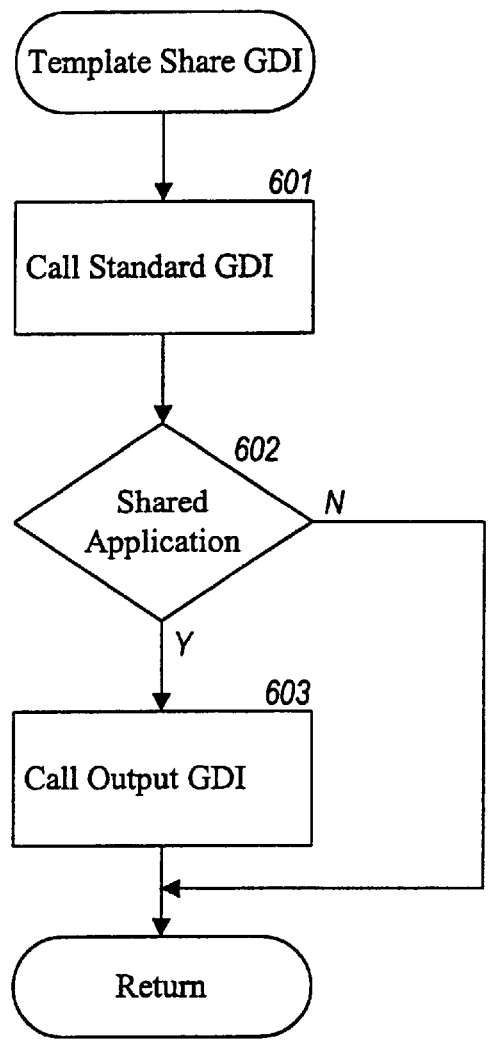
FIG. 6 is a flow diagram of a template for the share GDI functions.

FIG. 6 is a flow diagram of a template for the share GDI functions. The share GDI functions store output data in the intercept storage area in the form of "orders" or "screen data" and call the corresponding standard GDI function to send the output data to the host window as normal. In step 601, the share GDI function invokes the corresponding standard GDI function passing the parameters that it was passed. In step 602, if the GDI function is being invoked by a shared application, then the function continues at step 603, else the function returns. Recall that since the intercept GDI layer replaces the standard GDI layer all applications are linked into the intercept GDI layer whether shared or not. In step 603, the share GDI function calls the Output GDI routine, which stores output data in the intercept storage area and returns.

Figure 7:
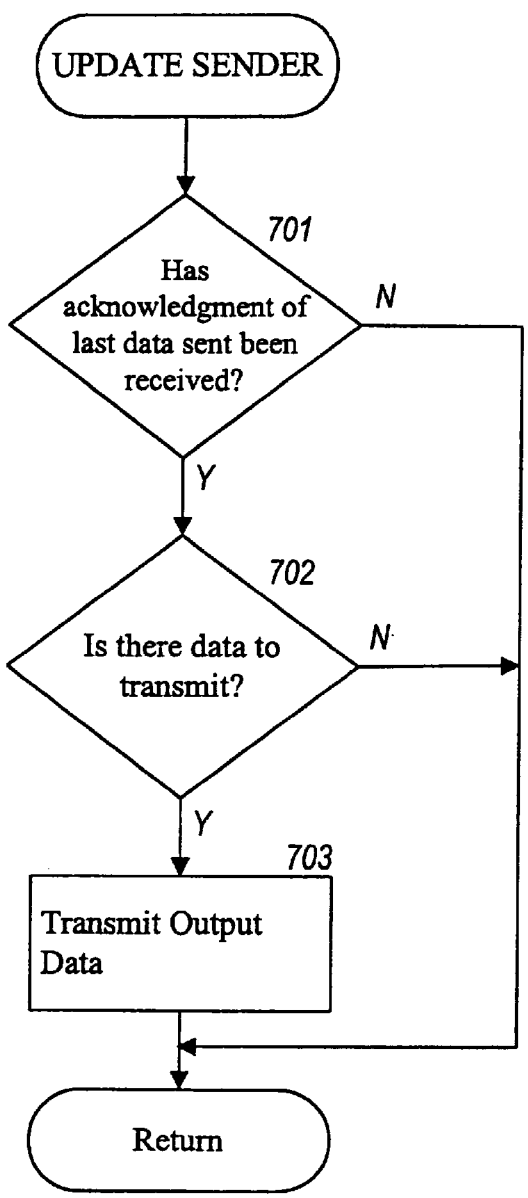
FIG. 7 is a flow diagram of the Update Sender portion of the Update Sender/Receiver component.

FIG. 7 is a flow diagram of the Update Sender portion of the Update Sender/Receiver component. The controlling task receives control periodically and invokes the Update Sender. The Update Sender retrieves the output data from the intercept storage area, prepares the output data for transmission, and forwards the prepared output data to the network transport layer for transmission to the shadow computer system. The Update Sender ensures that the last output data was transmitted to the network by the network transport layer. Thus, the Share System ensures that the intercept storage area is not flushed too quickly so that the data can be optimized before transmission. In step 701, if an acknowledgment has been received for the last output data transmitted, then the Update Sender continues at step 702, else the Update Sender returns. In step 702, if there is output data in the intercept storage area to transmit, then the Update Sender continues at step 703, else the Update Sender returns. In step 703, the Update Sender invokes the Transmit Output Data routine and returns. The Transmit Output Data routine prepares the output data by compressing and encoding the output data before transmitting to the shadow computer system.

Figure 8:
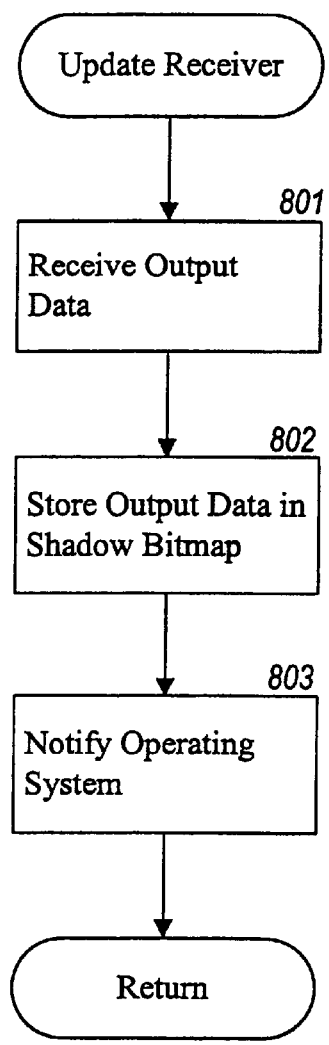
FIG. 8 is a flow diagram of the Update Receiver portion of the Update Sender/Receiver component.

FIG. 8 is a flow diagram of the Update Receiver portion of the Update Sender/Receiver component. The controlling task receives control periodically and the packet router calls the Update Receiver when output data is received. In step 801, the Update Receiver calls the Receive Output Data routine to retrieve the output data received by the network transport task of the shadow computer system. The Receive Output Data routine decodes and decompresses the transmitted output data. In step 802, the Update Receiver stores the output data in the shadow bitmap. In step 803, the Update Receiver notifies the operating system that a portion of the Shadow window is invalid and returns.

Storing Intercepted Output Data

The Share System, upon intercepting a GDI function, stores the output data representing the GDI function and its parameters in the intercept storage area. The Share System translates the GDI function call to either "orders" or "screen data" that represent the GDI function call. An order represents an output data request, such as, to display a specified text string at a specified display location in a specified font. Screen data represents a bitmap within the host window. The intercept storage area contains an order queue for queuing the orders and a screen list for storing references to the screen data in the host window. Each GDI function call is translated into corresponding orders to be performed by the shadow computer system. If the shadow computer system cannot support the orders corresponding to a GDI function call or if the GDI function call is too complex, then the output data corresponding to the GDI function call is represented by screen data. The screen data represents that portion of the host window that is affected by the GDI function call. For example, if the shadow computer system does not support the same font as specified in a GDI function call to display text, then the Share System translates the GDI function call to a reference to screen data and stores the reference in the screen list. If the shadow computer system does support the font, then an order is placed in the order queue.

Figure 9A:
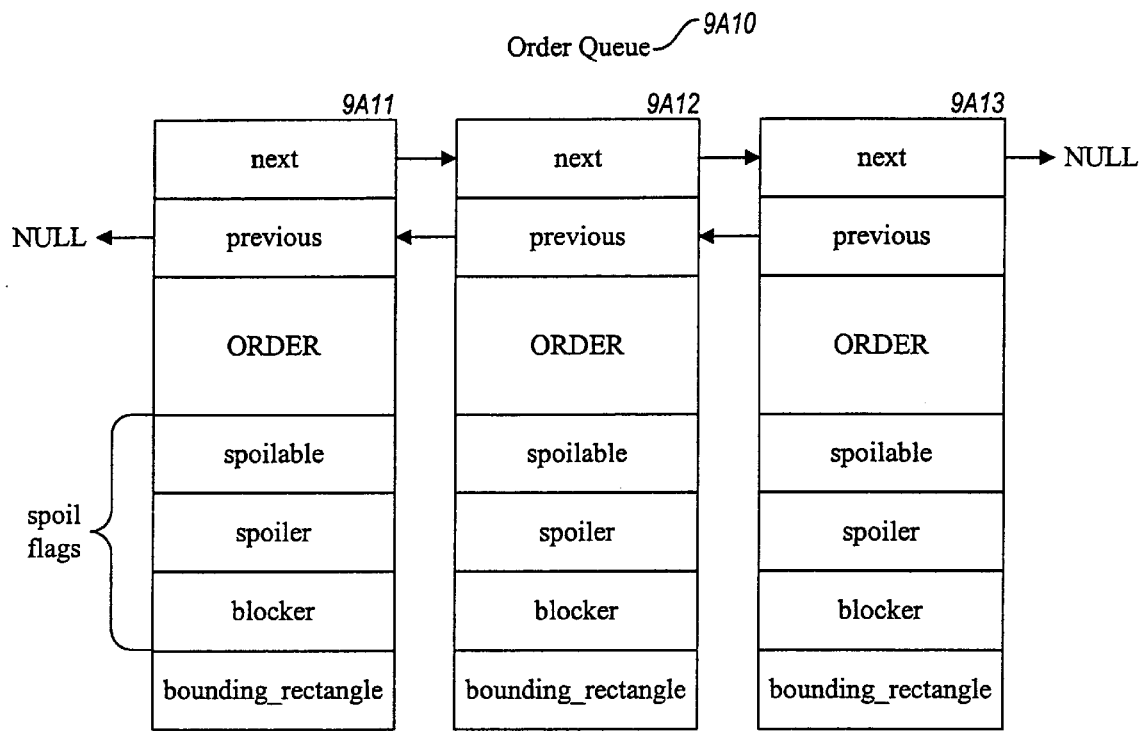
FIG. 9A is a block diagram illustrating the order queue and the screen list
Figure 9A:
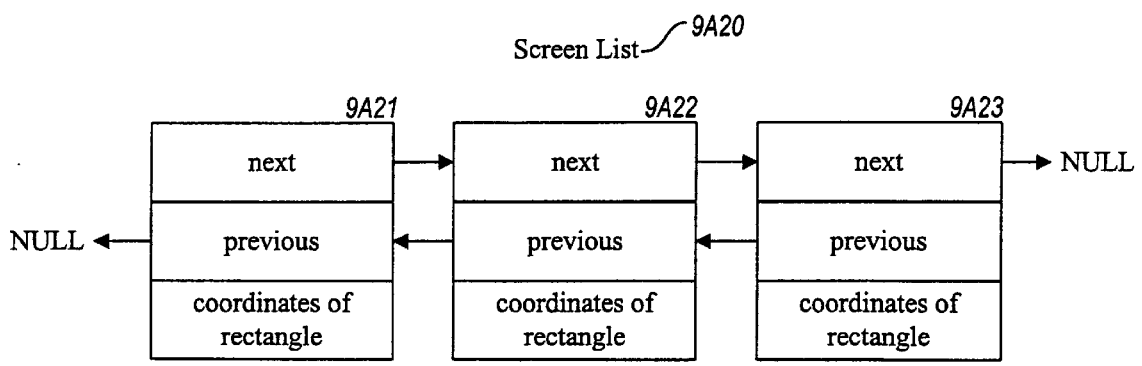

FIG. 9A is a block diagram illustrating the order queue and the screen list. The order queue 9A10 contains order entries 9A11, 9A12, and 9A13 that represent orders that have not yet been transmitted to the shadow computer system. Each entry in the order queue contains an order field, a set of spoil flags, and the coordinates of the bounding rectangle affected by the order. The order field is subdivided into an order type and various subfields. The order type indicates the type of the order to be performed (e.g. display text). The subfields are the parameters for the order. For example, the parameters for display text order would include a pointer to the text to display, the location at which to display the text, and an indication of the font in which to display the text.

The screen list 9A20 contains an entry 9A21, 9A22, and 9A23 for each screen data that is not yet transmitted to the shadow computer system. The screen list entries contain the coordinates of the screen data within the display bitmap.

Before adding entries to either the order queue or the screen list, the Share System attempts to optimize the data stored in the entries so as to minimize data transmission. For example, if screen data added to the screen list completely encompasses screen data already in the screen list, then the screen list entry corresponding to the encompassed screen data is removed from the screen list. An order or screen data that has not yet been transmitted and whose visual effect is completely overwritten by a subsequent GDI function call is referred to as "spoiled." Similarly, if screen data already in the screen list would be partially overlapped, then the overlapped portion can be removed from the screen data.

Figure 9B:
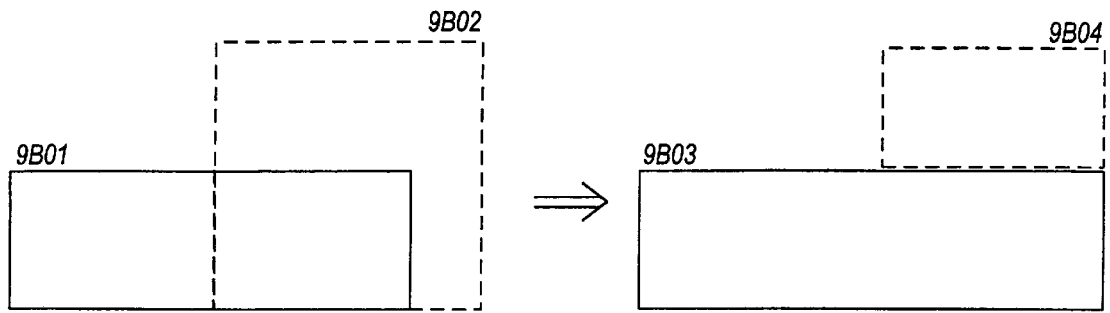
FIGS. 9B through 9J illustrate examples of optimizing order and screen list entries.
Figure 9B:
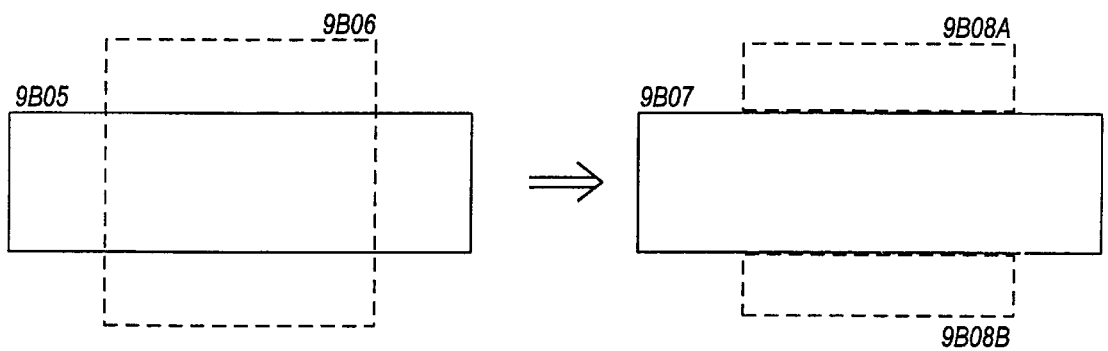

FIGS. 9B through 9J illustrate examples of optimizing order entries and screen list entries. FIG. 9B illustrates the optimization of screen list entries that are partially overlapping. The rectangles in the solid lines indicate screen data currently in the screen list, and the rectangles in the dashed lines indicate screen data to be added to the screen list. Screen data 9B01 represents screen data currently in the screen list, and screen data 9B02 represents screen data to be added to the screen list. Screen data 9B01 is partially overlapped by screen data 9B02. To optimize the transmission of screen data 9B01 and 9B02, the Share System adjusts the screen list entry for screen data 9B01 to that shown by screen data 9B03, and adjusts screen data 9B02 to that shown by screen data 9B04. The Share System then adds a screen list entry for screen data 9B04. As a result, no screen data that is overlapped is transmitted to the shadow computer system. Alternatively, the Share System could have added a screen list and entry for 9B02 in its entirety, and truncated the screen list entry for the screen data 9B01. Screen data 9B05 also represents screen data currently in the screen list, and screen data 9B06 represents screen data to be added to the screen list. Screen data 9B05 is partially overlapped by screen data 9B06. To optimize the transmission, the Share System divides screen data 9B06 into screen data 9B08A and 9B08B, which are portions that do not overlap screen data 9B05. Alternatively, the Share System could transmit screen data 9B06 in its entirety and divide screen data 9B05 into the non-overlapped portions.

Figure 9C:
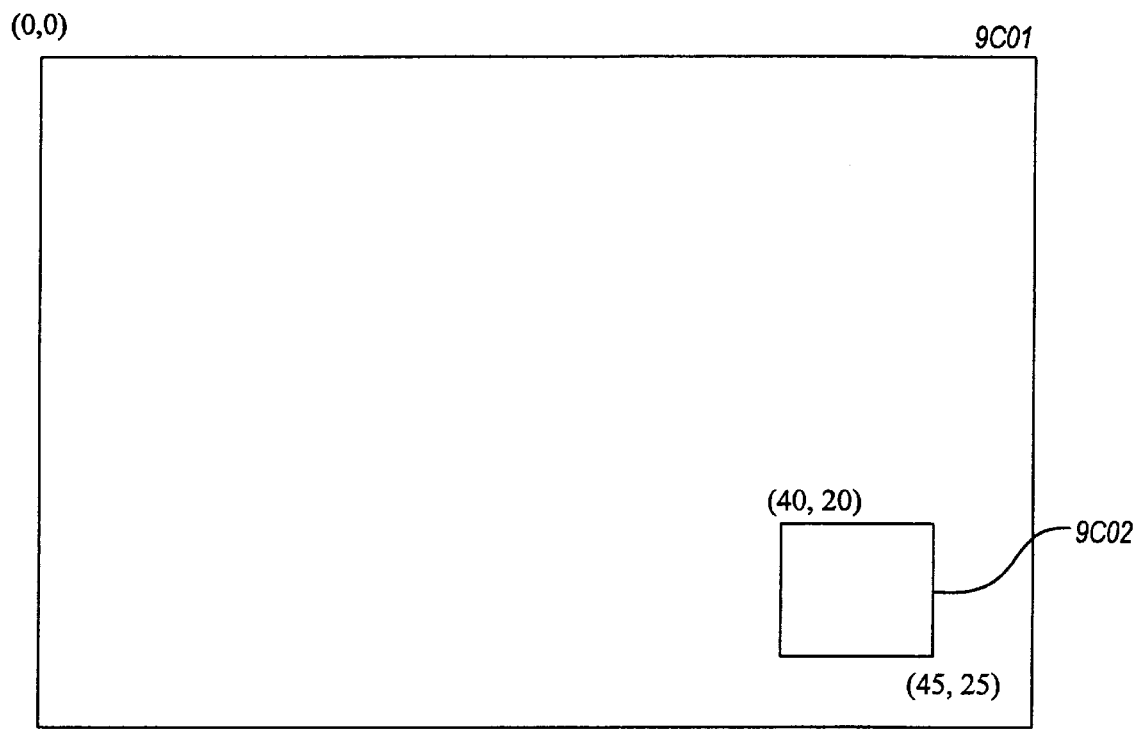
Figure 9C:
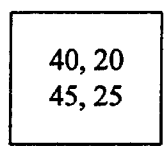
Figure 9D:
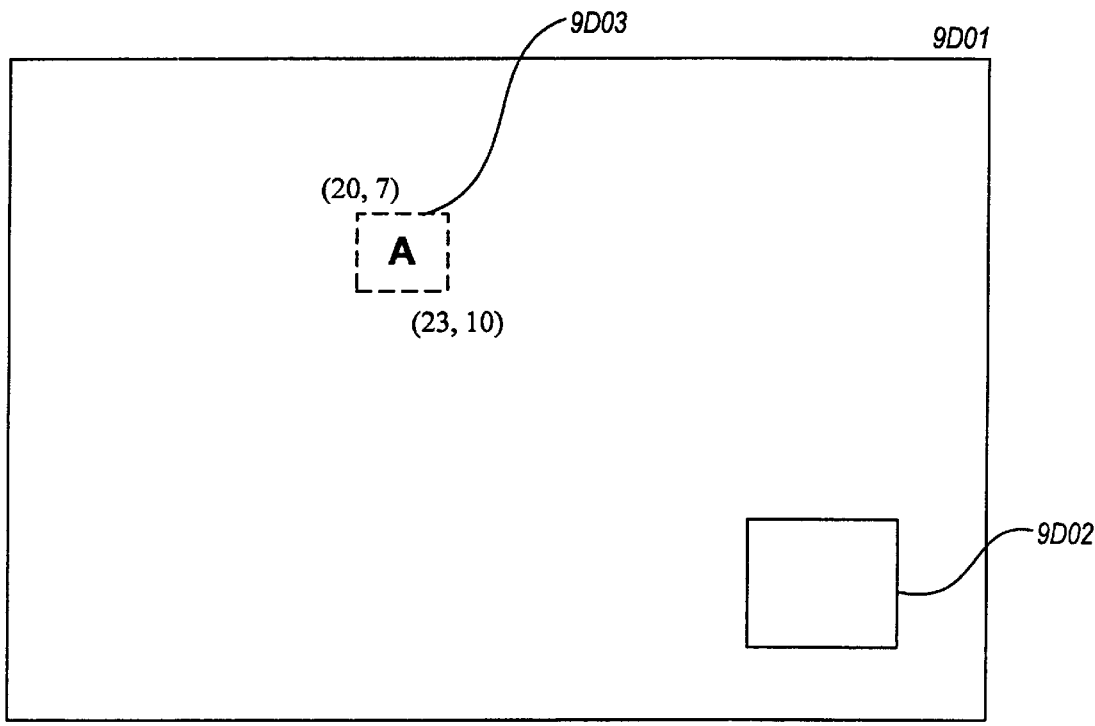

FIGS. 9C through 9J illustrate further optimizations performed by the Share System. The optimizations included removing spoiled orders, that is, orders that are completely overwritten by subsequent orders or completely within screen data in the screen list. In FIG. 9C, the bitmap 9C01 represents a 50×30 pixel host window. The screen data within the bounding rectangle 9C02 is to be transmitted to the shadow computer system. Thus, the screen list contains an entry with the coordinates for the bounding rectangle 9C02. FIG. 9D illustrates that a GDI function to display the letter "A" has been called. The letter "A" is stored in the bitmap 9C01 in the bounding rectangle 9C03. The order queue contains an entry corresponding to the letter "A".

Figure 9E:
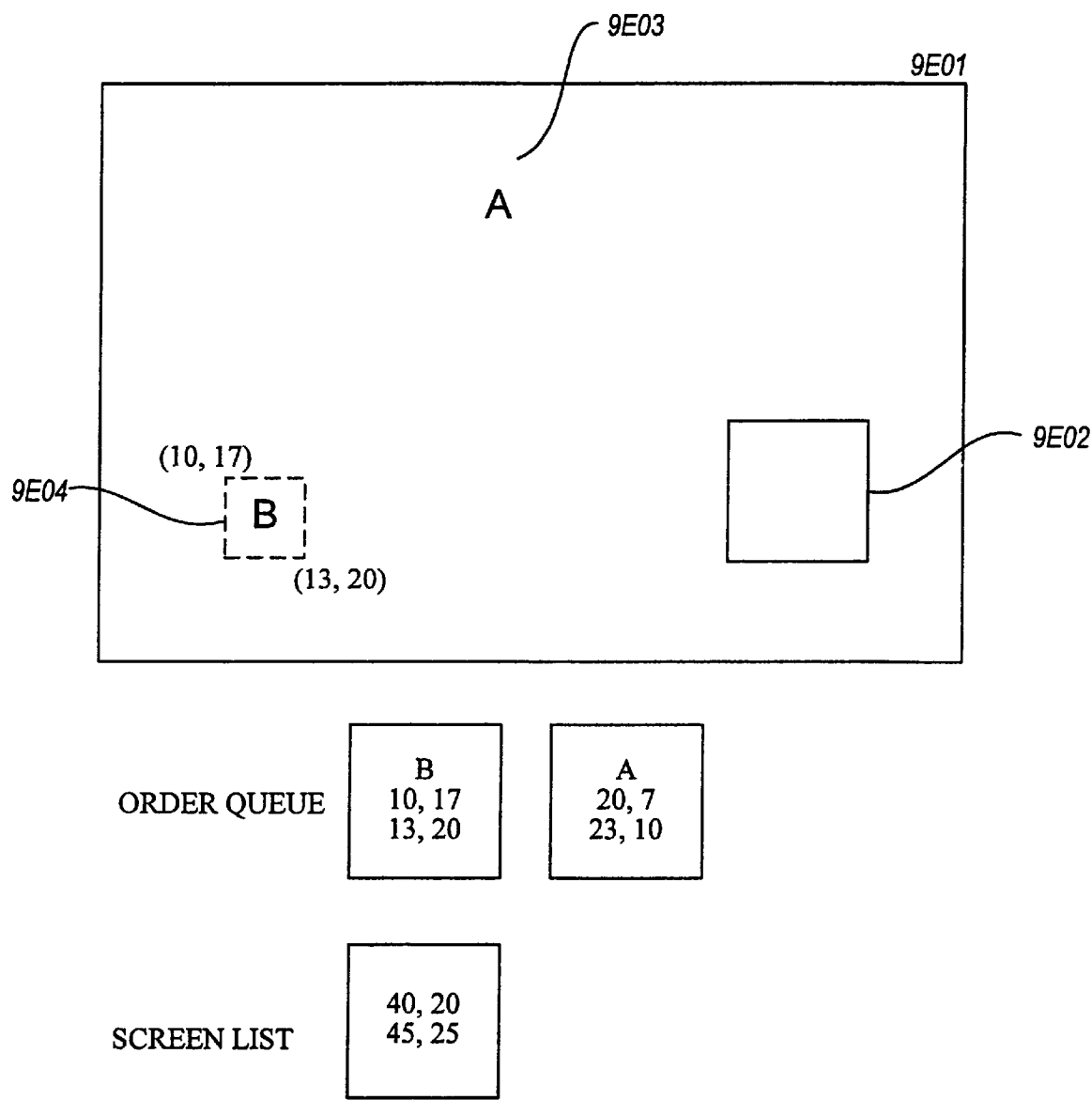
Figure 9F:
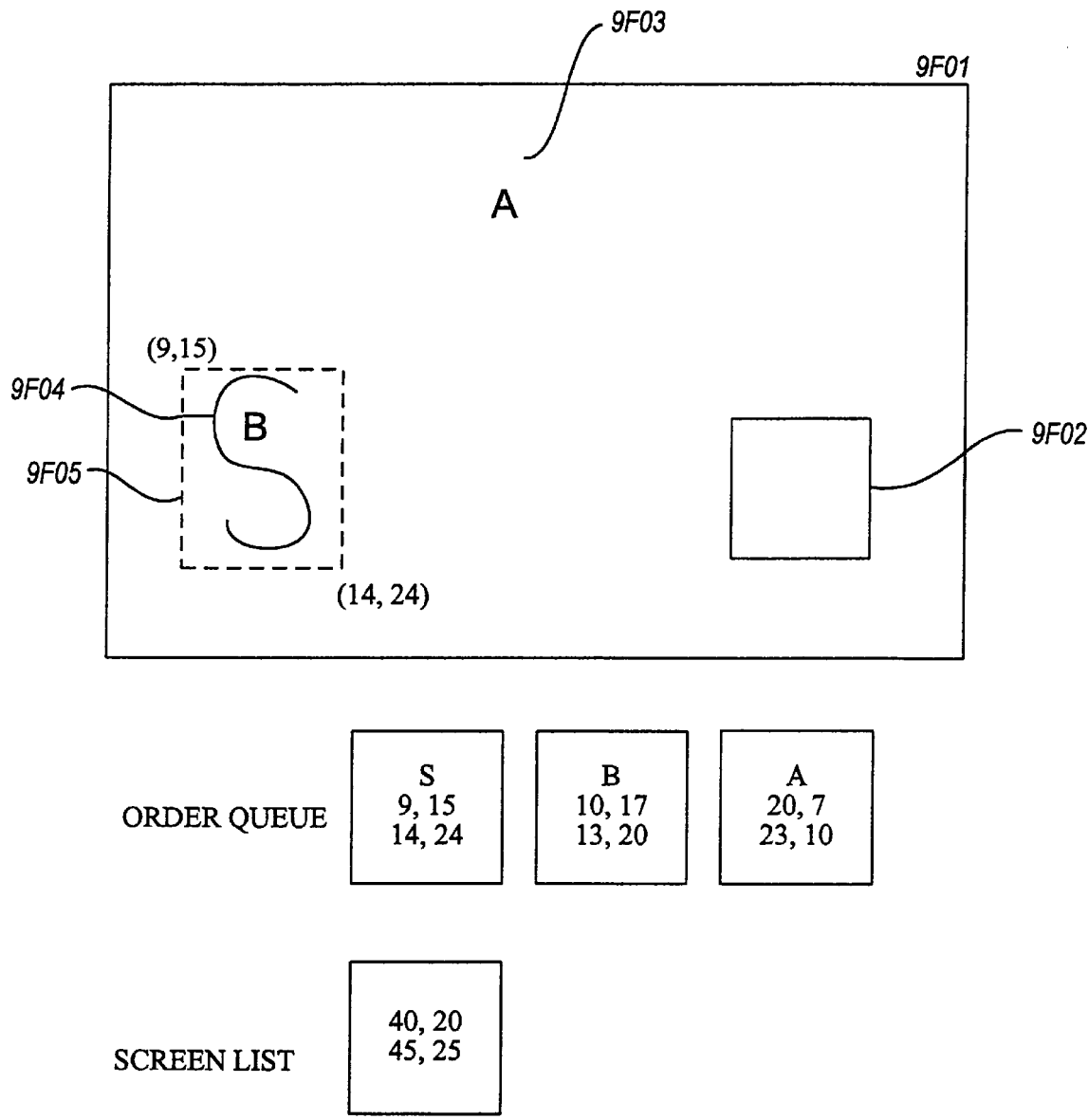
Figure 9G:
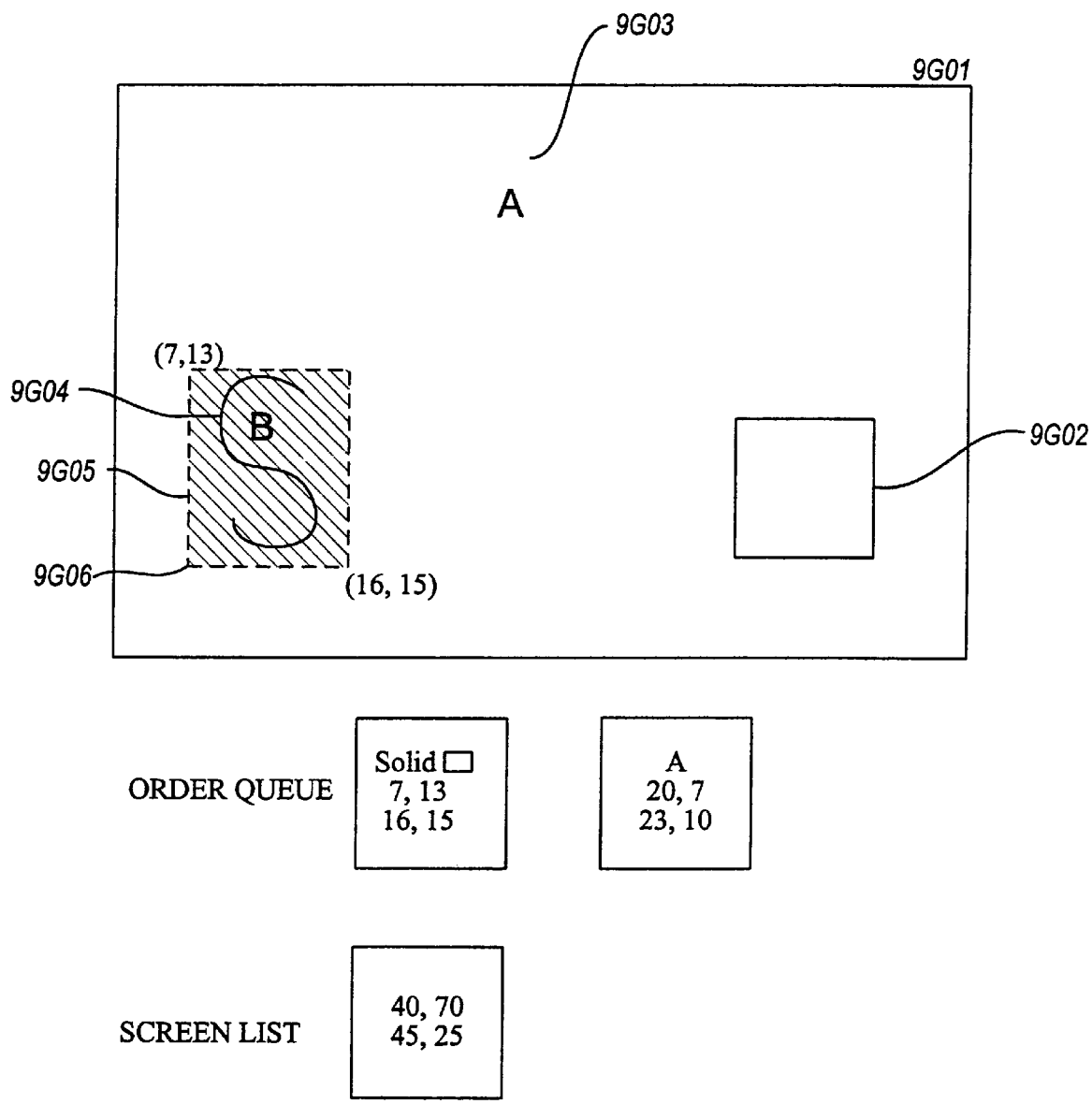
Figure 9H:
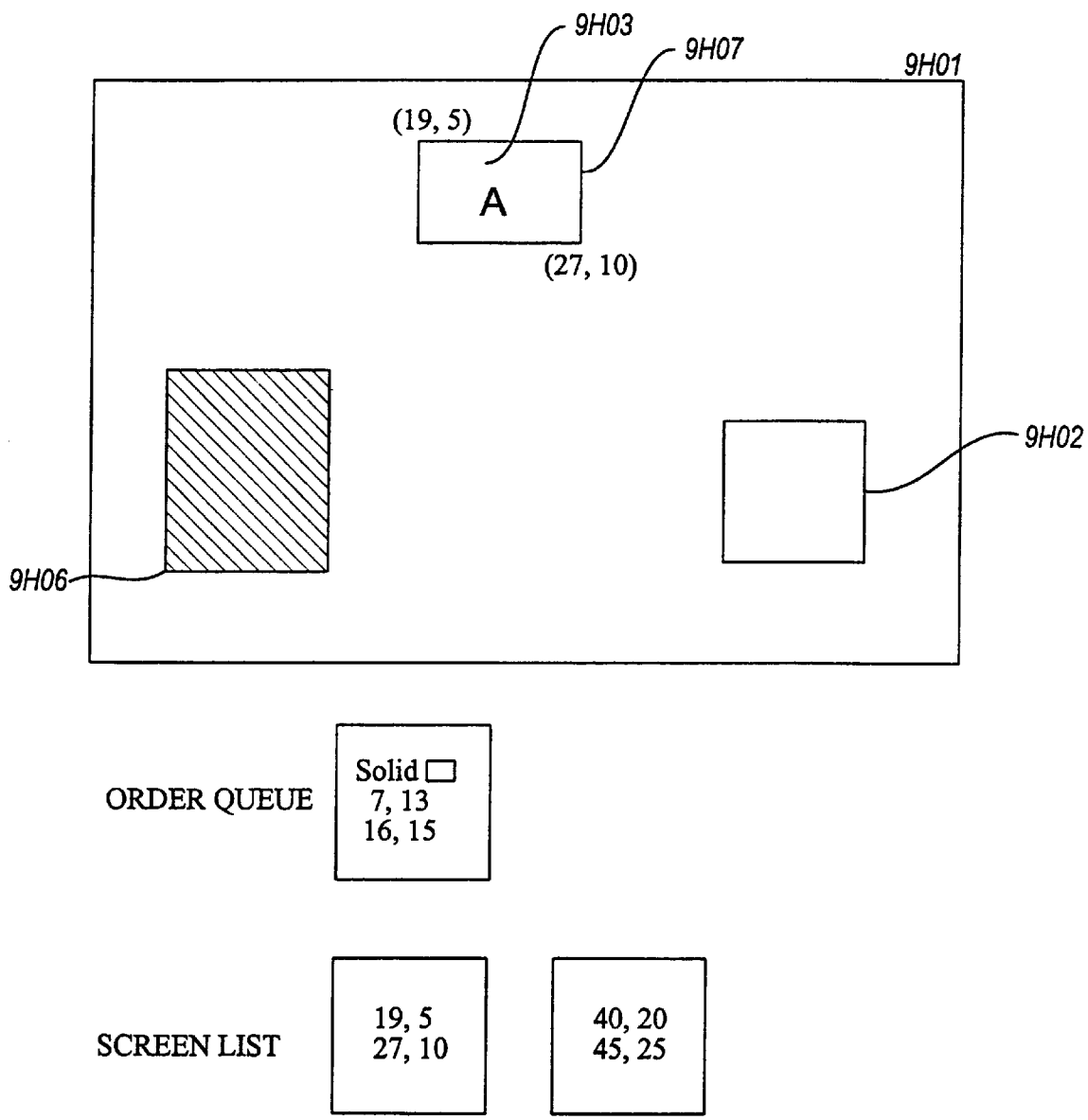
Figure 9I:
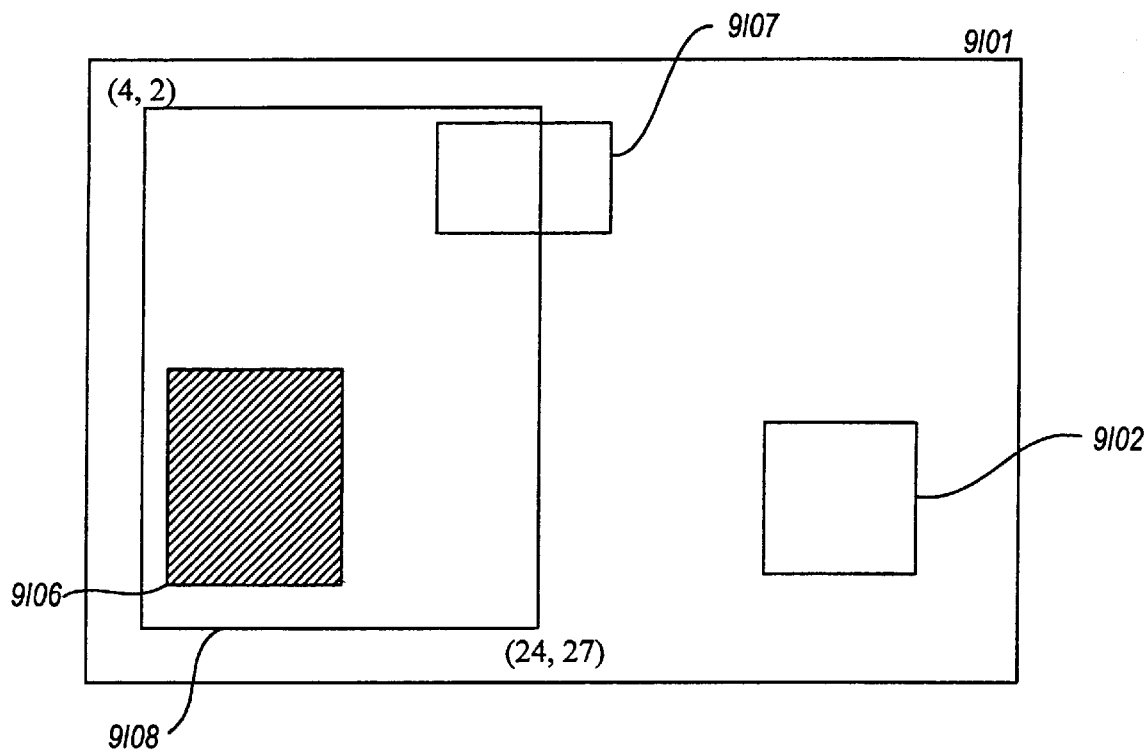
Figure 9J:
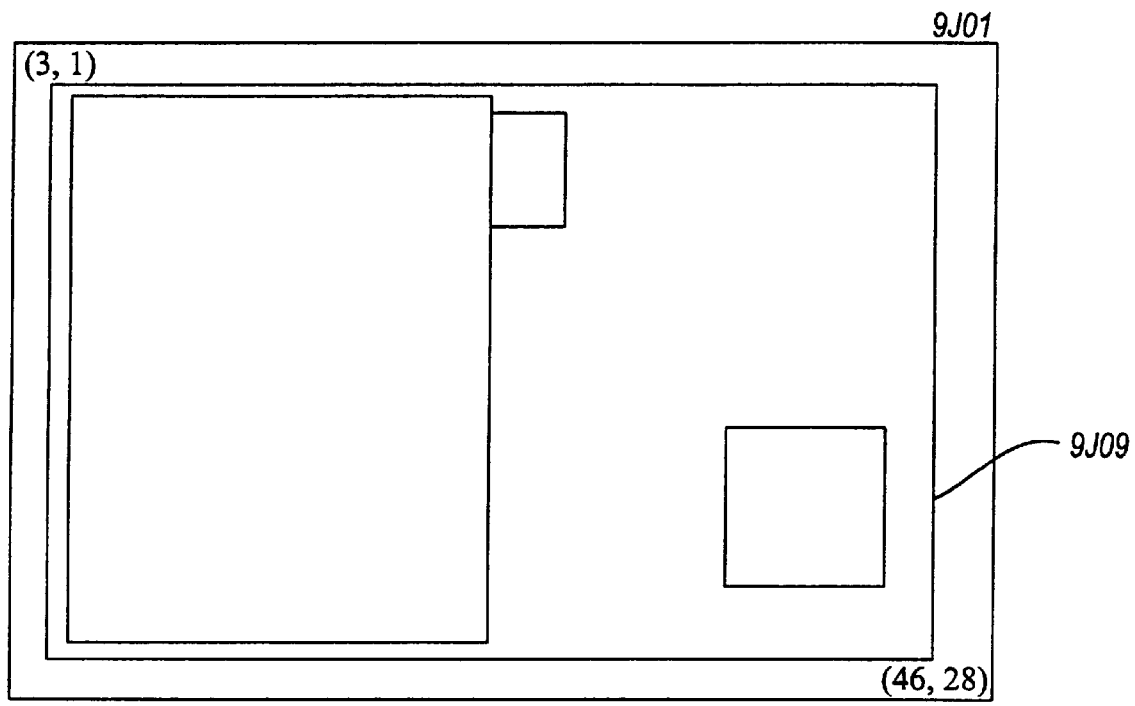
Figure 9J:
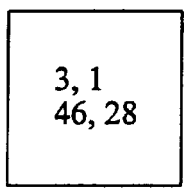

FIG. 9E shows the bitmap 9C01 after the letter "B" has been stored in bounding rectangle 9C04. The order queue is shown with an order entry corresponding to the letter "B". FIG. 9F illustrates when a non-opaque GDI function overwrites bounding rectangle 9C04. The letter "S" is stored in non-opaque mode within bounding rectangle 9C05. Although the bounding rectangle 9C05 completely encompasses bounding rectangle 9C04, the order entry corresponding to the bounding rectangle 9C04 is left in the order queue because its visual effect is merged with that of bounding rectangle 9C05, rather than overwritten. FIG. 9G illustrates when a GDI function in opaque mode overwrites a bounding rectangle for an order entry. In this example, the GDI function is to fill in a rectangle in a solid color. The bounding rectangle 9C06 completely overwrites bounding rectangles 9C04 and 9C05. The Share System detects that the order entries corresponding to bounding rectangles 9C04 and 9C05 are therefore spoiled, and removes them from the order queue. The Share System then stores an order entry representing the bounding rectangle 9C06 in the order queue. FIG. 9H illustrates when screen data overwrites the effect of an order entry. In this example, an order entry corresponding to the bounding rectangle 9C07 is placed in the screen list. The bounding rectangle completely overwrites the bounding rectangle 9C03. Thus, the order entry corresponding to the bounding rectangle 9C03 is removed from the order queue. FIG. 9I illustrates when screen data overlaps other screen data in the screen list. In this example, bounding rectangle 9C08 completely overlaps bounding rectangle 9C06 and partially overlaps bounding rectangle 9C07. The Share System stores an entry in the screen list corresponding to bounding rectangle 9C08, removes the screen list entry for bounding rectangle 9C06, and adjusts the screen list entry for bounding rectangle 9C07 to not include the portion of the bounding rectangle 9C07 that is partially overlapped by bounding rectangle 9C08. FIG. 9J illustrates screen data that completely overlaps all the other screen data on the screen list and all the orders. All entries are removed from both the order queue and screen list, and a screen list entry for bounding rectangle 9C09 is added.

Figure 10:
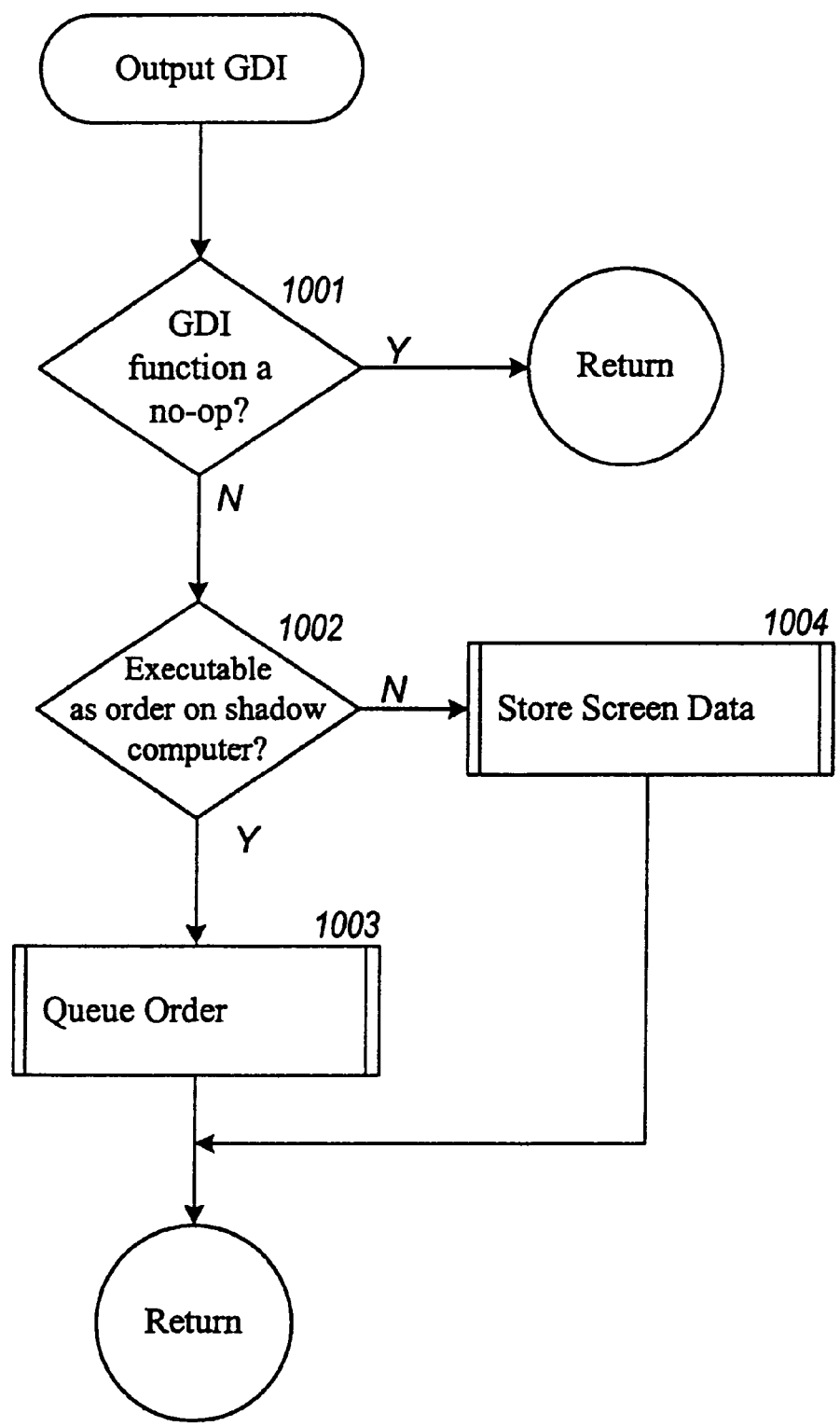
FIG. 10 is a flow diagram of the Output GDI routine.

FIG. 10 is a flow diagram of the Output GDI routine. The Output GDI routine is called by the share GDI function to store orders or screen data that corresponds to the GDI function and its parameters in the intercept storage area. In step 1001, if the intercepted GDI function would result in no effect in the host window, then the Output GDI routine returns, else the Output GDI routine continues at step 1002. An intercepted GDI function would have no effect if, for example, text to be output is a null string or the rectangle to display has all corners that coincide. In step 1002, if the intercepted GDI function is executable as an order on the shadow computer system, then the Output GDI routine queues the order in step 1003 by calling the Queue Order routine, else the Output GDI routine stores the effect of the intercepted GDI function as screen data in step 1004 by invoking the Store Screen Data routine. If the order queue is full, the Output GDI routine preferably calls the Store Screen Data routine regardless as to whether the intercepted GDI function is executable as an order on the shadow computer system. Thus, the screen list acts as an overflow for the order queue. The screen list typically cannot become full because the area of bounding rectangle of an existing screen list entry can be increased to encompass the entire host window. The order queue can become full if the shared application outputs a large volume of data rapidly or because the shadow host computer cannot receive anymore transmissions (e.g., its buffers are full). The Output GDI routine then returns.

Figure 11:
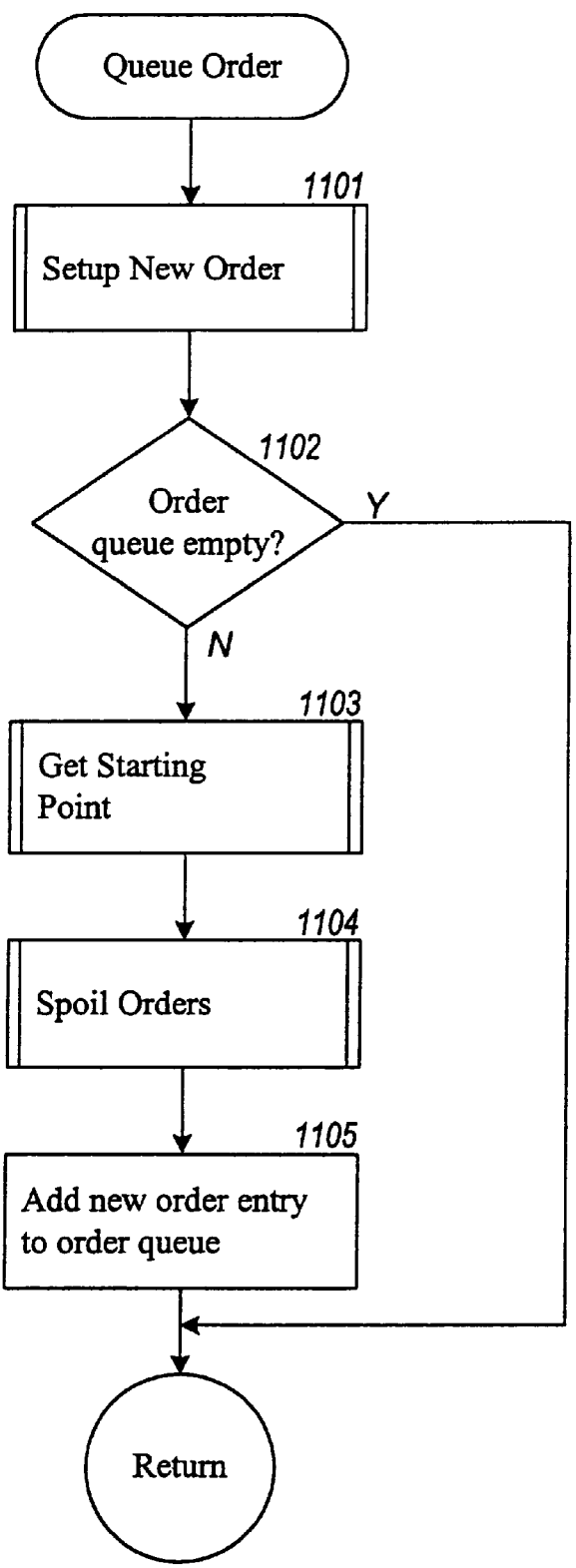
FIG. 11 is a flow diagram of the Queue Order routine.

FIGS. 11–14 are flow diagrams describing the function of queuing an order. FIG. 11 is a flow diagram of the Queue Order routine. The Order Queue routine initializes a new order entry, determines if the new order entry would spoil any order entries currently on the order queue, removes any spoiled entries, and adds the new order entry to the order queue. In step 1101, the routine invokes the Setup New Order routine to create a new order and to return a new order entry. In step 1102, if the order queue is empty, then the routine continues at step 1105, else the routine continues at step 1103. In step 1103, the Queue Order routine invokes the Get Starting Point routine to determine at which order entry within the order queue to start checking for the spoiled orders. In step 1104, the Queue Order routine invokes the Spoil Order routine to locate and remove any spoiled orders. In step 1105, the routine adds the new order entry to the order queue and returns.

Figure 12:
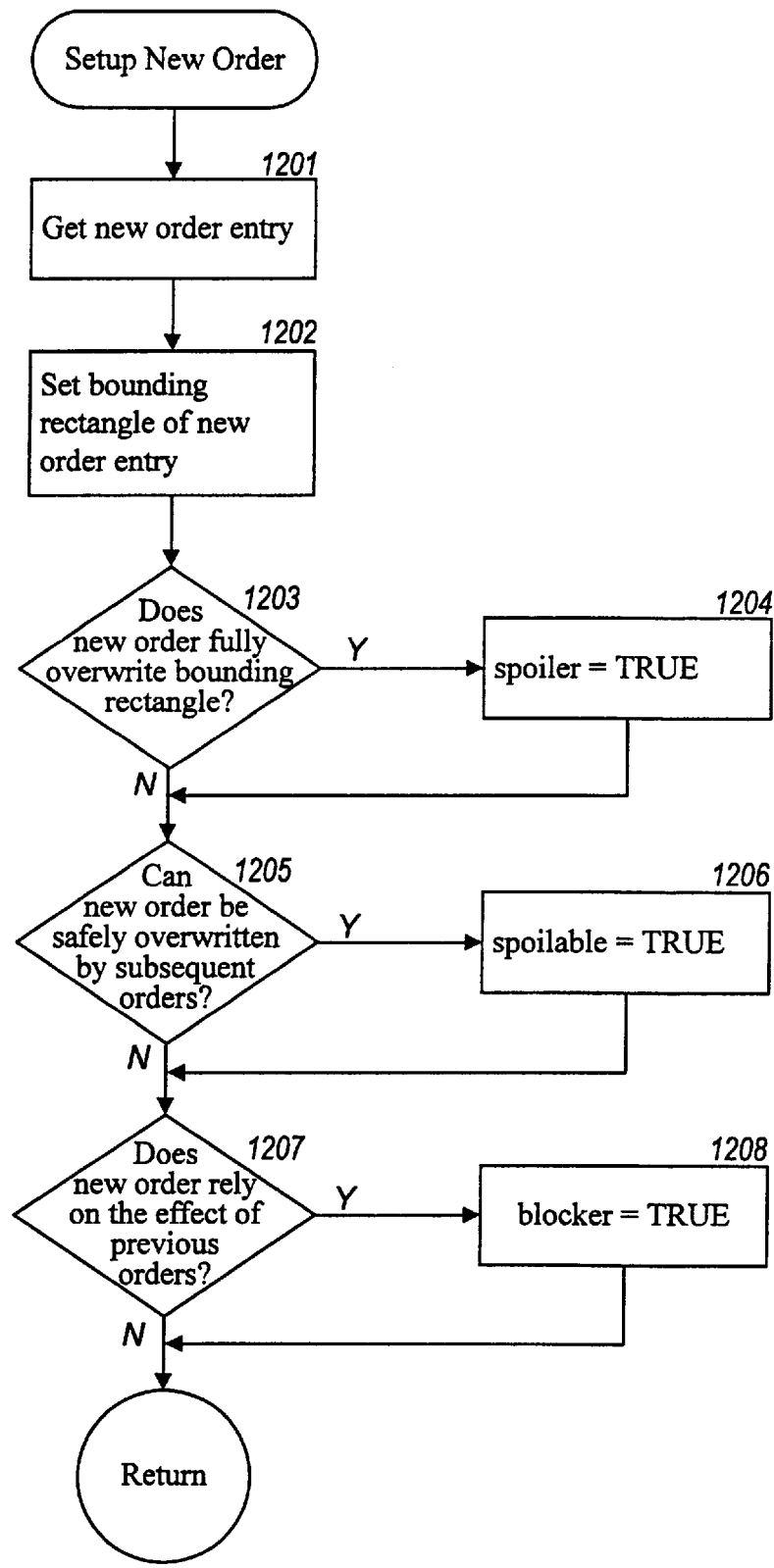
FIG. 12 is a flow diagram of the Setup New Order routine.

FIG. 12 is a flow diagram of the Setup New Order routine. The Setup New Order routine creates an order entry and sets the order field, the spoil flags, and the bounding rectangle. The spoil flags contain three flags: spoiler, spoilable, and blocker. The spoiler flag indicates that the order would completely overwrite all data within the bounding rectangle. The spoilable flag indicates that this order can be overwritten by subsequent orders. The blocker flag indicates that this order relies on the effect of a previous order (e.g. a screen to screen copy). Thus, any order previous to an order with a blocker flag set cannot necessarily be removed from the order queue. In step 1201, the Setup New Order routine allocates a new order entry. In step 1202, the routine sets the bounding rectangle for the new order entry. In step 1203, if the new order entry fully overwrites (i.e., an opaque overwrite) the bounding rectangle, then the routine sets the spoiler flag to TRUE in step 1204. In step 1205, if the new order entry can safely be overwritten by a subsequent order, then the routine sets the spoilable flag to TRUE in step 1206. In step 1207, if the new order entry relies on the effect of a previous order, then the routine sets the blocker flag to TRUE. The Setup New Order routine then returns.

Figure 13:
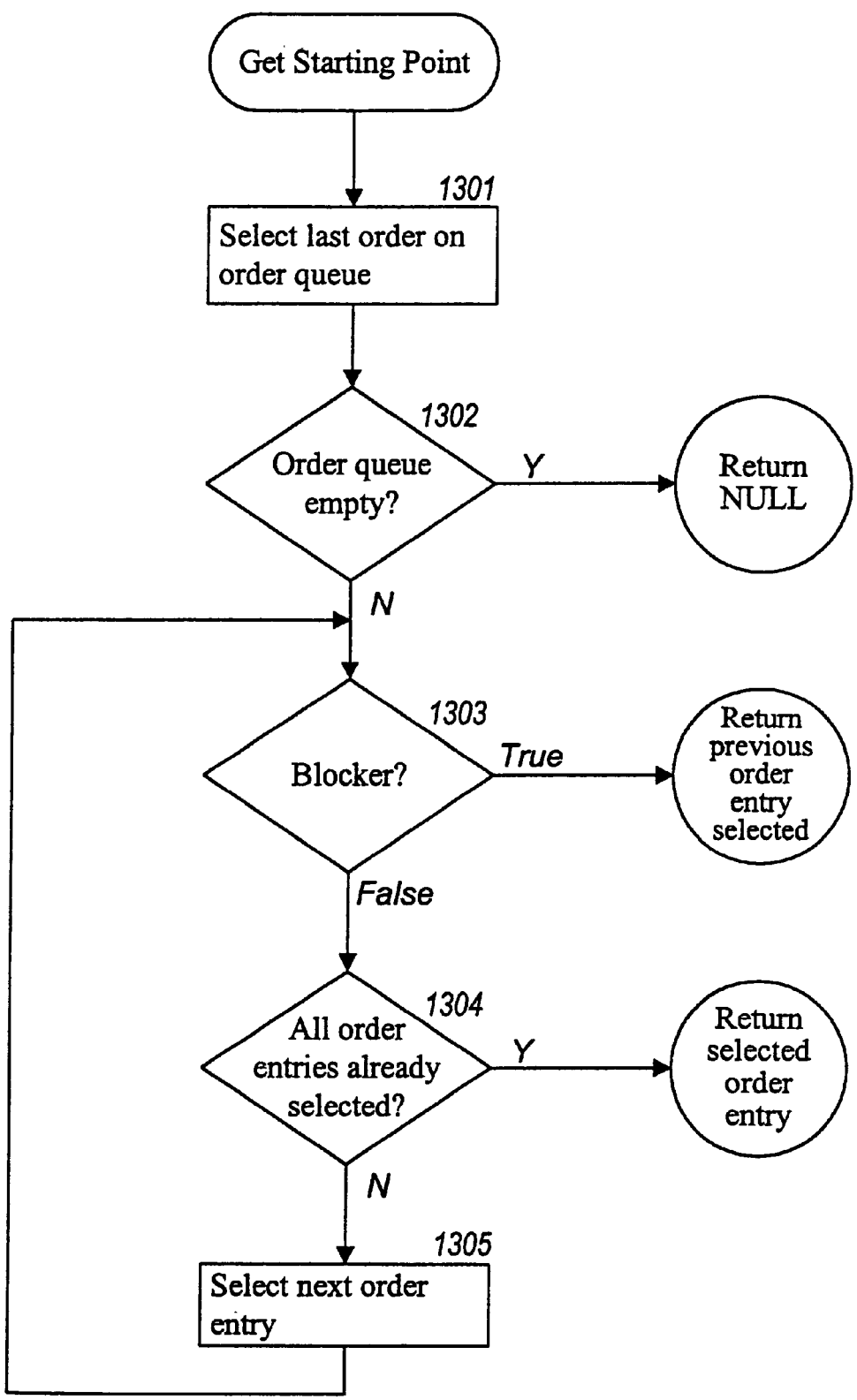
FIG. 13 is a flow diagram of the Get Starting Point routine.

FIG. 13 is a flow diagram of the Get Starting Point routine. The Get Starting Point routine determines which is the most recent order entry placed in the order queue that does not have its blocker flag set to TRUE. The only orders that can be safely removed are those orders which are subsequent to the last order with its blocker flag set to TRUE. In step 1301, the Get Starting Point routine selects the last (newest) order entry placed in the order queue. In step 1302, if the order queue is empty, then the routine returns an indication that the order queue is empty, else the routine continues at step 1303. In step 1303, if the selected order entry is a blocker (ie., has its blocker flag set to TRUE), then the routine returns the previous order entry selected, else the routine continues at step 1304. In step 1304, if all the order entries have already been selected, then the start of the order queue is reached and the routine returns the first (oldest) order entry in the order queue, else the routine continues at step 1305. In step 1305, the Get Starting Point routine selects the next order entry in the order queue and loops to step 1303.

Figure 14:
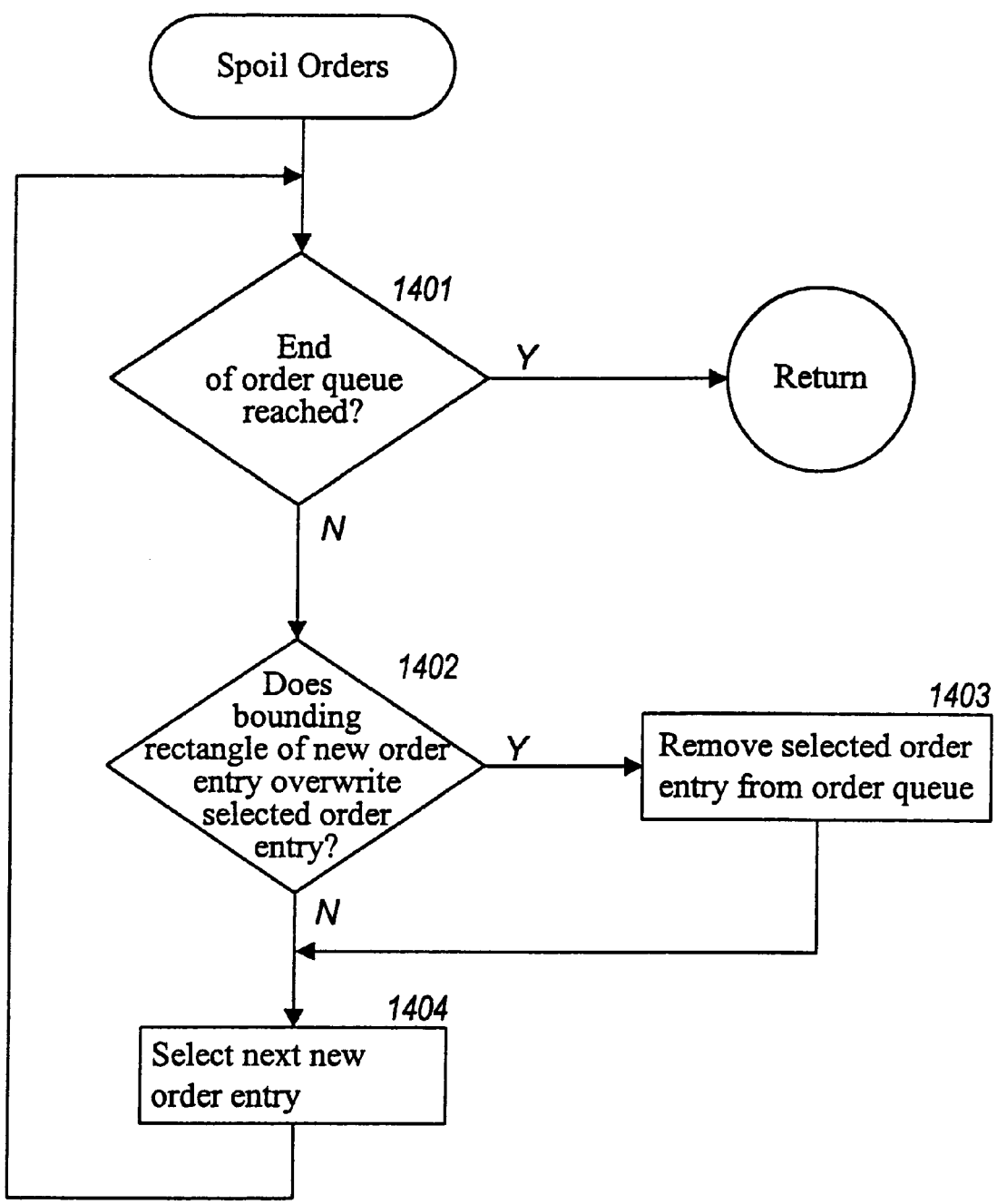
FIG. 14 is a flow diagram of the Spoil Orders routine.

FIG. 14 is a flow diagram of the Spoil Orders routine. The Spoil Orders routine is passed a reference to the queue entry at which to start checking for spoiled orders. The Spoil Orders routine checks each newer order entry to determine if it spoiled and, if so, removes the order entry from the order queue. In step 1401, if the end of the order queue has been reached, then the routine returns, else the routine continues at step 1402. In step 1402, if the bounding rectangle of the new order entry completely overwrites the bounding rectangle of the selected order entry, then the routine continues at step 1403, else the routine continues at step 1404. In step 1403, the Spoil Orders routine removes the selected order from the order queue. In step 1404, the Spoil Orders routine selects the next newer order in the order queue and loops to step 1401.

Figure 15:
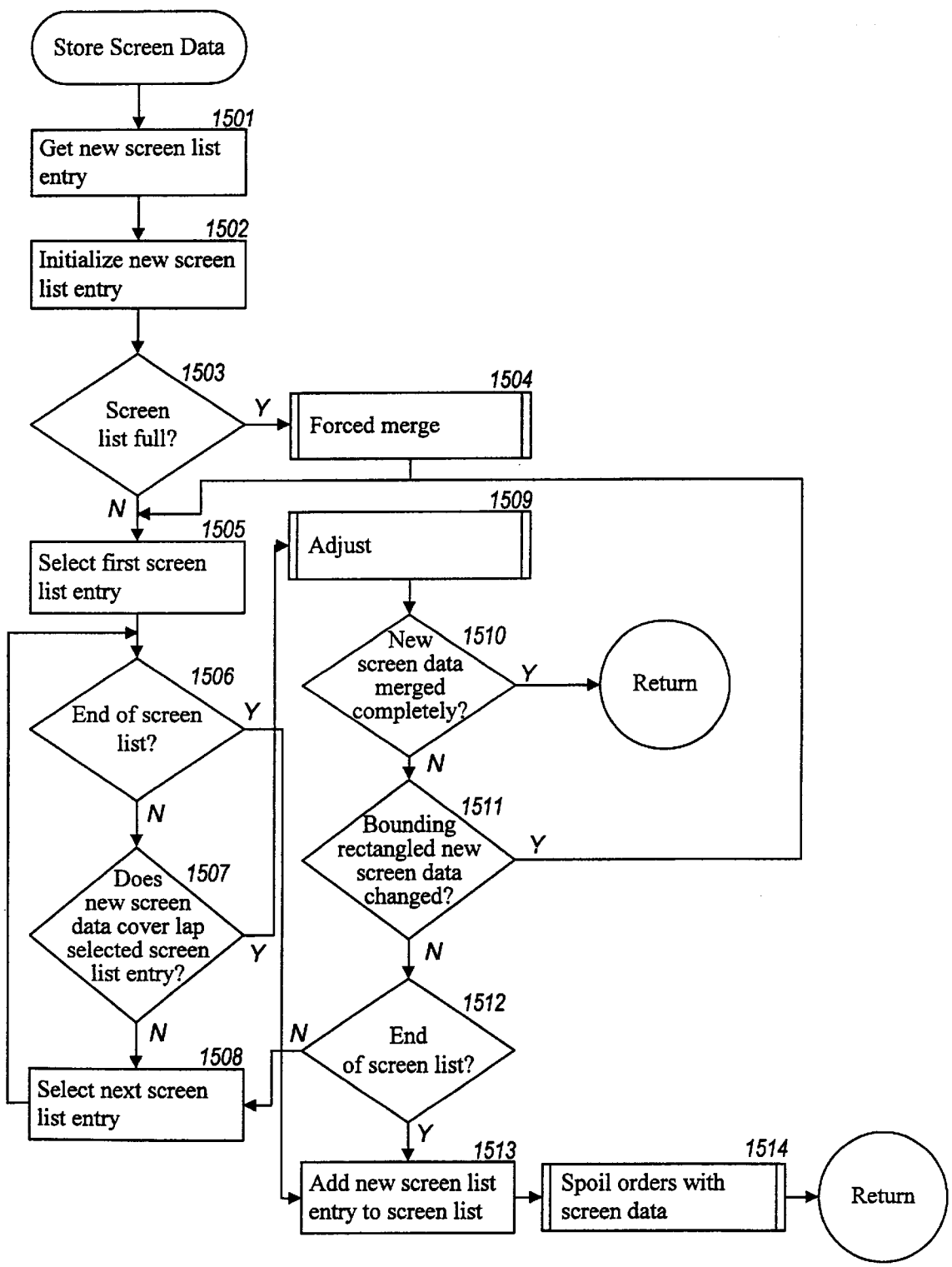
FIG. 15 is a flow diagram of the Store Screen Data routine.

FIGS. 15–18 are flow diagrams illustrating storing screen data in the screen list. FIG. 15 is a flow diagram of the Store Screen Data routine. The Store Screen Data routine determines whether the new screen data can be merged with other screen data in the screen list. Next, the Store Screen Data routine determines whether any of the screen list entries need to be adjusted to remove overlapping areas of the host window. Finally, the Store Screen Data routine determines whether any orders entries are spoiled by the screen data. In step 1501, the Store Screen Data routine creates a new screen list entry. In step 1502, the routine initializes the bounding rectangle to refer to the screen data in the host window. In step 1503, if the screen list is already full, then the routine invokes the Forced Merge routine in step 1504, else the routine continues at step 1505. The Forced Merge routine merges the new screen data with the screen data of a screen list entry. That is, the bounding rectangle of the new screen data is adjusted to encompass the bounding rectangle of that screen list entry. That screen list entry is then removed from the screen list to make room for the new screen list entry. In step 1505, the Store Screen Data routine selects the first screen list entry. In step 1506, if the end of the screen list is reached, then the routine continues at step 1513, else the routine continues at step 1507. In step 1507, if the new screen data overlaps the screen data of the selected screen list entry, then the routine continues at step 1509, else the routine selects the next screen list entry and loops to step 1506. In step 1509, the Store Screen Data routine invokes the Adjust routine. The Adjust routine divides the overlapping screen data in an attempt to prevent transmission of redundant screen data. In step 1510, if the Adjust routine results in the new screen data being completely merged with screen data already in the screen list, then the routine returns, else the routine continues at step 1511. In step 1511, if there was a change in the bounding rectangle of the new screen list entry, then the routine loops to step 1505 to continue the processing at the start of the order queue, else the routine continues at step 1512. In step 1512, if the end of the screen list has been reached, then the routine continues at step 1513, else the routine continues at step 1508. In step 1513, the Store Screen Data routine adds the new screen list entry to the screen list. In step 1514, the Store Screen Data routine invokes the Spoil Orders With Screen Data routine and returns. The Spoil Orders With Screen Data routine checks if the new screen data spoils any order entries.

Figure 16:
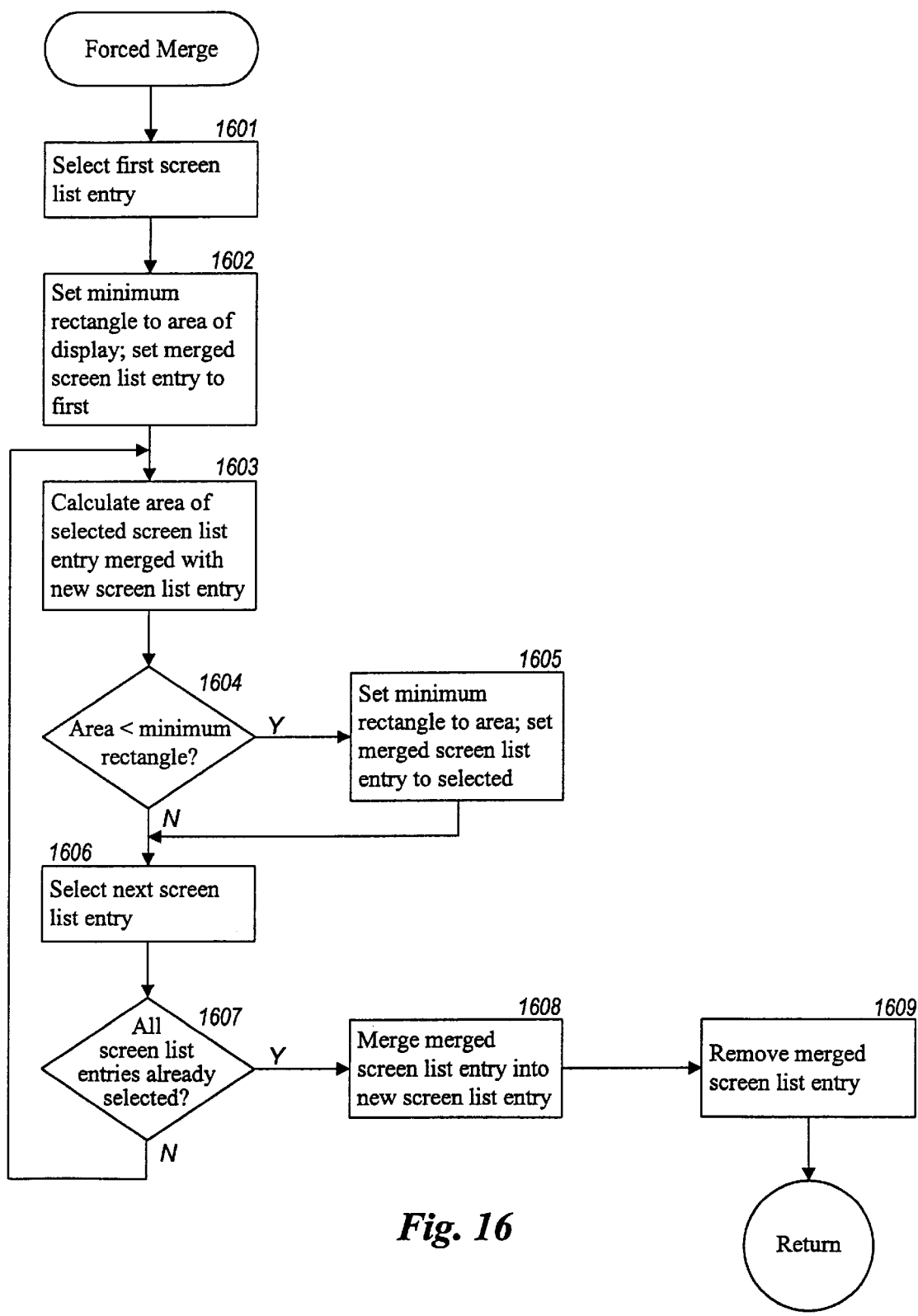
FIG. 16 is a flow diagram of the Forced Merge routine.

FIG. 16 is a flow diagram of the Forced Merge routine. The Forced Merge routine is invoked when the screen list is full, and it selects which screen list entry to merge with the new screen list entry and removes the selected screen list entry from the screen list. The Forced Merge routine selects the screen list entry that when merged with the new screen list entry results in an area of the bounding rectangle that is the smallest. In step 1601, the Forced Merge routine selects the first screen list entry. In step 1602, the Forced Merge routine initializes a loop for finding the smallest merged bounding rectangle that results from merging each of the screen list entries with the new screen list entry. In step 1602, the smallest bounding rectangle area found so far is initialized to the area of the shadow window and the merge-with screen list entry is set to point to the first screen list entry. At the end of the processing, the merge-with screen list entry points to the screen list entry that when merged with the new screen list entry results in the smallest merged bounding rectangle. In step 1603, the Forced Merge routine calculates the area of the bounding rectangle that would result if the selected screen list entry was merged with the new screen list entry. In step 1604, if the calculated area is less than the smallest bounding rectangle area found so far, then the routine continues at step 1605, else the routine continues at step 1606. In step 1605, the Forced Merge routine sets the smallest bounding rectangle area found so far to the calculated area and saves a pointer to the selected screen list entry as the merge-with screen list entry. In step 1606, the Forced Merge routine selects the next screen list entry. In step 1607, if all the screen list entries have already been selected, then the routine continues at step 1608, else the routine loops to step 1603. In step 1608, the Forced Merge routine merges the merge-with screen list entry into the new screen list entry. In step 1609, the Forced Merge routine removes the merge-with screen list entry from the screen list and returns.

Figure 17:
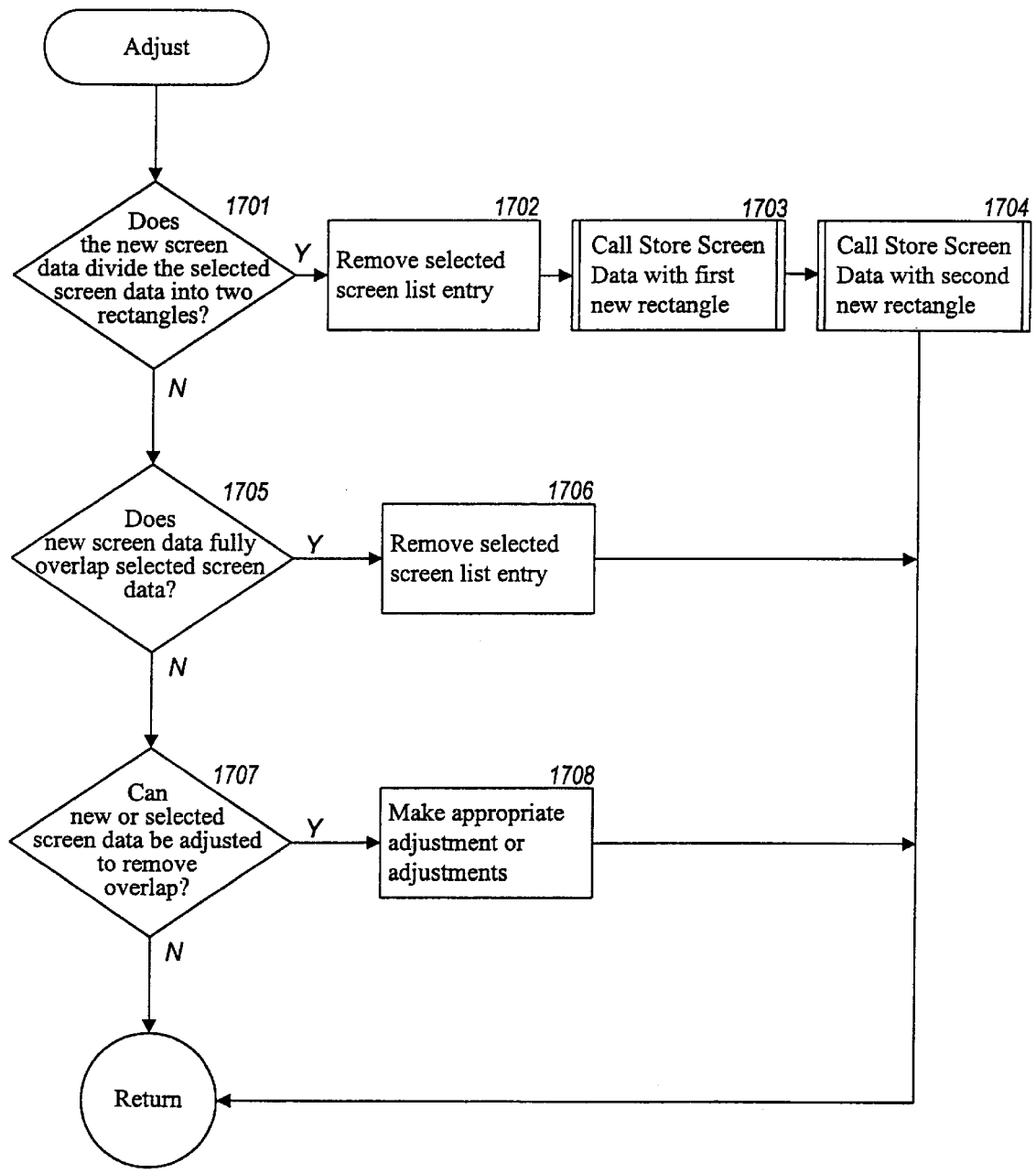
FIG. 17 is a flow diagram of the Adjust routine.

FIG. 17 is a flow diagram of the Adjust routine. The Adjust routine adjusts the new screen data or the screen data already in the screen list to remove overlap. In step 1701, if the new screen data overlaps and splits the selected screen data into two portions, then the routine continues at step 1702, else the routine continues at step 1705. In step 1702, the Adjust routine removes the selected screen list entry from the screen list. In steps 1703 and 1704, the Adjust routine recursively calls the Store Screen Data routine to add back into the screen list each non-overlapped portion of the selected screen data and then returns. In step 1705, if the new screen data fully overlaps the selected screen data, then the routine continues at step 1706, else the routine continues at step 1707. In step 1706, the Adjust routine removes the selected screen list entry and returns. In step 1707, if either the new screen data or the selected screen data can be adjusted to remove the overlap, then the routine in step 1708 removes the overlap. The Adjust routine then returns.

Figure 18:
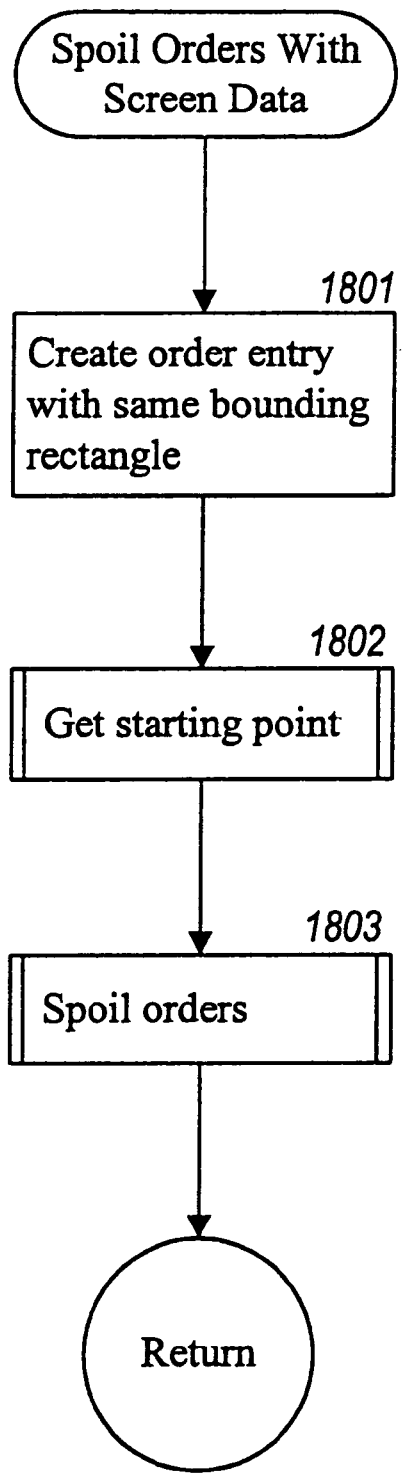
FIG. 18 is a flow diagram of the Spoil Orders With Screen Data routine.

FIG. 18 is a flow diagram of the Spoil Orders With Screen Data routine. The Spoil Orders With Screen Data routine creates an order entry with a bounding rectangle corresponding to the new screen data and checks for which order entries that created order would spoil. In step 1801, the routine creates an order entry with the same bounding rectangle as the new screen data. In step 1802, the routine invokes the Get Starting Point routine. In step 1803, the routine invokes the Spoil Orders routine and returns.

Transmitting Output Data

Figure 19:
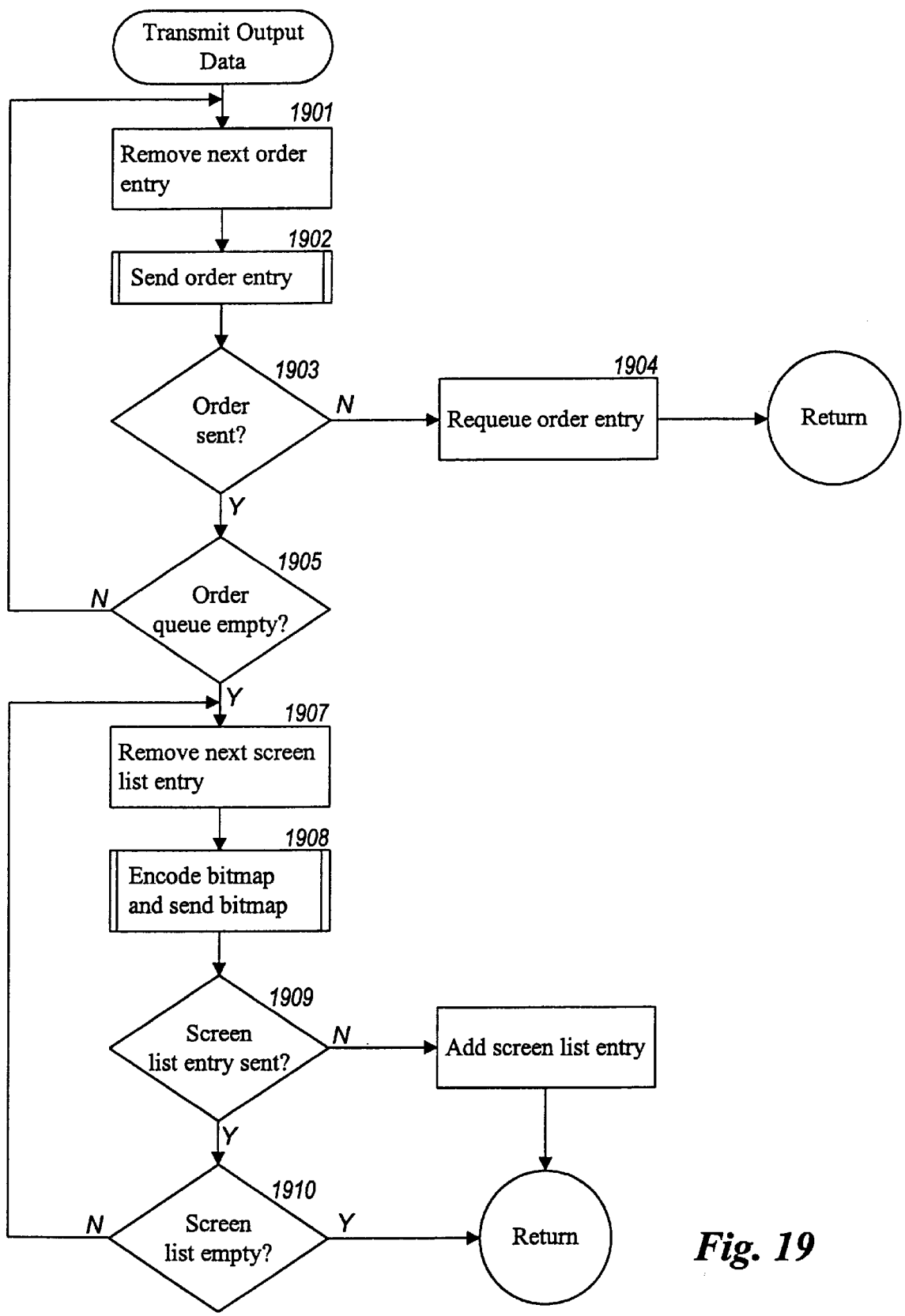
FIG. 19 is a flow diagram of the Transmit Output Data routine.

FIG. 19 is a flow diagram of the Transmit Output Data routine. The Transmit Output Data routine is invoked to transmit orders and screen data from the host computer system to the shadow computer system. In a preferred embodiment, multiple orders and screen data are stored in a single network packet to improve network performance. Also, large areas of screen data may not fit into a single packet and are thus stored in multiple packets. In step 1901, the Transmit Output Data routine removes the next order entry from the order queue. In step 1902, the routine invokes the Send Order Entry routine, which encodes the order and transmits the order to the shadow computer system. In step 1903, if the order was sent successfully, then the routine continues at step 1905, else the routine re-queues the order in step 1904 and returns. An order might not be sent successfully if the shadow computer system indicates that it has no space to store the order. In step 1905, if the order queue is empty, then the routine continues at step 1907 to send the screen data, else the routine loops to step 1901 to send the next order. In step 1907, the Transmit Output Data routine removes the next screen data from the screen list. In step 1908, the routine invokes the Encode Bitmap routine to encode the screen data and then sends the encoded screen data. In step 1909, if the screen data was sent successfully, then the routine continues at step 1910, else the routine adds the screen list entry back into the screen list and returns. In step 1910, if the screen list is empty, then the routine returns, else the routine loops to step 1907 to process the next screen list entry.

Figure 20:
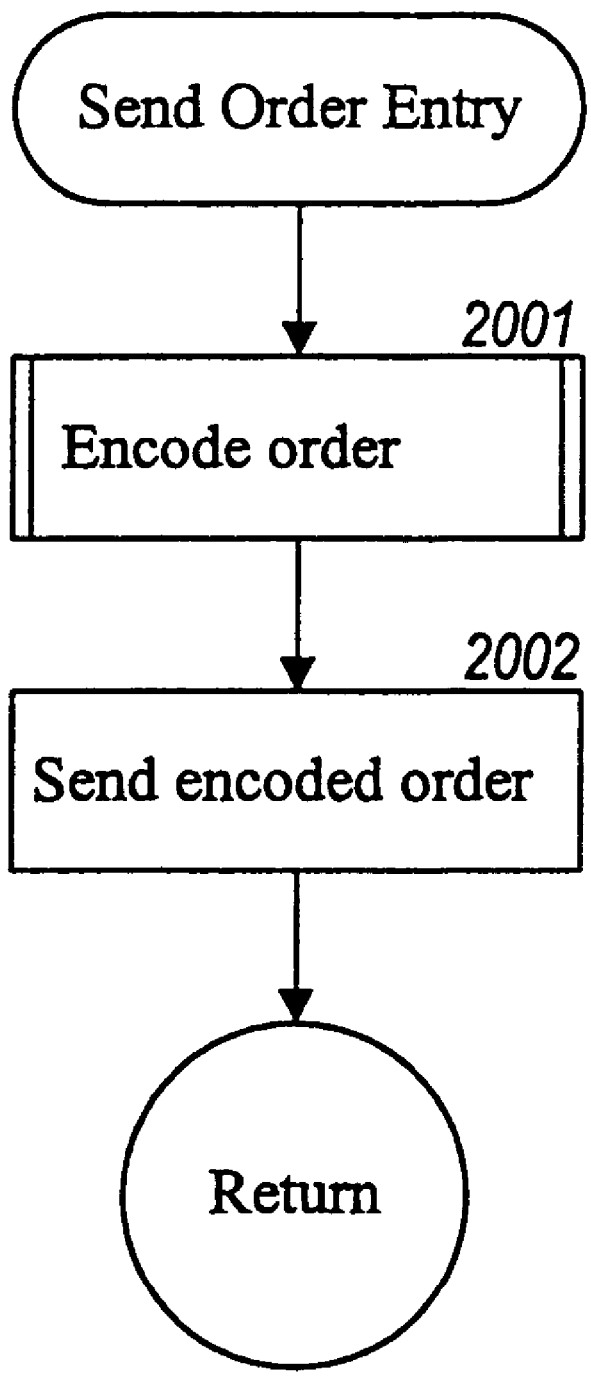
FIG. 20 is a flow diagram of the Send Order Entry routine.

FIG. 20 is a flow diagram of the Send Order Entry routine. In steps 2001, the Send Order Entry routine encodes the order. In step 2002, the routine sends the encoded order and returns a flag indicating whether the order was sent successfully.

FIGS. 21A–21D illustrate the order encoding process of the Share System. The Share System maintains an order encoding table 2101 on the host computer system, and an order encoding table 2102 on the shadow computer system. As described above, an order is encoded as an order type and various fields. Rather than transmitting the order type and each of the fields each time an order is transmitted, the Share System transmits the order type along with an indication of which fields have changed since the last transmission of an order of that type and along with only the fields that have changed. For example, if the text string transmitted in the last text string order is the same as the next text string order, then only a flag indicating that the text strings are the same is sent with the next order, rather than the text string itself. The order encoding tables 2101 and 2102 contain an entry for each type of order that has been transmitted along with the field values that were last transmitted with that order type. For example, the last order with a type of 2 that was transmitted had the field values of D, E, and F. The orders 2105, 2104, and 2103 represent the next three orders to be transmitted.

Figure 21B:
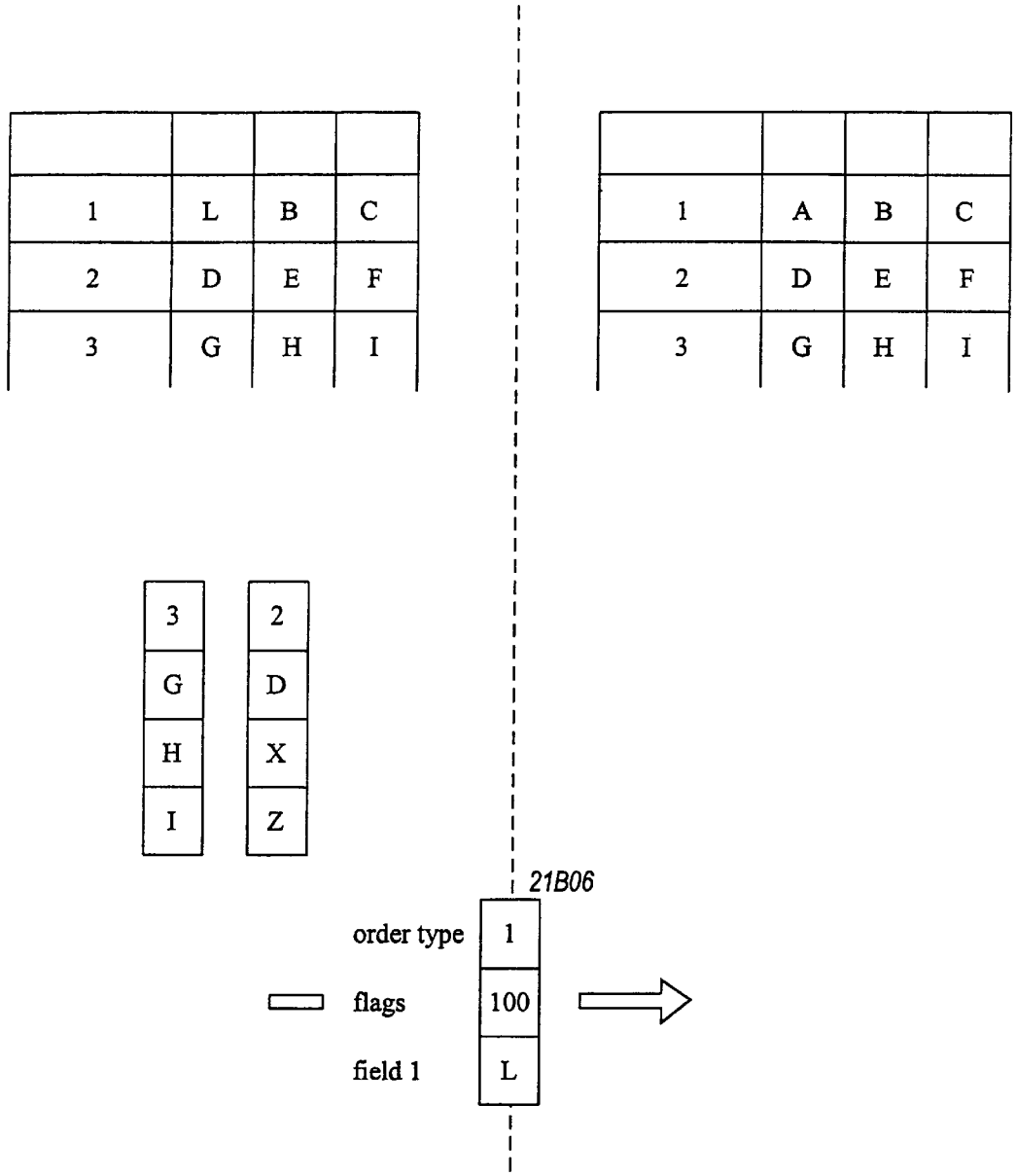

FIG. 21B illustrates the transmission of order 2105 to the shadow computer system. Since the order type of order 2105 is 1 and since the values for the second and third fields B and C correspond to the same values that were sent in the last order of that type, the encoded order 2106 contains an indication of the order type, a series of change flags which indicate that only the first field is changed, and the changed field value L. When the shadow computer system receives the encoded order 2106, the shadow computer system regenerates the order by removing the flags and adding the received values stored in its order encoding table, and updates the order encoding table as shown in FIG. 21C.

Figure 21C:
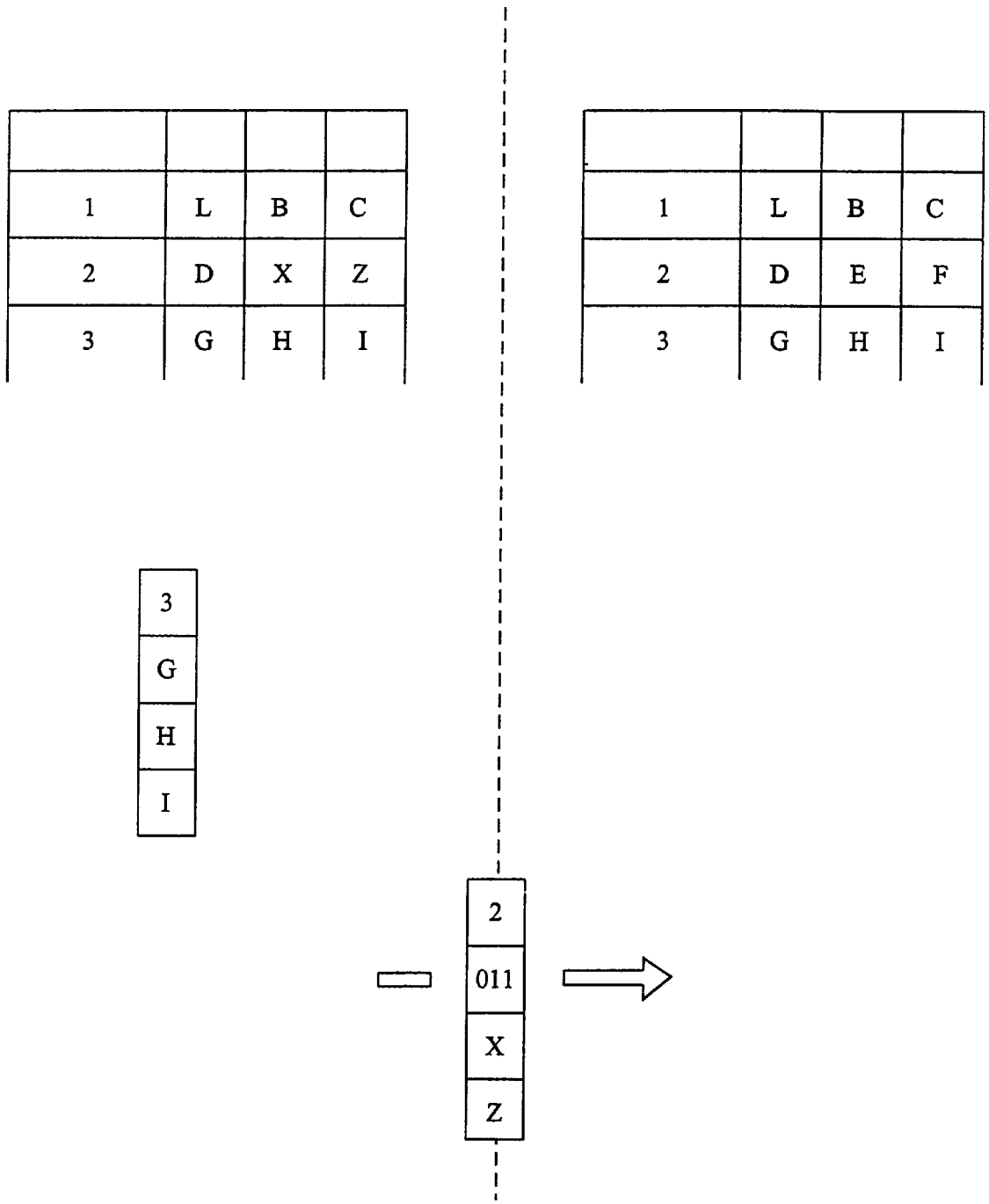
Figure 21D:
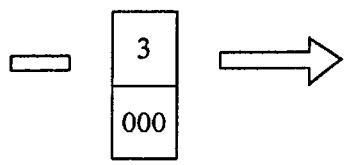

FIG. 21C illustrates the order encoding of order 2104. In this example, the second and third field are changed, but the first field is the same as for the last transmission of that order type. FIG. 21D illustrates the order encoding for order 2103. In this example, all the order fields are the same as the order fields for the last order of type 3. Thus, only the order type, along with the three flags indicating that the fields are the same as the last order of that type, are transmitted to the shadow computer system.

Figure 22:
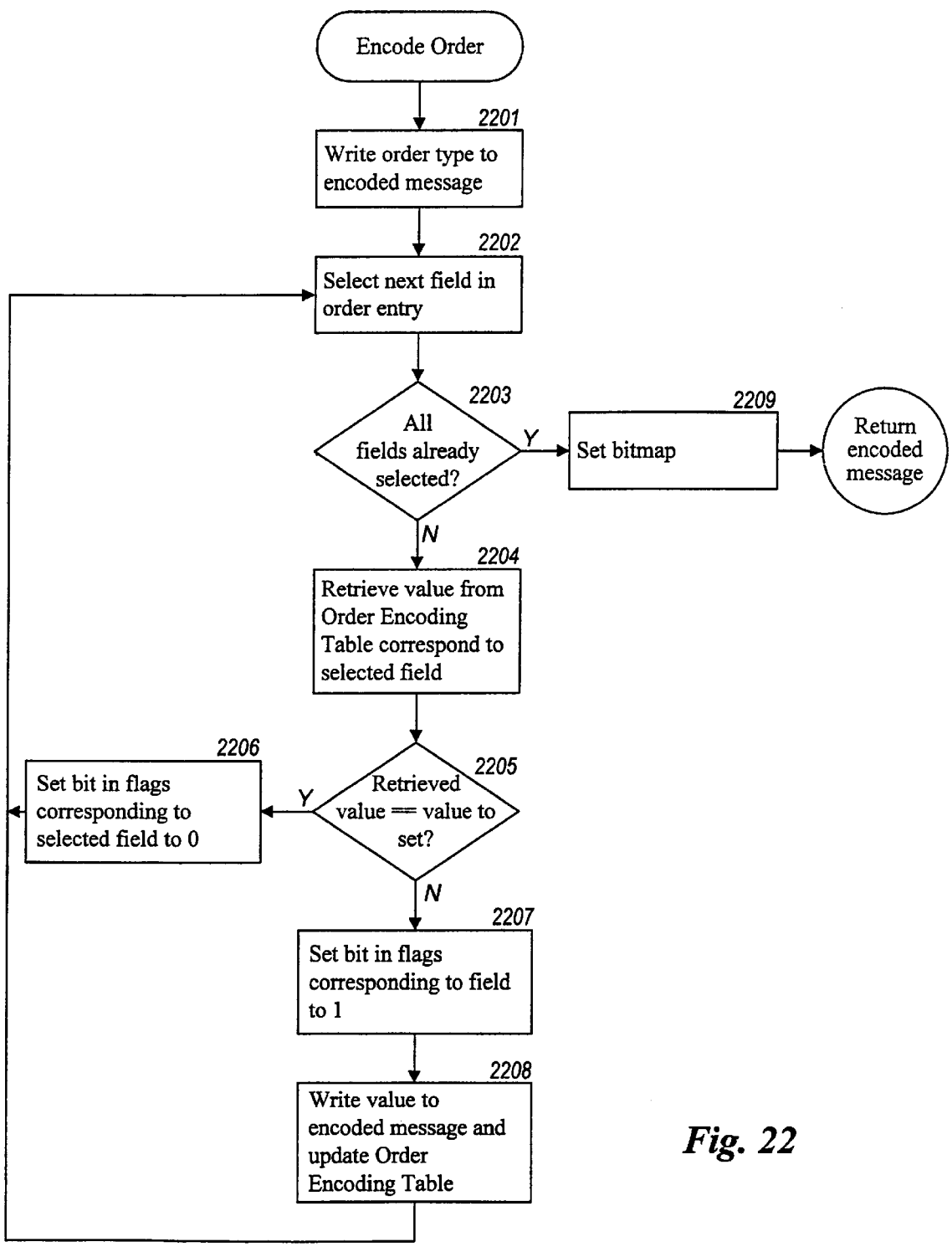
FIG. 22 is a flow diagram of the Encode Order routine.

FIG. 22 is a flow diagram of the Encode Order routine. The Encode Order routine uses the order encoding table to encode the order to be transmitted. The code is encoded into an encoded message. In step 2201, the Encode Order routine stores the order type in the encoded message. In step 2202, the Encode Order routine selects the next field in the order. In step FB03, if all fields for the order have already been selected, then the routine continues at step 2209, else the routine continues at step 2204. In step 2204, the Encode Order routine retrieves the values stored in the order encoding table for this order type for the selected field. In step 2205, if the value of the retrieved field and the selected field are equal, then the routine sets the corresponding flag to 0 in step 2206 and loops to step 2202, else the routine continues at step 2207. In step 2207, the Encode Order routine sets the flag corresponding to a selected field to 1. In step 2208, the routine writes the value of the selected field to the encoded message and updates the order encoding table and loops to step 2202. In step 2209, the routine invokes the Send Bitmap routine for any bitmap that is part of the order and returns.

Figure 23:
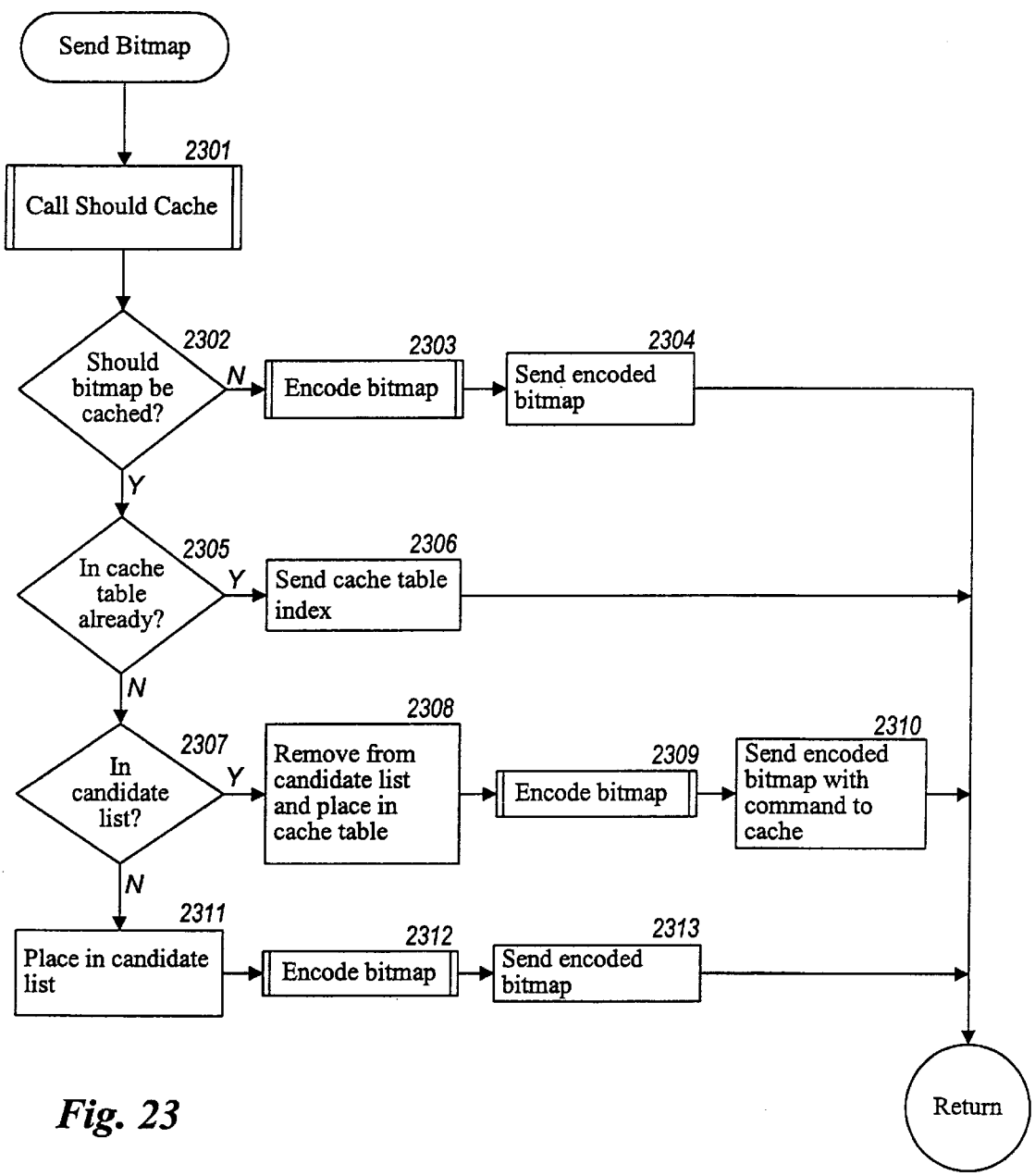
FIG. 23 is a flow diagram of the Send Bitmap routine.

FIG. 23 is a flow diagram of the Send Bitmap routine. To minimize the amount of screen data that is transmitted, the Share System uses a caching technique and an encoding technique to send a bitmap that is part of an order. The same encoding technique is used to encode screen data. The Share System maintains a caching table on both the host computer system and the shadow computer system. When the same bitmap is sent twice to the shadow computer system, the Share System of the host computer system sends a notification to cache the bitmap along with the bitmap. The shadow computer system, when it receives the caching notification, stores the bitmap in its cache table. The host computer system also stores an identification (such as a handle to the memory block in which the bitmap is stored) of the bitmap in its caching table, which is kept in parallel with the cache table of the shadow computer system. The next time the same bitmap is to be sent to the shadow computer system, the Share System sends an identification of the screen data within the cache table, rather than the bitmap itself. The shadow computer system uses the identification to retrieve the bitmap from its cache table. The Share System also encodes the bitmaps it transmits using a compression technique that contains differential encoding and run-length encoding as described below in detail. In step 2301, the routine invokes the Should Cache routine to determine whether the bitmap should be cached. In step 2302, if the bitmap should be cached, then the routine continues at step 2305, else the routine continues at step 2303. In step 2303, the Send Bitmap routine invokes the Encode Bitmap routine. In step 2304, the Send Bitmap routine sends the encoded bitmap to the shadow system and returns. In step 2305, if the bitmap is already in the cache table, then the routine sends the index into the cache table to the shadow computer system in step 2306 and returns. In step 2307, if the bitmap is in the candidate list, then the routine continues at step 2308, else the routine continues at step 2311. The candidate list contains a list of identification of the bitmaps that have been sent only once to the shadow computer system. If the bitmap in the candidate list or cache table is changed or deleted, then the Share System intercepts the GDI function that alters the bitmap, and removes the bitmap from the candidate list and cache table. In step 2308, the Send Bitmap routine removes the bit from the candidate list and places the bitmap in the cache table. In step 2309, the routine encodes the bitmap. In step 2310, the Send Bitmap routine sends the encodedbitmap, and a notification to cache the bitmap to the shadow computer system and returns. In step 2311, the Send Data routine adds the bitmap to the candidate list. In step 2312, the routine encodes the bitmap. In step 2313, the Send Data routine sends the encoded bitmap to the shadow computer system and returns.

Figure 24:
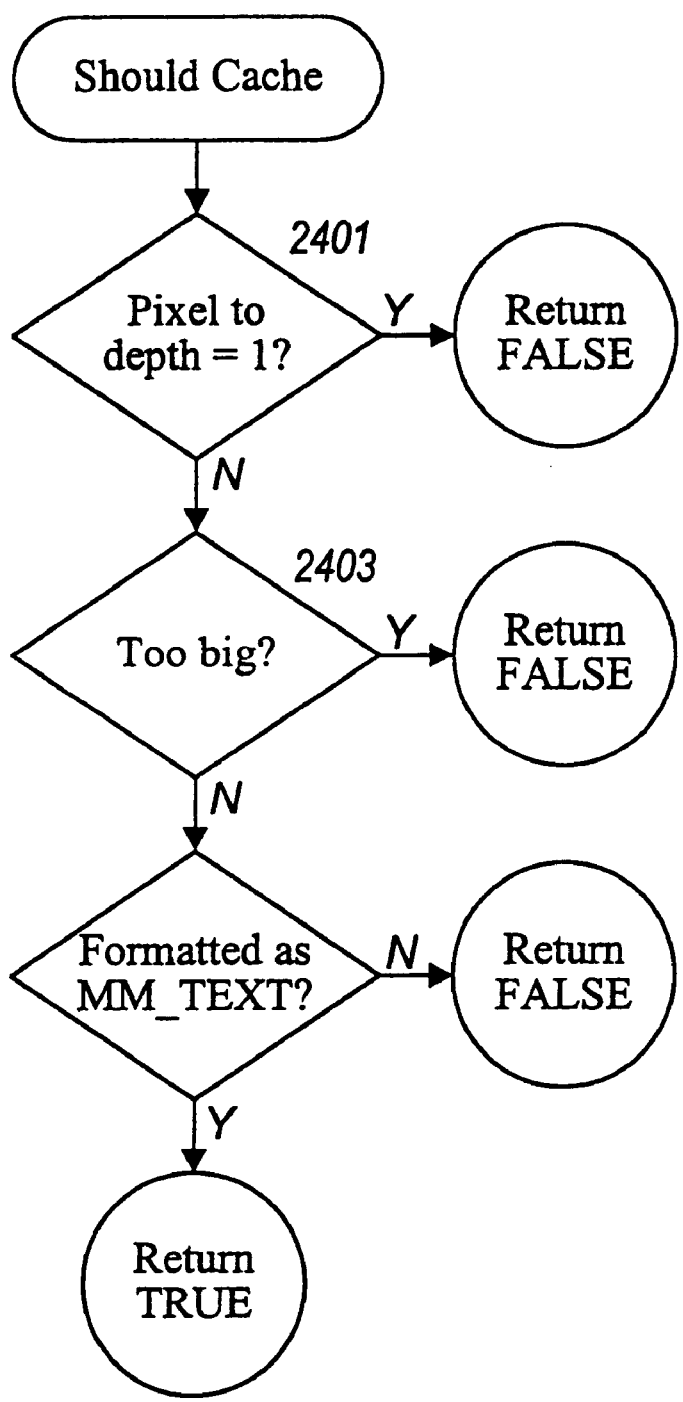
FIG. 24 is a flow diagram of the Should Cache routine.

FIG. 24 is a flow diagram of the Should Cache routine. The routine determines whether bitmap should be cached. In step 2401, if the number of bits per pixel ("pixel depth") of the bitmap is equal to 1, then the routine returns an indication that the bitmap should not be cached, else the routine continues at step 2403. In step 2403, if the bitmap is too large to be cached or the GDI function to generate the bit involves a complex mapping operation, then the routine returns an indication that the screen data should not be cached, else the routine returns an indication that the bitmap should be cached.

Screen Data Encoding

The Share System encodes (compresses) screen data (and bitmaps) that is transmitted from a host computer system to the shadow computer system. The encoding is a combination of differential encoding and run-length encoding. Each row of the screen data is differentially encoded with respect to the previous row. After differentially encoding a row, the row is then run-length encoded.

Figure 24A:
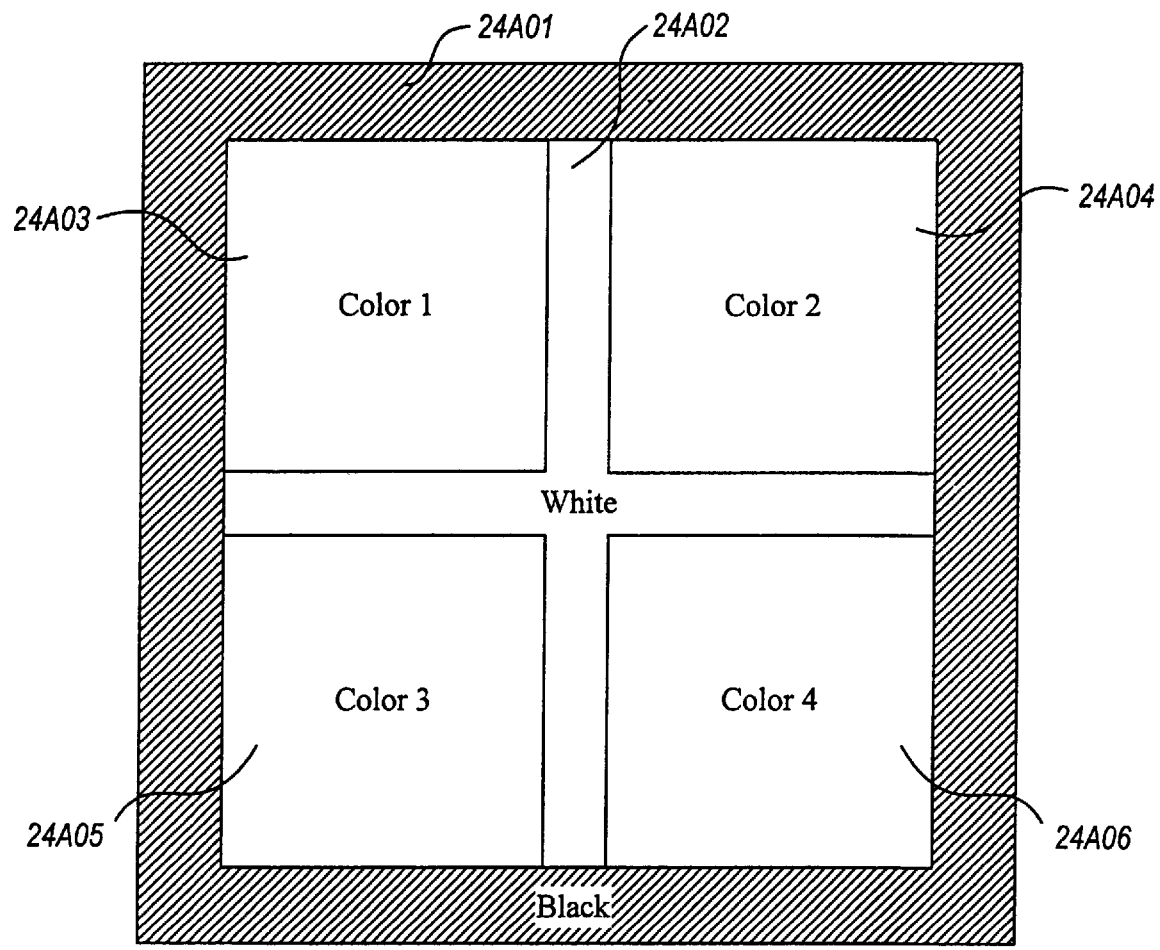

FIG. 24A is a diagram illustrating sample screen data to be encoded. The screen data represents a 30×24 rectangle of pixels with a pixel depth of four. Thus, each pixel can be one of 16 different colors. The screen data as shown contains six different colors. The outline section 24A01 is in the color black; the center "plus" section 24A02 is in the color white; and the rectangular sections 24A03–24A06 are in the color 1, color 2, color 3, and color 4, respectively.

FIG. 24B illustrates a hexadecimal representation of the colors of the screen data. The color black is represented by the hexa-decimal value 0, the color white is represented by the hexadecimal value f, the color one is represented by the hexa-decimal value a, the color 2 is represented by the hexa-decimal color b, the color 3 is represented by the hexa-decimal value c, and the color 4 is represented by the hexa-decimal value d.

FIG. 24C is a diagram illustrating the results of differentially encoding the rows. To differentially encode the rows, the Share System performs an exclusive-OR logical operation on each row of the screen data. The exclusive-OR logical operation identifies which bit values are different between one row and the next row. The result of the exclusive-OR is a 1 if the values are different and is a 0 if the values are the same. Row 24C01 is represented by color values of all 0s. The first row is output without performing any exclusive-OR operation. The second row 24C02 is the result of exclusive-OR of each pixel of the first row 24C01 and the second row 24C02. Since the pixel values in the first row 24C01 and the second row 24C02 are the same, the result of the exclusive-OR is row 24C02 with all pixel values set to 0. Row 24C03 is the result of the exclusive-OR of row 24C02 and row 24C03. Since row 24C02 is all 0s, the result of the exclusive-OR identifies those bits that were set to 1 in row 24C03. Thus, the result is the same as the value row 24C03. Row 24C04 represents the exclusive-OR of rows 24C03 and 24C04. Since rows 24C03 and 24C04 have the same color values, the exclusive-OR is a value 0, as shown in row 24C04. Similarly, since rows 24C04 through 24C11 are the same as each previous row, each of the results is a row of all 0s, as shown in rows 24C05–24C11. Row 24C12 is the result of the exclusive-OR of each pixel of row 24C11 with the corresponding pixel of row 24C12. The Share System continues in a similar manner to differently encode the remaining rows of the screen data.

As shown in FIG. 24B, the result of the is that the differentially encoder is the screen data transferred to have long run of 0s. Thus, each row can be compressed using run-length encoding.

The Share System encodes the pixels in the following formats:

1. Background run
2. Foreground run
3. Dithered run
4. Foreground/Background image
5. Color Image The background run format is used to encode a run of pixels with the value of 0. The foreground run format is used to encode a run of pixels that have a non-zero value. The dithered run format is used to encode a run of pixels that alternate between two values. The foreground/background image format is used to encode a run of pixels that have only the value 0 and one non-zero value. The color image format is used to encode a run of pixels that do not fit into one of the other formats. Each of the formats, except for the dither run format, have a short form and a long form. The short form is used to encode shorter runs and the long form is used to encode longer runs. Table 1 illustrates the runlength encoding of the Share System.

TABLE 1

|  | byte 1 | byte 2 | byte 3 | additional bytes |
|---|---|---|---|---|
| Background Run | 0<length> | | | |
| Foreground Run | 1001<br><length> | | | |
| Dithered Run | 1000<br>0000 | <length> | <color1><br><color2> | |
| Foreground-Background Image | 11<br><length> | <data> | <data> | <data> ··· |
| Color Image | 101<br><length> | pixel 1<br>pixel 2 | pixel 3<br>pixel 4 | ··· |
| Mega Background Run | 0000<br>0000 | <length> | | |
| Mega Foreground Run | 1001<br>0000 | <length> | | |
| Mega Foreground-Background Image | 1001<br>0000 | <length> | <data> ···<br>·· | |
| Mega Color Image | 1010<br>0000 | <length> | pixel 1<br>pixel 2 | ··· |

TABLE 1-continued

| Set Foreground Color | 1000<br><color> |
|---|---|

The Share System uses a variable length prefix code to indicate the type of run being encoded. For example, the prefix code of 0 indicates a background run. A prefix code of 1001 indicates a foreground, a prefix code of 10000000 indicates a dithered run, and so on, as shown in Table 1. A background run is encoded in one byte, and indicates a run of pixel values of 0 with a length of up to 127. The foreground run is a one-byte code that indicates a run of up to 15 pixels of the foreground color are being encoded. The current foreground color is established by a one-byte format with the prefix code 1000 followed by the pixel value. The mega (long) background run is encoded in two bytes and encodes runs of the background color of lengths from 128 to 32K (256*128). The length field indicates the number runs of 128. The mega (long) foreground run is encoded in two bytes and used to encodes runs of the foreground color of lengths from 16 to 4K (256*16). The dithered run is encoded in three bytes and encodes alternating pixel values. The length of the dithered run can be up to 512 pixels, as indicated in the second byte, and the colors in the dithered run are represented by the values in the third byte. The remaining formats are encoded as illustrated in Table 1.

Figure 25:
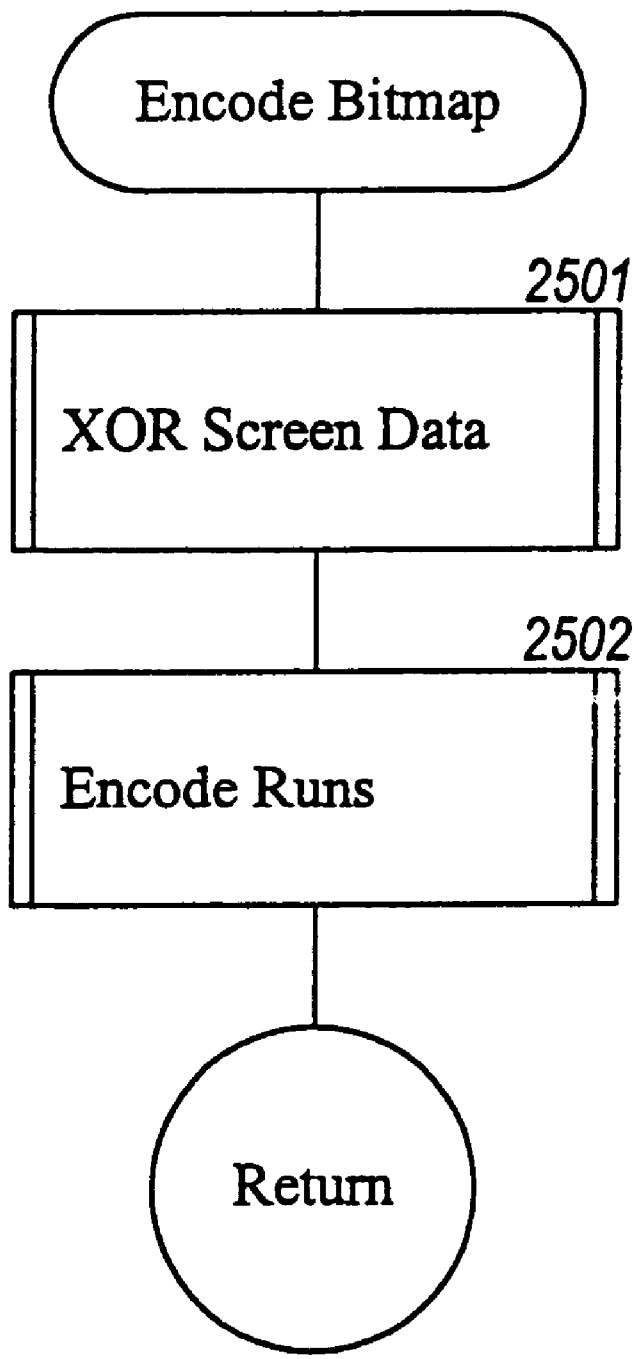
FIG. 25 is a flow diagram of the Encode Bitmap routine.

FIG. 25 is a flow diagram of the Encode Bitmap routine. In step 2501, the Encode Bitmap routine invokes the XOR Screen Data routine, which generates temporary screen data that contains the exclusive-OR of each pixel in each row of the screen data with the corresponding pixel in the previous row. In step 2502, the Encode Bitmap routine invokes the Encode Runs routine, which encodes the temporary screen data and returns.

Figure 26:
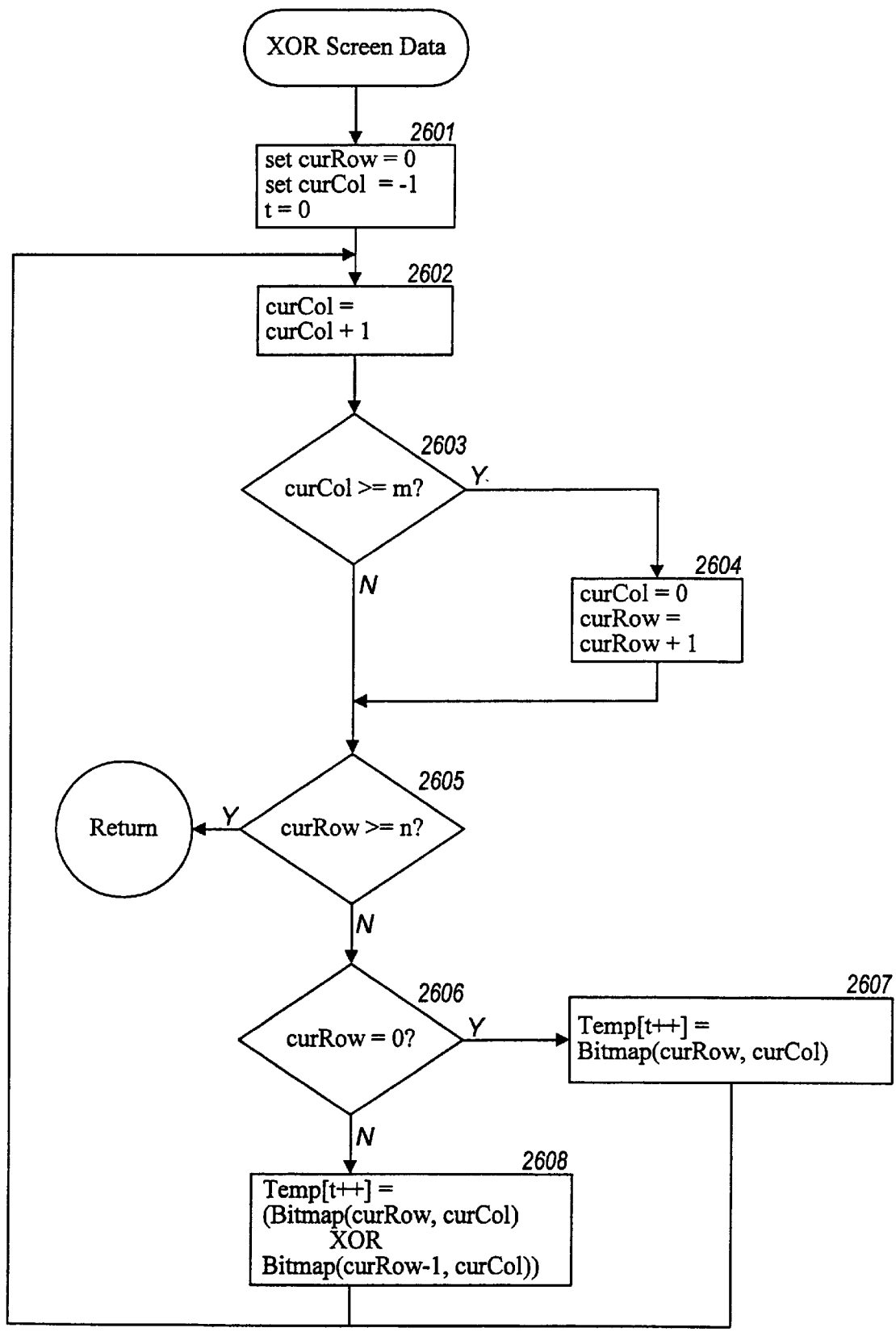
FIG. 26 is a flow diagram of the XOR Screen Data routine.

FIG. 26 is a flow diagram of the XOR Screen Data routine. In step 2601, the XOR Screen Data routine initializes variables for looping through the screen data. The temporary screen data is stored as simply a sequence of pixel values. The variable curRow points to the current row, and the variable curCol points to the current column in the screen data. Each column is one pixel wide. In step 2602, the XOR Screen Data routine increments the current column to point to the next column. In step 2603, if the current column is greater than the number of columns in a row, then the routine continues at step 2604, else the routine continues at step 2605. In step 2604, the XOR Screen Data routine selects the first column of the next row. In step 2605, if the current row is greater than the number of rows of screen data, then the routine returns, else the routine continues at step 2606. In step 2606, if the current row selected is 0, then the routine continues at step 2607, else the routine continues at step 2608. In step 2607, the XOR Screen Data routine copies the first row of screen data to the temporary screen data without performing any exclusive-OR. In step 2608, the XOR Screen Data routine sets the next pixel value in the temporary Screen data to the exclusive-OR of the currently selected pixel with the corresponding pixel in the previous row. The XOR Screen Data loops to step 2602 to select the next column.

Figure 27:
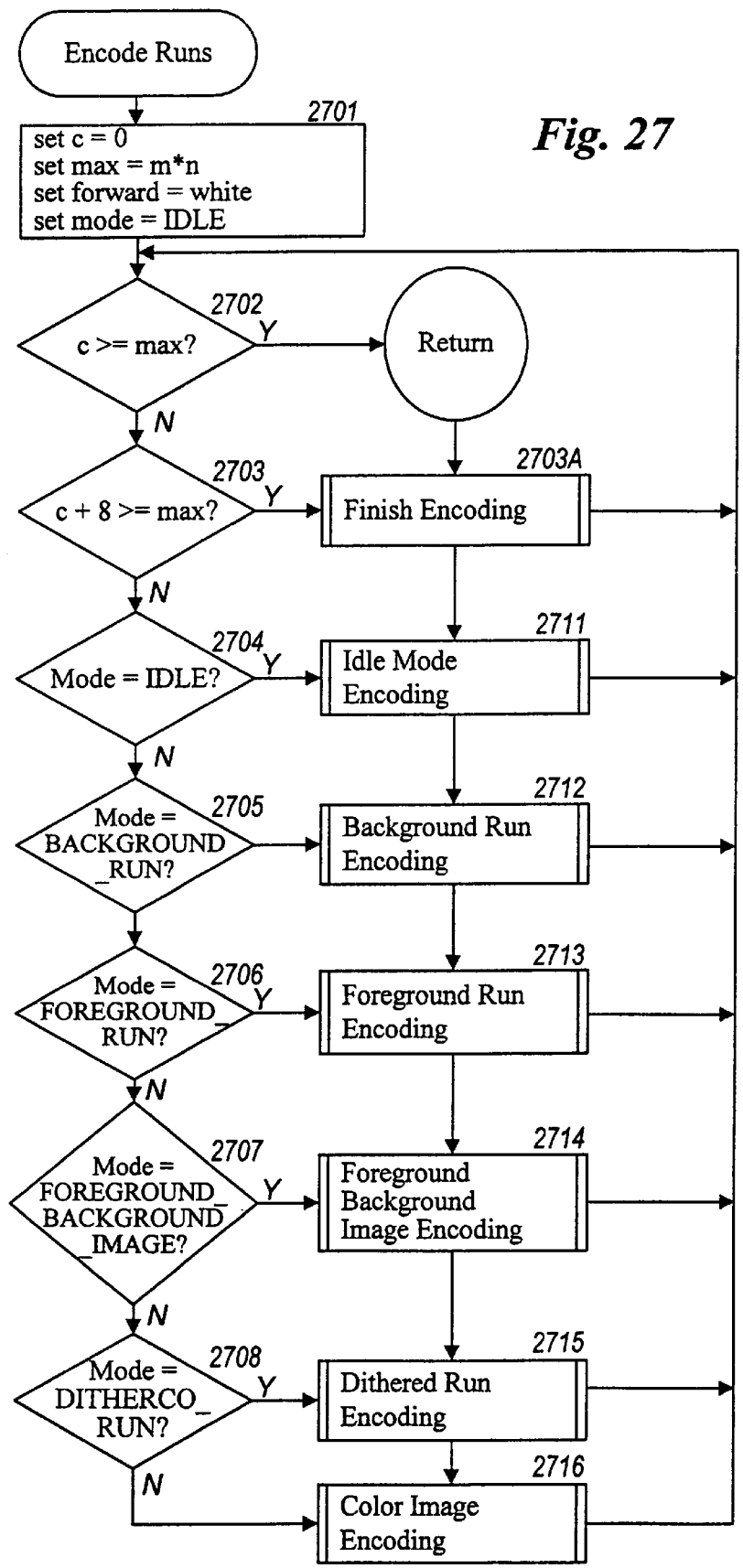
FIG. 27 is a flow diagram of the Encode Runs routine.

FIG. 27 is a flow diagram of the Encode Runs routine. In a preferred embodiment, the encode runs routine is implemented as a state machine. The modes (states) of the machine are: idle, background run, foreground run, dithered run, foreground-background image, and color image. The idle mode indicates that the routine is determining what type of run to encode next. The background run mode indicates that a background run is to be encoded, the foreground run mode indicates that a foreground run is to be encoded, and so on. In step 2701, the Encode Runs routine initializes the index into the temporary screen data, the variable max (which indicates the number of pixels in the temporary screen data), the foreground color to hexadecimal value f, and the mode to idle. In steps 2702–2716, the Encode Runs routine loops, executing the state machine. In step 2702, if the index into temporary screen data is greater than the maximum number of pixels, then the routine returns, else the routine continues at step 2703. In step 2703, if the index into the temporary screen data is within eight of the maximum number of pixels, then the routine continues at step 2710, else the routine continues at step 2704. In step 2703A, the Encode Runs routine invokes the Finish Encoding routine to complete the encoding of the screen data. In steps 2704–2708, the Encode Runs routine determines the current mode and invokes the corresponding routine to process that mode in steps 2711–2716. After the return from the routine to process the mode, the Encode Runs routine loops to step 2702.

Figure 28:
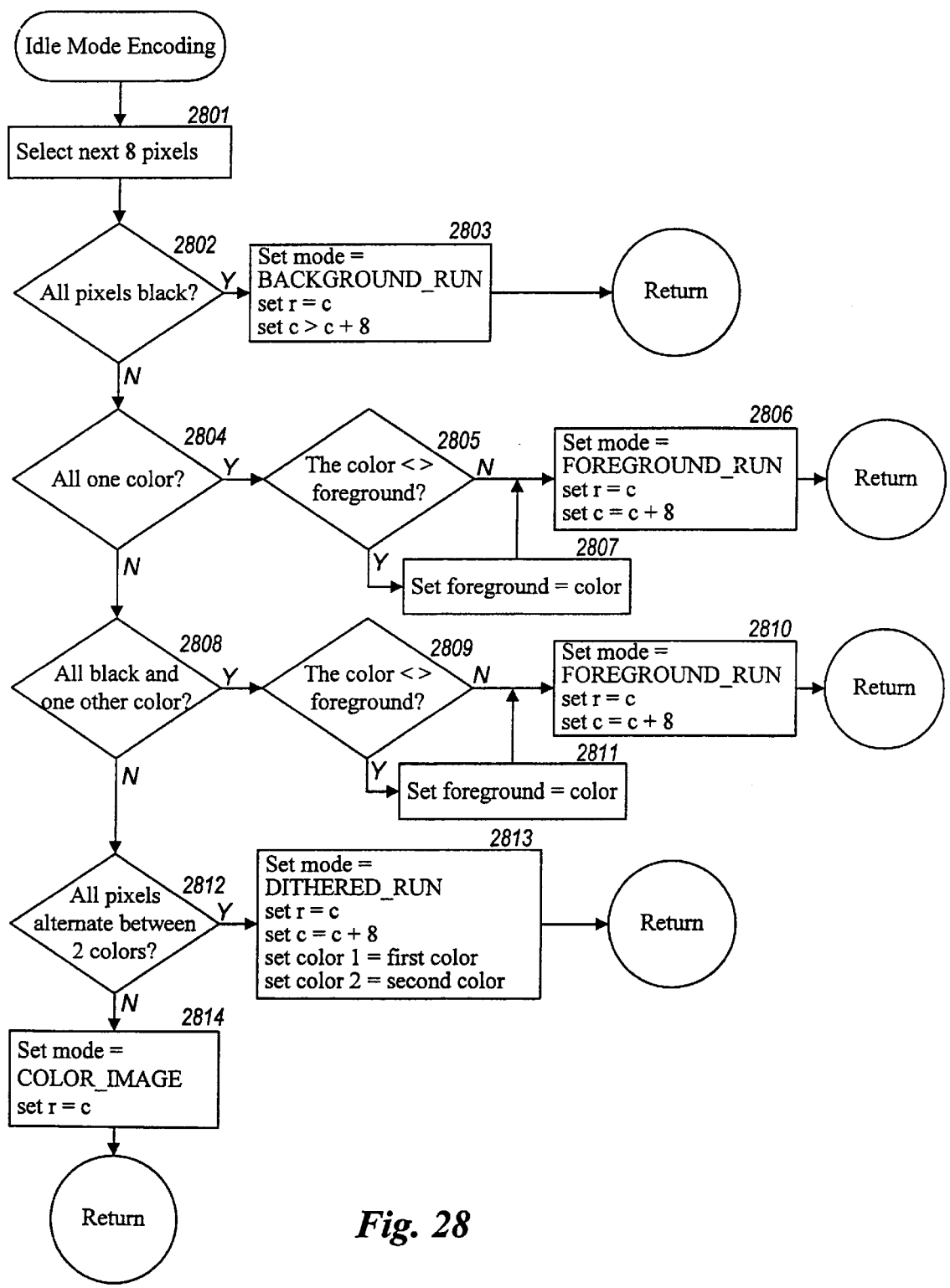
FIG. 28 is a flow diagram of the Idle Mode Encoding routine.

FIG. 28 is a flow diagram of the Idle Mode Encoding routine. The Idle Mode Encoding routine looks at the next eight pixels in the temporary screen data to determine the mode to enter. If all eight pixels are black (a 0 pixel value), then the routine enters the background run mode. If all eight pixels are of one color, then the routine enters the foreground run mode. If all the colors are black and one other color, then the routine enters the foreground-background run. If all the pixels alternate between two colors, then the routine enters the dithered run mode. Otherwise, the Idle Mode Encoding routine enters the color image mode. In step 2801, the idle mode encoding routine selects the next eight pixels. In step 2802, if all the selected pixels are black, then the routine continues at step 2803, else the routine continues at step 2804. In step 2803, the Idle Mode Encoding routine sets the mode to background run, saves the position of the start of the run, increments the current index into temporary screen data to point to the next set of eight pixels, and returns. In step 2804, if all the selected pixels are one color, the routine continues at step 2805, else the routine continues at 2808. In step 2805, if the color of the selected pixels equals the current foreground color, then the routine continues at step 2806, else the routine resets the foreground color in step 2807, and then continues at step 2806. In step 2806, the Idle Mode Encoding routine sets the mode to foreground run, saves the position of the start of the run, and increments the current index and returns. In step 2808, if all the selected pixels are either black and one other color, then the routine continues at step 2809, else the routine continues at step 2812. In step 2809, if the current foreground color is not equal to the other color, then the routine resets the foreground color in step 2811 and continues at step 2810. In step 2810, the Idle Mode Encoding routine sets the mode to foreground-background run, saves the start of the run, increments the current index, and returns. In step 2812, if the selected pixels alternate between two colors, then the routine continues at step 2813, else the routine continues at step 2814. In step 2813, the Idle Mode Encoding routine sets the start of the run, increments the current index, sets the first and second colors, and returns. In step 2814, the Idle Mode Encoding routine sets the mode to color image and sets the start of the run, and returns.

Figure 29:
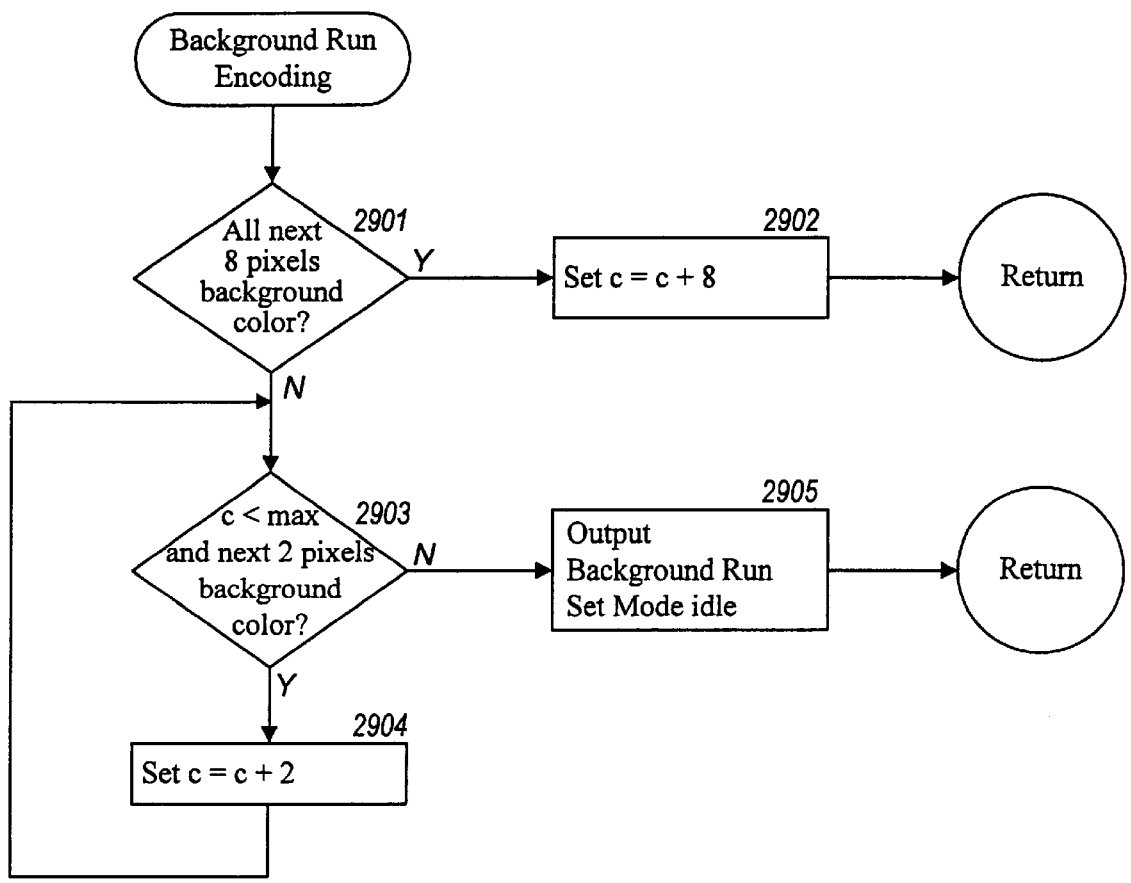
FIG. 29 is a flow diagram of the Background Run Encoding routine.

FIG. 29 is a flow diagram of the Background Run Encoding routine. In step 2901, if the next eight pixels in the temporary screen data are all set to the background color, then the routine increments the current index in step 2902 and returns, else the routine continues at step 2903. In steps 2903 and 2904, the Background Run Encoding routine determines how many of the next eight pixels are the background color. In step 2905, the Background Run Encoding routine outputs the run in either background run format, or the mega background run format (depending on the length of the run) sets the mode to idle, and returns. At any point, if the maximum number of pixels in the run exceeds the maximum possible length for mega background run, the routine outputs the mega background run and then continues.

Figure 30:
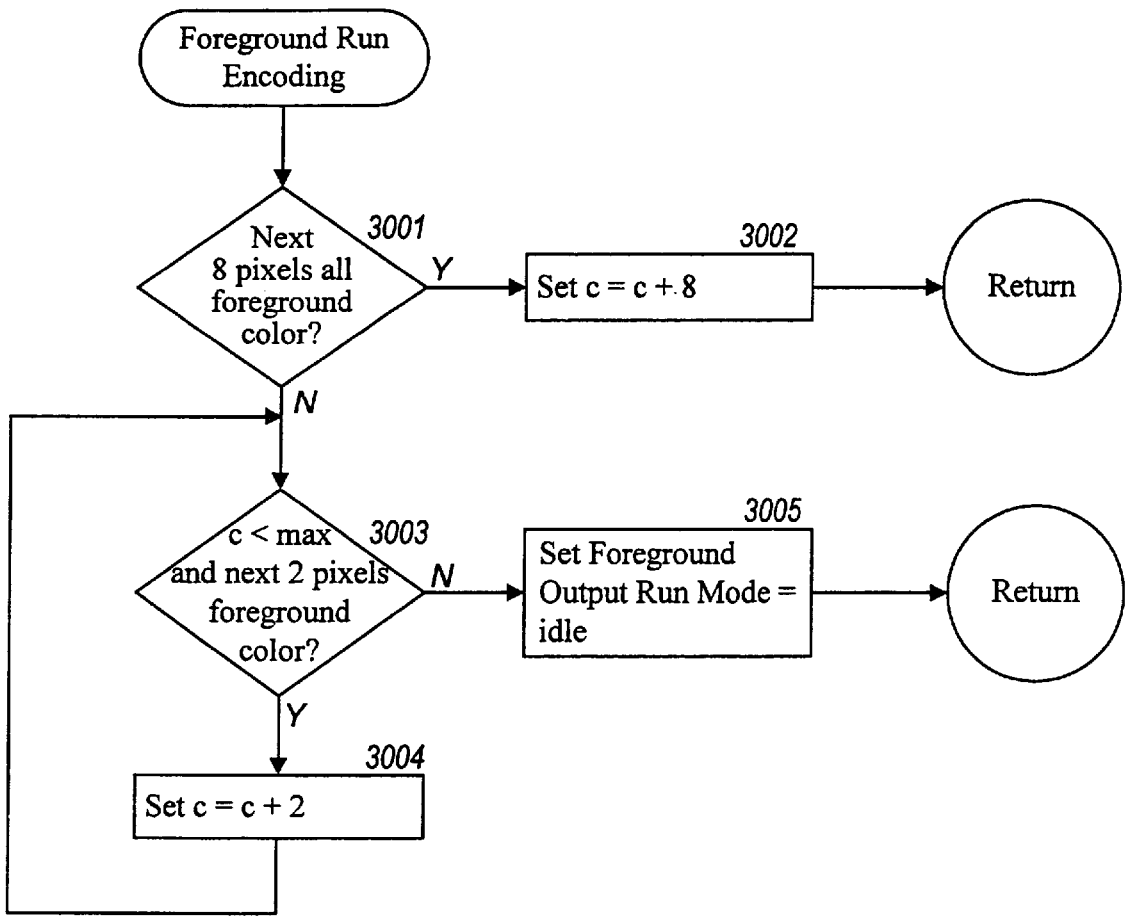
FIG. 30 is a flow diagram of the Foreground Run Encoding routine.

FIG. 30 is a flow diagram of the Foreground Run Encoding routine. The routine is analogous to the Background Run Encoding routine, except that in 3005, if the foreground color has changed, then before outputting the run, the Foreground Run Encoding routine outputs a change in foreground color.

Figure 31:
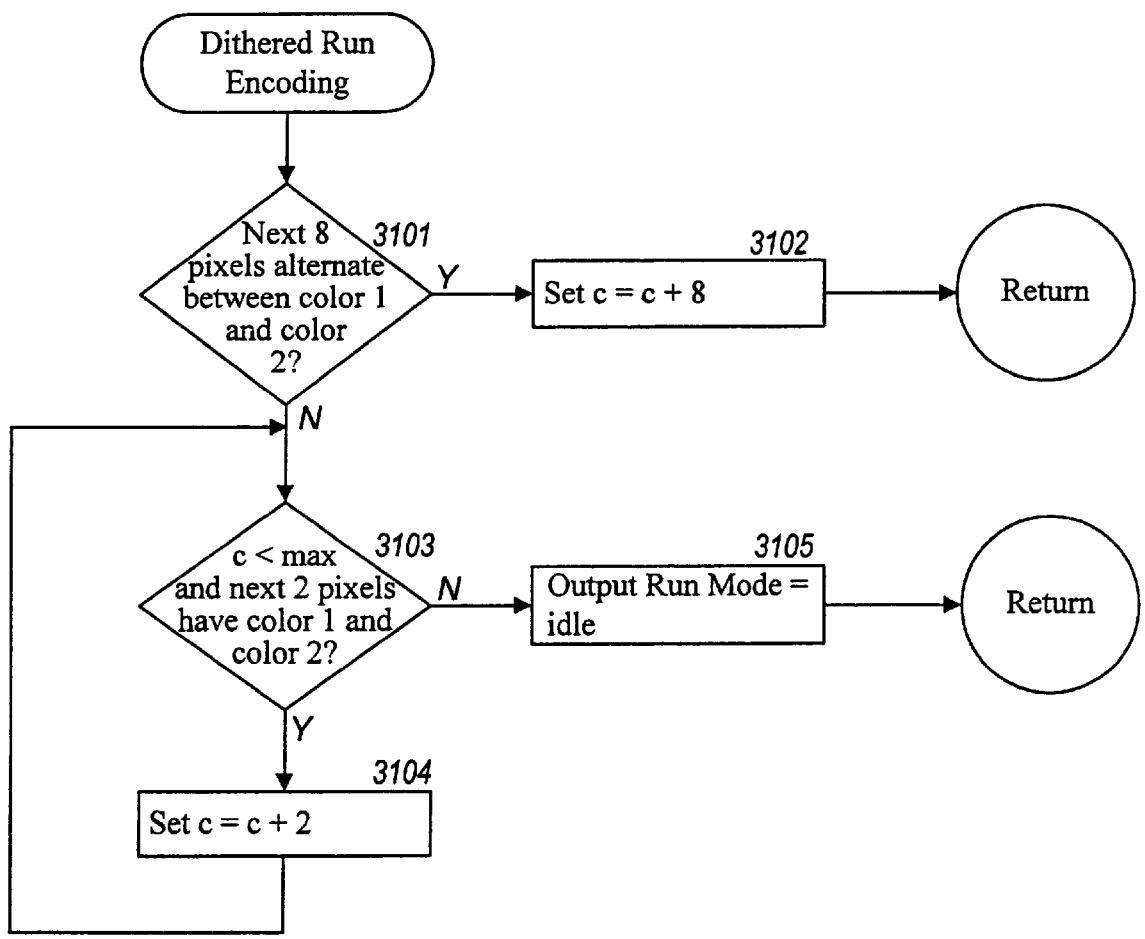
FIG. 31 is a flow diagram of the Dithered Run Encoding routine.

FIG. 31 is a flow diagram of the Dithered Run Encoding routine. The Dithered Run Encoding routine is analogous to the Background Run Encoding routine. However, the test for determining whether the run is being extended is whether the next pixels alternate between color 1 and color 2.

Figure 32:
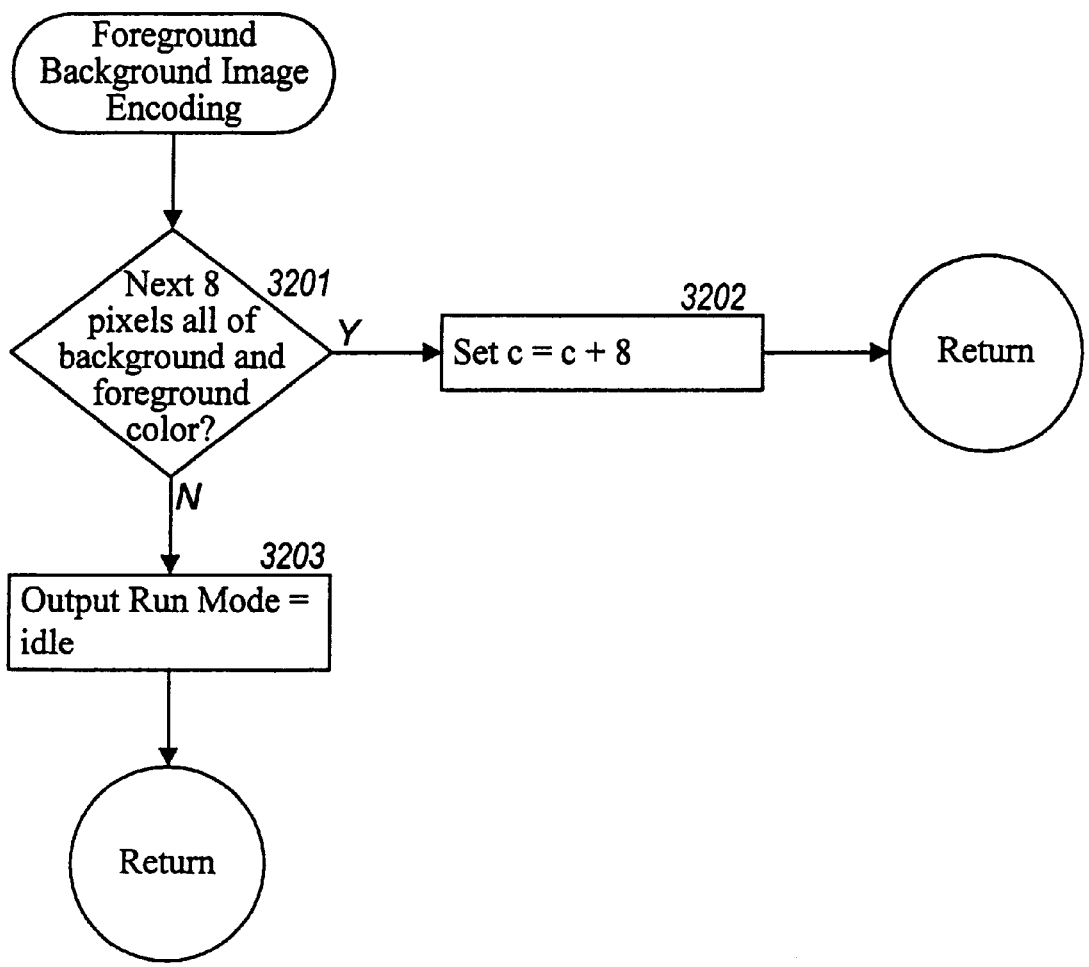
FIG. 32 is a flow diagram of the Foreground-Background Image Encoding routine.

FIG. 32 is a flow diagram of the Foreground-Background Image encoding routine. In step 3201, if the next eight pixels are all of the background and foreground colors, then the routine continues at step 3202, else the routine continues at step 3203. In step 3202, the Foreground-Background image encoding routine advances the current index past the next eight pixels and returns. In step 3203, the foreground-background image Encoding Routine Outputs the run, sets the mode to idle, and returns.

The Color Image Encoding routine and the Finished Encoding routine are not shown in a flow diagram. The Color Image Encoding routine determines whether the color image mode is ending and outputs the color image run, and returns. The Finished Encoding Routine determines whether the run for the current mode can be extended or not. If the run for the current mode can be extended, it is extended. Any remaining pixels are simply encoded as a color image and the routine returns.

Font Matching

The Share System preferably ensures that the shadow window displays an exact replica of the data in the host window. Typically, the GDI functions are translated to codes that are sent to the shadow computer system. However, a problem may occur with GDI function that specify text is to be output in a particular font. The problem occurs when the shadow computer system does not support a font that is supported by the host computer system. For example, if the host computer system supports a font with variable width characters, such as Times Roman, and the shadow computer system only supports fixed width fonts, then any text output by the shadow computer system may be a different length than the text output on the host computer system, resulting in a different appearance in the shadow window.

To solve this problem, the Share System of the host computer system, upon initialization, determines which fonts the shadow computer system supports. If both the host and shadow computer systems support the font specified in a GDI function, then the host computer system translates GDI function to an order that uses the font. If, however, the shadow computer system cannot support that font, then the host computer system generates a screen list entry, rather than an order entry. The screen list entry references the bounding rectangle of the host window that will be used to extract the screen data that results from the rendering of the data in the font. In this way, the Share System minimizes data transmission by transmitting text data as an order when the font is supported, but transmits screen data to ensure that the shadow window is visually consistent with the host window when the font is not supported.

Figure 33:
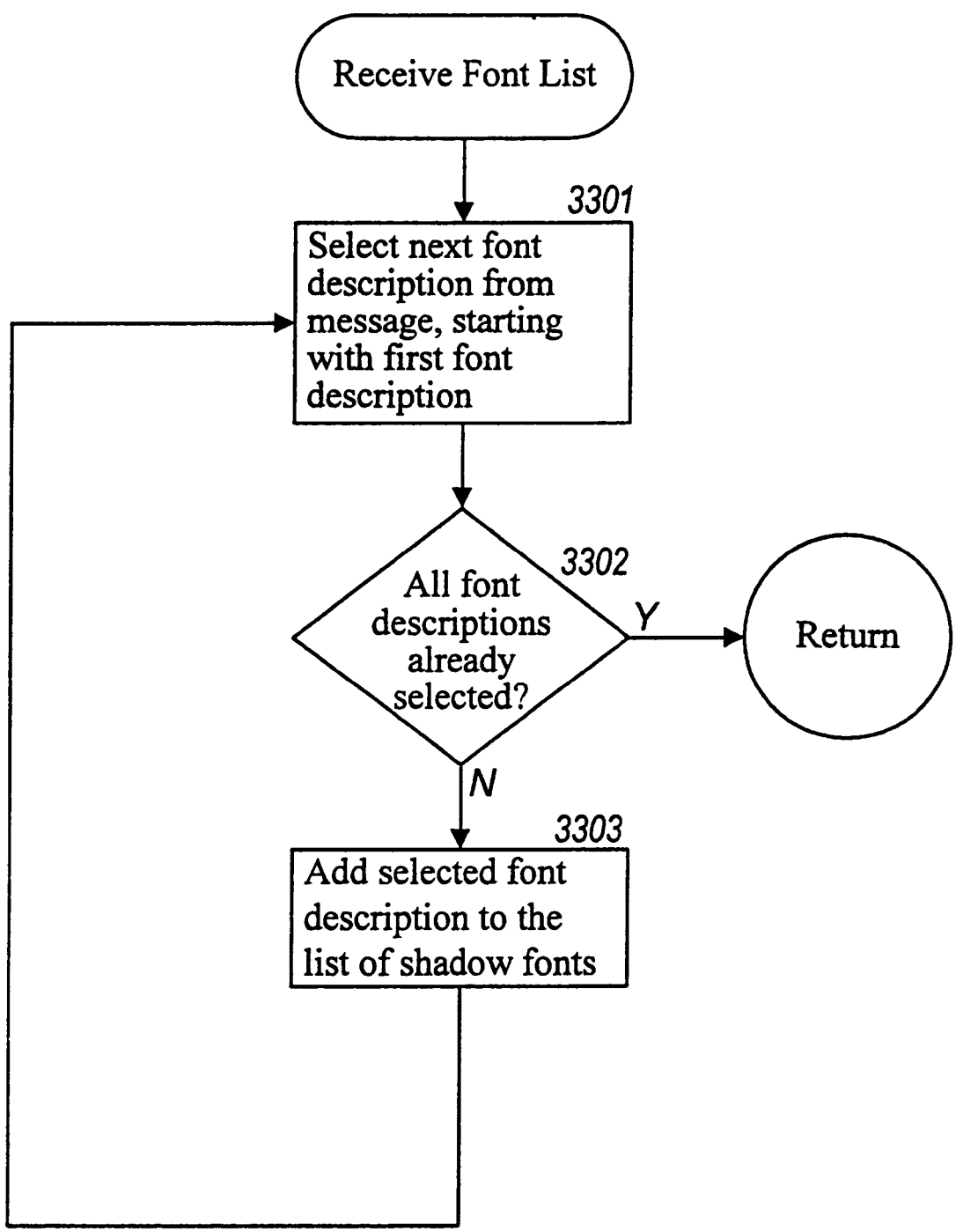
FIG. 33 is a flow diagram of the Receive Font List routine.

FIG. 33 is a flow diagram of the Receive Font List routine. The Receive Font List routine is executed by the controlling task whenever a font list message is received at the host computer system from the shadow computer system. The Receive Font List routine stores the font list information which is used to determine whether a certain font is supported. The font list is transmitted as a message with a list of font descriptions. In step 3301, the Receive Font List routine selects the next font description in the message starting with the first font description. In step 3302, if all the font descriptions have already been selected, then the routine returns, else the routine continues at step 3303. In step 3303, the Receive Font List routine adds the selected font description to the list of font descriptions and loops to step 3301 to select the next font description.

Figure 34:
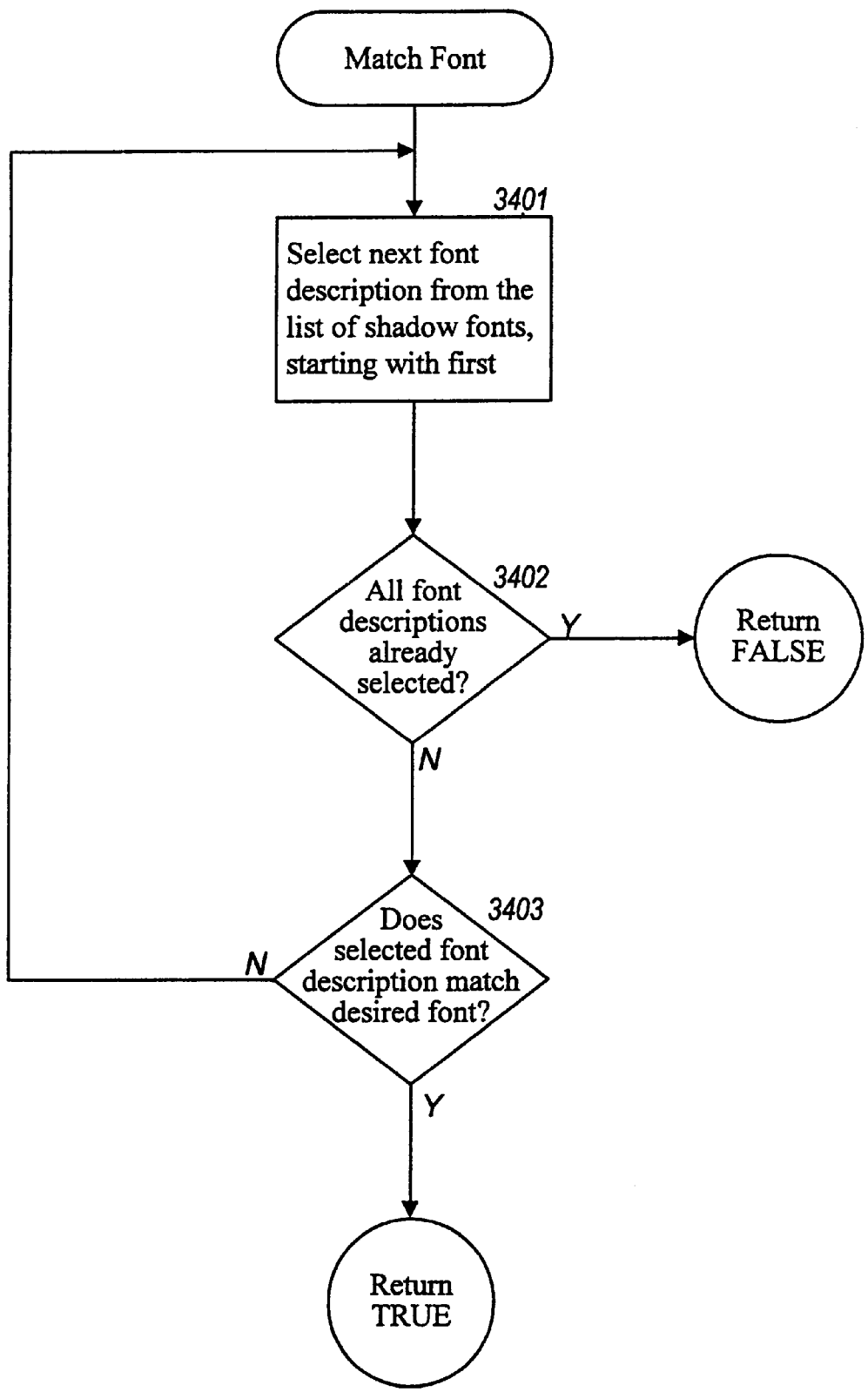
FIG. 34 is a flow diagram of the Font Match routine.

FIG. 34 is a flow diagram of the Font Match routine. The Font Match routine is invoked to determine whether the shadow computer system supports a font specified in a GDI function. Since the font descriptions may be sent in a series of messages asynchronously, it may take a considerable time to determine all the supported font of the shadow system initially. Consequently, all GDI function that specify a font are converted to screen data until a message indicating the font is received. In this way, the application sharing can proceed even though all the supported fonts have not yet been identified. Alternatively, the Share System encodes all output specifying a font as screen data until all the font descriptions have been received. In step 3401, the Font Match routine selects the next font description from the list of shadow fonts, starting with the first. In step 3402, if all the font descriptions have already been selected, then the routine returns a false value, else the routine continues at step 3403. In step 3403, if the selected font description matches the font description of the desired font, then the font match routine returns a value true, else the routine loops to step 3401 to select the next font description. A font description contains a name, size, and checksum for the font. Thus, font descriptions match, when the name, size, and checksums match. A checksum of a font is used as a double-check to ensure that a font supported by the host computer system is the same as a font supported by the shadow computer system. Any of well-known checksum techniques can be used to generate the checksum, the checksum is generated on the definition of the font, which may include generating the checksum from each bitmap for each character in the font. Alternatively, the checksum can be generated based on the height and width of each character in the font since the Share System is concerned primarily about those characteristics.

Pixel Depth

The Share System selects a pixel depth for transmission of bitmap data that preferably tends to maximize the quality of the data displayed on the shadow window. Typically, a low resolution display device has a translator associated with it that translates from a high pixel depth to one low pixel depth of the display device. Such translators associated with the low resolution device tend to be optimized to ensure that the low resolution data is an accurate representation of the high resolution data. Conversely, those computer systems with high resolution display devices may not have translators that accurately translate from the high resolution to the low resolution. Consequently, to enhance the quality of the display in the shadow window, when the shadow computer system supports a lower resolution display device than the host computer system, the Share System preferably transmits screen data in the high pixel depth to the shadow computer system. The shadow computer system then translates the screen data from the high pixel depth to the low pixel. Although this technique increases the amount of transmission time of screen data, the resulting displayed data more accurately represents the data displayed in the host computer system.

Upon connection of computer systems, one computer system supplies a list of pixel depths that it supports, along with the pixel depth of its display device. The pixel depth of the display device is the resolution of the display device. Upon receipt of the information, the Share System determines the pixel depth that is common to both the computer systems that is closest to the lowest display pixel depth and uses that as the transmission pixel depth. If, however, the transmission pixel depth is 4 and both computer systems support a pixel depth of 8, then a transmission depth of 8 is used.

Figure 35:
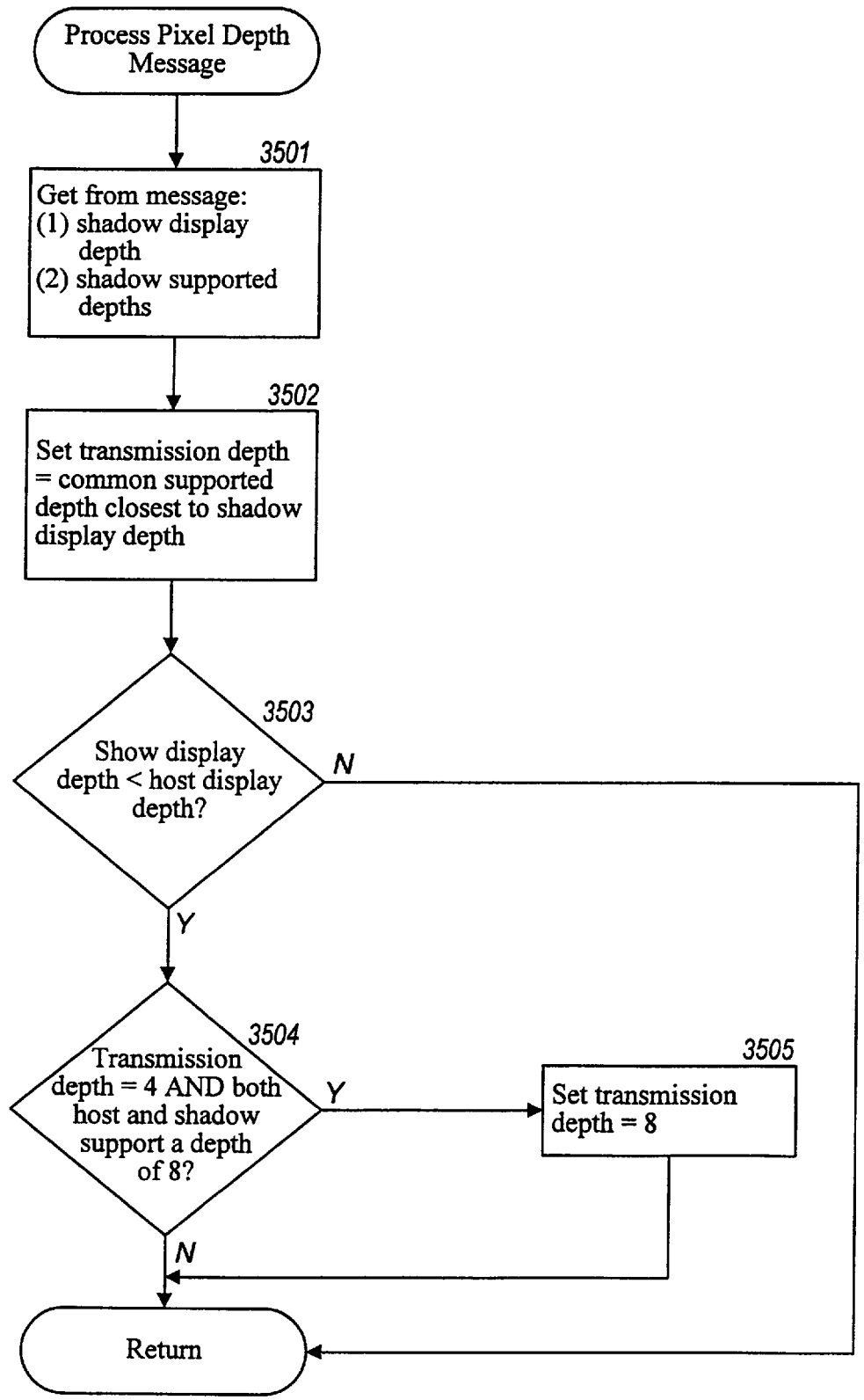
FIG. 35 is a flow diagram of the Process Pixel Depth Message routine.

FIG. 35 is a flow diagram of the Process Pixel Depth Message routine. The Process Pixel Depth Message routine is invoked by the controlling task when the computer system receives a message containing the pixel depth information from the other computer system. In step 3501, the Process Pixel Depth Message routine retrieves the message that contains the display pixel depth of the computer system and the supported pixel depths of the computer system. In step 3502, the routine sets the transmission depth to that commonly supported pixel depth that is closest to the shadow display depth. In step 3503, if the display pixel depth is less than the display pixel depth of the computer system, then the routine continues at step 3504, else the routine returns. In step 3504, if the selected transmission depth equals 4 and both computer systems support a pixel depth of 8, then the transmission pixel depth is set to 8 in step 3505. The Process Pixel Depth Message routine then returns.

Although the present invention has been described in terms of a preferred embodiment, it is not intended that the invention be limited by this embodiment. Modifications within the spirit of the present invention will be apparent to those skilled in the art. The scope of the present invention is defined in the claims that follow.

What is claimed is:

1. A method in a first computer for transmitting text data from a first computer to a second computer, the method comprising:

the first computer receiving identifications of fonts supported by the second computer asynchronously, upon initiation of a session for transmitting data, and without solicitation form the first computer;

the first computer receiving a request to output text data in a specified font on the second computer;

the first computer determining from the received identifications whether the second computer supports the specified font;

when it is determined, by the first computer, that the second computer supports the specified font, sending the text data along with an identification of the specified font to the second computer; and when it is determined, by the first computer, that the second computer does not support the specified font, the first computer generating a bitmap representation of the data in the specified font; and the first computer sending the generated bitmap representation of the text data of the second computer for display of the bitmap representation on a display device of the second computer.

2. A computer-readable medium containing instructions for causing a first computer to transmit text data to a second computer, by:

the first computer determining from identifications of fonts supported by the second computer whether the second computer supports a specified font, the first computer receiving the identifications from the second computer asynchronously upon initiation of a session to transmit text data and without solicitation by the first computer;

when it is determined, by the first computer, that the second computer supports the specified font, the first computer sending text data along with an identification of the specified font to the second computer; and when it is determined, by the first computer, that the second computer does not support the specified font, the first computer sending a bitmap representation of the text data in the specified font to the second computer for display of the bitmap representation on a display device of the second computer.

3. A method in a first computer for transmitting text data to a second computer, the method comprising:

the first computer receiving a request to transmit text data from the first computer to the second computer;

the first computer determining from identifications of fonts supported by the second computer whether the second computer supports a specified font, the identifications being received from the second computer asynchronously upon initiation of a session for transmitting text data and without solicitation by the first computer;

when it is determined by the first computer that the second computer does support the specified font, the first computer sending text data along with an identification of the specified font to the second computer; and when it is determined, by the first computer, that the second computer does not support the specified font, the first computer sending a bitmap representation of the text data in the specified font to the second computer for display of the bitmap representation on a display device of the second computer.

* * * * *

UNITED STATES PATENT AND TRADEMARK OFFICE
CERTIFICATE OF CORRECTION

PATENT NO. : 6,216,177 B1
DATED : April 10, 2001
INVENTOR(S) : Mairs et al.

It is certified that error appears in the above-identified patent and that said Letters Patent is hereby corrected as shown below:

<u>Title page,</u>
Item [73], add as additional Assignee: -- PictureTel Corporation, Danvers, MA --

Signed and Sealed this

Thirty-first Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.   : 6,216,177 B1   Page 1 of 1
DATED        : April 10, 2001
INVENTOR(S)  : Mairs et al.

It is certified that error appears in the above-identified patent and that said Letters Patent is hereby corrected as shown below:

Column 3,
Line 52, "tasks" should read -- tasks. --.
Line 62, "list" should read -- list. --.

Column 16,
Lines 35 and 38, "hexadecimal" should read -- hexa-decimal --.

Signed and Sealed this

Sixteenth Day of December, 2003

JAMES E. ROGAN
*Director of the United States Patent and Trademark Office*